US011212214B2

(12) United States Patent
Mizutani et al.

(10) Patent No.: US 11,212,214 B2
(45) Date of Patent: Dec. 28, 2021

(54) PARALLEL COMPUTER SYSTEM, METHOD OF CONTROLLING A PARALLEL COMPUTER SYSTEM, AND A NON-TEMPORARY COMPUTER-READABLE MEDIUM THAT STORES A PROGRAM

(71) Applicants: NEC CORPORATION, Tokyo (JP); PHOTONICS ELECTRONICS TECHNOLOGY RESEARCH ASSOCIATION, Tokyo (JP); FUJITSU LIMITED, Kawasaki (JP)

(72) Inventors: Kenji Mizutani, Tokyo (JP); Yutaka Urino, Tokyo (JP); Tatsuya Usuki, Kanagawa (JP)

(73) Assignees: NEC CORPORATION, Tokyo (JP); PHOTONICS ELECTRONICS TECHNOLOGY RESEARCH ASSOCIATION, Tokyo (JP); FUJITSU LIMITED, Kawasaki (JP)

(*) Notice: Subject to any disclaimer, the term of this patent is extended or adjusted under 35 U.S.C. 154(b) by 102 days.

(21) Appl. No.: 16/562,742

(22) Filed: Sep. 6, 2019

(65) Prior Publication Data
US 2020/0092196 A1    Mar. 19, 2020

(30) Foreign Application Priority Data
Sep. 14, 2018  (JP) .............................. JP2018-172320

(51) Int. Cl.
*H04L 12/733* (2013.01)
*H04L 12/721* (2013.01)
(Continued)

(52) U.S. Cl.
CPC ............ *H04L 45/122* (2013.01); *H04L 12/18* (2013.01); *H04L 45/021* (2013.01);
(Continued)

(58) Field of Classification Search
None
See application file for complete search history.

(56) References Cited

U.S. PATENT DOCUMENTS 9,401,774 B1    7/2016  Mineo et al.
2008/0186853 A1*  8/2008  Archer .................... H04L 45/12
                                                         370/235
(Continued)

FOREIGN PATENT DOCUMENTS

JP    3292843 B2    6/2002
JP    3568878 B2    9/2004

OTHER PUBLICATIONS

Harada Keiji et al. "Development of Star-Type WDM Systems," (online) NTT Technical Journal, URL: http://www.ntt.co.jp/journal/0310/files/jn200310046.pdf, Oct. 2003, 4 pages.

*Primary Examiner* — Saumit Shah
(74) *Attorney, Agent, or Firm* — Sughrue Mion, PLLC

(57) ABSTRACT

A parallel computer system includes: direct links that forms a direct connection between a sending node and a receiving node, one-hop links that forms a connection between a sending node and a receiving node by way of a return node that is other than the sending node and the receiving node, and a communication control unit that, when transferring data from a sending node to a receiving node, selects the link that connects the sending node and the receiving node from among a link that uses only a direct link, a link that uses only a one-hop link, and a link that forms a connection combines and uses the direct link and the one-hop link.

9 Claims, 46 Drawing Sheets

(51) Int. Cl.
*H04L 12/18* (2006.01)
*H04L 12/707* (2013.01)
*H04L 12/755* (2013.01)

(52) U.S. Cl.
CPC .......... *H04L 45/123* (2013.01); *H04L 45/127* (2013.01); *H04L 45/20* (2013.01); *H04L 45/22* (2013.01); *H04L 45/72* (2013.01)

(56) References Cited

U.S. PATENT DOCUMENTS

| | | | |
|---|---|---|---|
| 2011/0270942 A1 | 11/2011 | Archer et al. | |
| 2014/0189094 A1* | 7/2014 | Ditya | H04L 45/245 709/224 |
| 2017/0242766 A1* | 8/2017 | Matsuyama | G06F 11/1658 |

* cited by examiner

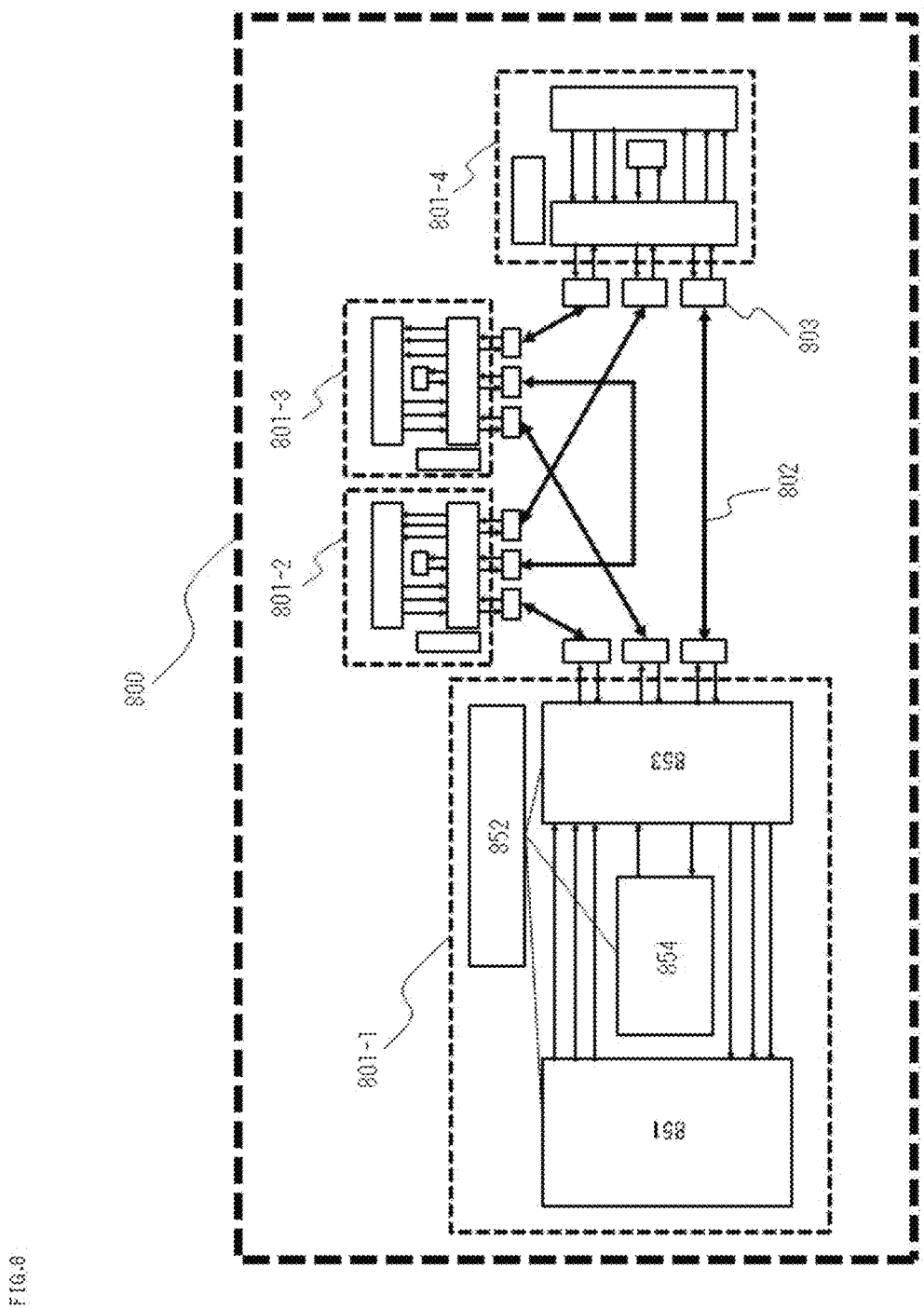

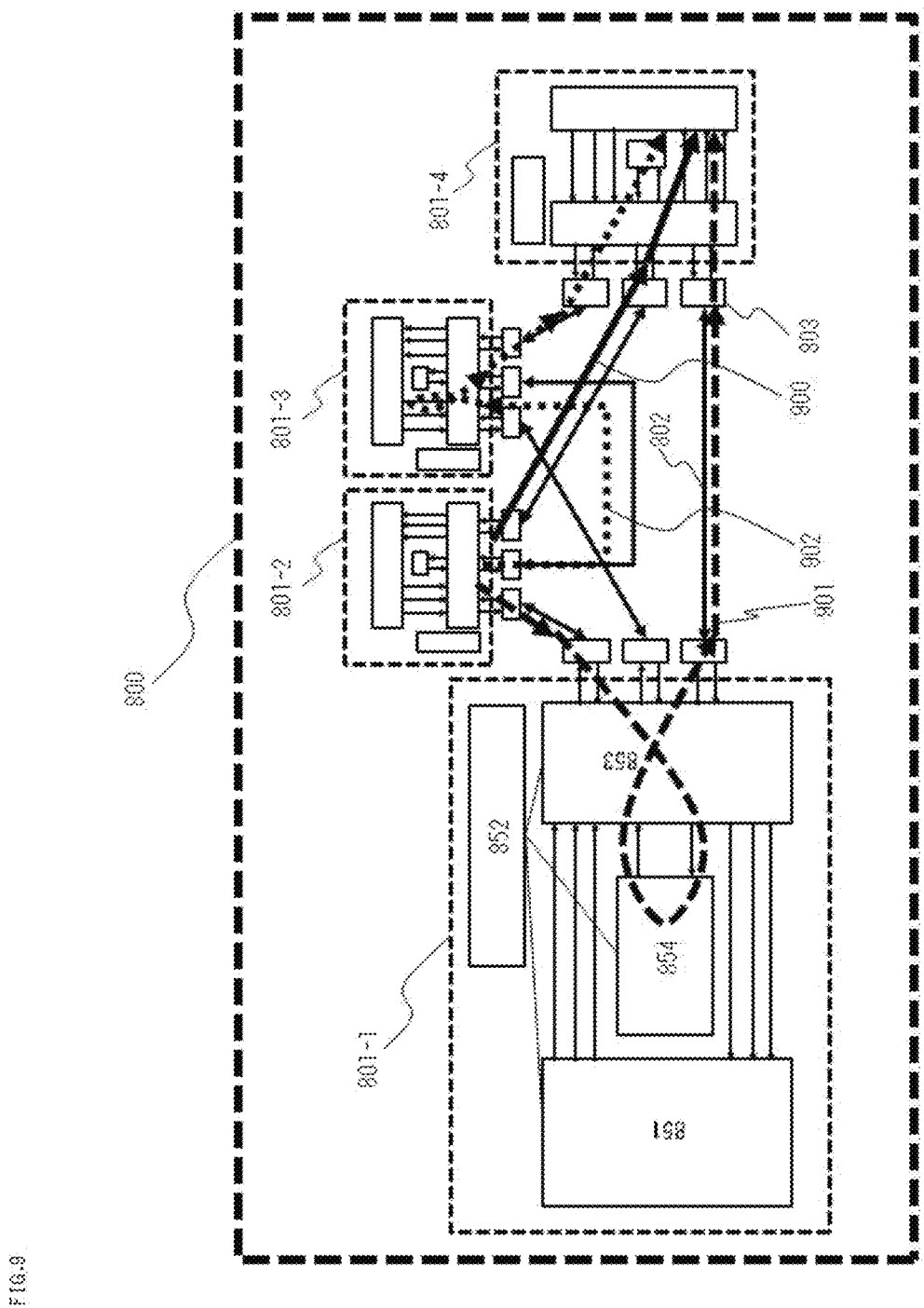

FIG. 20

| Communication management number | communication type | Sending mode | Receiving mode | Communicator | Send address | Receive address | Number of items of data | Data accuracy (bit) | ID number | communication state |
|---|---|---|---|---|---|---|---|---|---|---|
| 1155-0 | 1155-1 | 1155-2 | 1155-3 | 1155-4 | 1155-5 | 1155-6 | 1155-7 | 1155-8 | 1155-9 | 1155-10 |
| A | one-to-one | 1 | 2 | WORLD | Y | Y | 5000 | 32 | 1 | connecting |

| Link name | Sending node (1156-1) | Receiving node (1156-2) | State of use (1156-3) | One-hop-reused node (1156-4) |
|---|---|---|---|---|
| 1—2 | Computation node 1 | Computation node 2 | A(1hop1st) | 3, 4 |
| 1—3 | Computation node 1 | Computation node 3 | A(1hop1st) | 2, 4 |
| 1—4 | Computation node 1 | Computation node 4 | A(1hop1st) | 2, 3 |
| 2—1 | Computation node 2 | Computation node 1 | unused | 3, 4 |
| 2—3 | Computation node 2 | Computation node 3 | unused | 1, 4 |
| 2—4 | Computation node 2 | Computation node 4 | unused | 1, 3 |
| 3—1 | Computation node 3 | Computation node 1 | A(1hop2nd) | 2, 4 |
| 3—2 | Computation node 3 | Computation node 2 | unused | 1, 4 |
| 3—4 | Computation node 3 | Computation node 4 | unused | 1, 2 |
| 4—1 | Computation node 4 | Computation node 1 | A(1hop2nd) | 2, 3 |
| 4—2 | Computation node 4 | Computation node 2 | unused | 1, 3 |
| 4—3 | Computation node 4 | Computation node 3 | unused | 1, 2 |

| Communication management number 1155-0 | Communication type 1155-1 | Sending node. 1155-2 | Receiving node. 1155-3 | Communicator 1155-4 | Send address 1155-5 | Receive address 1155-6 | Number of items of data 1155-7 | Data accuracy (bit) 1155-8 | ID number 1155-9 | communication state 1155-10 |
|---|---|---|---|---|---|---|---|---|---|---|
| A | one-to-one | 1 | 2 | WORLD | Y | Y | 5000 | 32 | 1 | connecting |
| B | SCATTER | 2 | WORLD | WORLD | Y1 | Y2 | 5000 | 32 | 1 | connecting |

FIG. 28

| Link name | Sending node (1156-1) | Receiving node (1156-2) | State of use (1156-3) | One-hop-focused node (1156-4) |
|---|---|---|---|---|
| 1-2 | Computation node 1 | Computation node 2 | A (1hop1st) | 3, 4 |
| 1-3 | Computation node 1 | Computation node 3 | A (1hop1st) | 2, 4 |
| 1-4 | Computation node 1 | Computation node 4 | A (1hop1st) | 2, 3 |
| 2-1 | Computation node 2 | Computation node 1 | B (direct) | 3, 4 |
| 2-3 | Computation node 2 | Computation node 3 | B (direct) | 1, 4 |
| 2-4 | Computation node 2 | Computation node 4 | B (direct) | 1, 3 |
| 3-1 | Computation node 3 | Computation node 1 | unused | 2, 4 |
| 3-2 | Computation node 3 | Computation node 2 | A (1hop2nd) | 1, 4 |
| 3-4 | Computation node 3 | Computation node 4 | unused | 1, 2 |
| 4-1 | Computation node 4 | Computation node 1 | unused | 2, 3 |
| 4-2 | Computation node 4 | Computation node 2 | A (1hop2nd) | 1, 3 |
| 4-3 | Computation node 4 | Computation node 3 | unused | 1, 2 |

FIG. 27

| Communication management number 1155-0 | Communication type 1155-1 | Sending node 1155-2 | Receiving node 1155-3 | Communicator 1155-4 | Send address 1155-5 | Receive address 1155-6 | Number of items of data 1155-7 | Data accuracy (bit) 1155-8 | ID number 1155-9 | Communication state 1155-10 |
|---|---|---|---|---|---|---|---|---|---|---|
| A | one-to-one | 1 | 2 | WORLD | Y | Y | 5000 | 32 | 1 | connecting |
| B | SCATTER | 2 | WORLD | WORLD | Y1 | Y2 | 5000 | 32 | 1 | connecting |
| C | MULTICAST | 3 | WORLD | WORLD | Y | Y | 50 | 32 | 1 | wait |

| Link name | Sending node (1156-1) | Receiving node (1156-2) | Share of use (1156-3) | One-hop routed node (1156-4) |
|---|---|---|---|---|
| 1—2 | Computation node 1 | Computation node 2 | A (1hop1st) | 3, 4 |
| 1—3 | Computation node 1 | Computation node 3 | A (1hop1st) | 2, 4 |
| 1—4 | Computation node 1 | Computation node 4 | A (1hop1st) | 2, 3 |
| 2—1 | Computation node 2 | Computation node 1 | B (direct) | 3, 4 |
| 2—3 | Computation node 2 | Computation node 3 | B (direct) | 1, 4 |
| 2—4 | Computation node 2 | Computation node 4 | B (direct) | 1, 3 |
| 3—1 | Computation node 3 | Computation node 1 | unused | 2, 4 |
| 3—2 | Computation node 3 | Computation node 2 | A (1hop2nd) | 1, 4 |
| 3—4 | Computation node 3 | Computation node 4 | unused | 1, 2 |
| 4—1 | Computation node 4 | Computation node 1 | unused | 2, 3 |
| 4—2 | Computation node 4 | Computation node 2 | A (1hop2nd) | 1, 3 |
| 4—3 | Computation node 4 | Computation node 3 | unused | 1, 2 |

FIG. 30

| Communication management number 1155-0 | Communication type 1155-1 | Sending node 1155-2 | Receiving node 1155-3 | Communicator 1155-4 | Send address 1155-5 | Receive address 1155-6 | Number of items of data 1155-7 | Data accuracy (bit) 1155-8 | ID number 1155-9 | communication state 1155-10 |
|---|---|---|---|---|---|---|---|---|---|---|
| B | SCATTER | 2 | WORLD | WORLD | Y1 | Y2 | 5000 | 32 | 1 | connecting |
| C | MULTICAST | 3 | WORLD | WORLD | Y | Y | 50 | 32 | 1 | connecting |

FIG. 31

| Link name | Sending node (1156-1) | Receiving node (1156-2) | State of use (1156-3) | One-hop routed node (1156-4) |
|---|---|---|---|---|
| 1—2 | Computation node 1 | Computation node 2 | unused | 3, 4 |
| 1—3 | Computation node 1 | Computation node 3 | unused | 2, 4 |
| 1—4 | Computation node 1 | Computation node 4 | unused | 2, 3 |
| 2—1 | Computation node 2 | Computation node 1 | B (direct) | 3, 4 |
| 2—3 | Computation node 2 | Computation node 3 | B (direct) | 1, 4 |
| 2—4 | Computation node 2 | Computation node 4 | B (direct) | 1, 3 |
| 3—1 | Computation node 3 | Computation node 1 | C (direct) | 2, 4 |
| 3—2 | Computation node 3 | Computation node 2 | C (direct) | 1, 4 |
| 3—4 | Computation node 3 | Computation node 4 | C (direct) | 1, 2 |
| 4—1 | Computation node 4 | Computation node 1 | unused | 2, 3 |
| 4—2 | Computation node 4 | Computation node 2 | unused | 1, 3 |
| 4—3 | Computation node 4 | Computation node 3 | unused | 1, 2 |

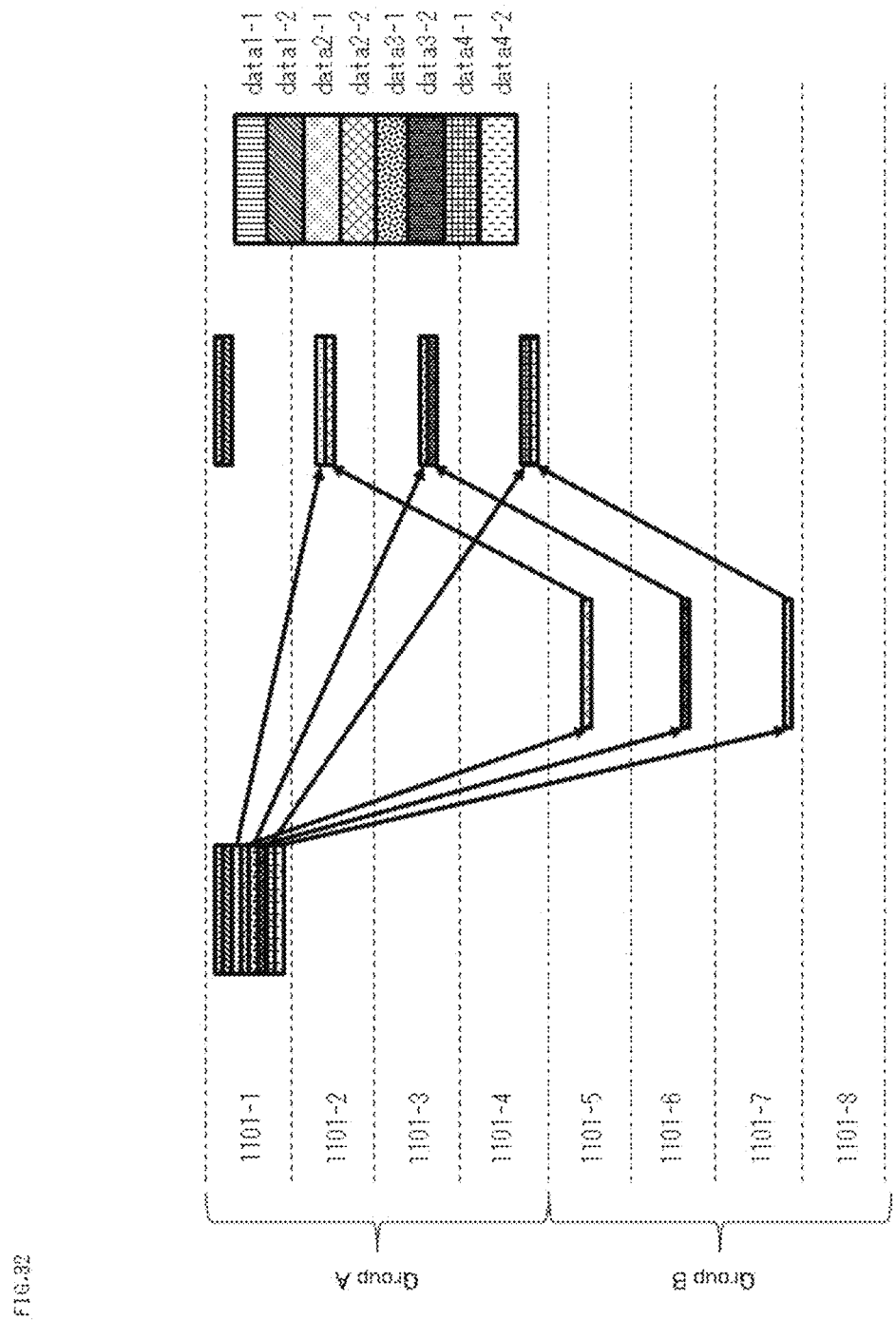

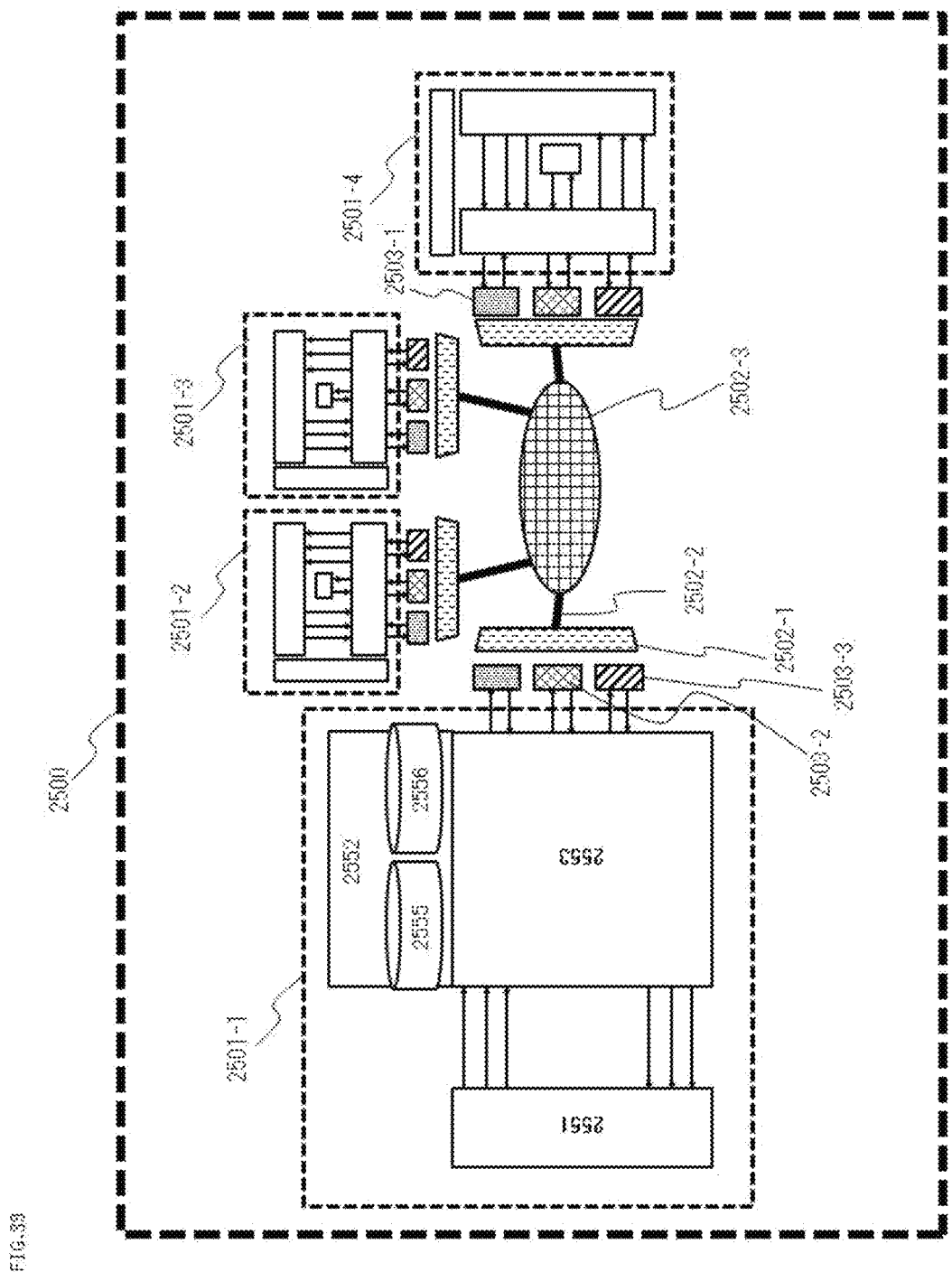

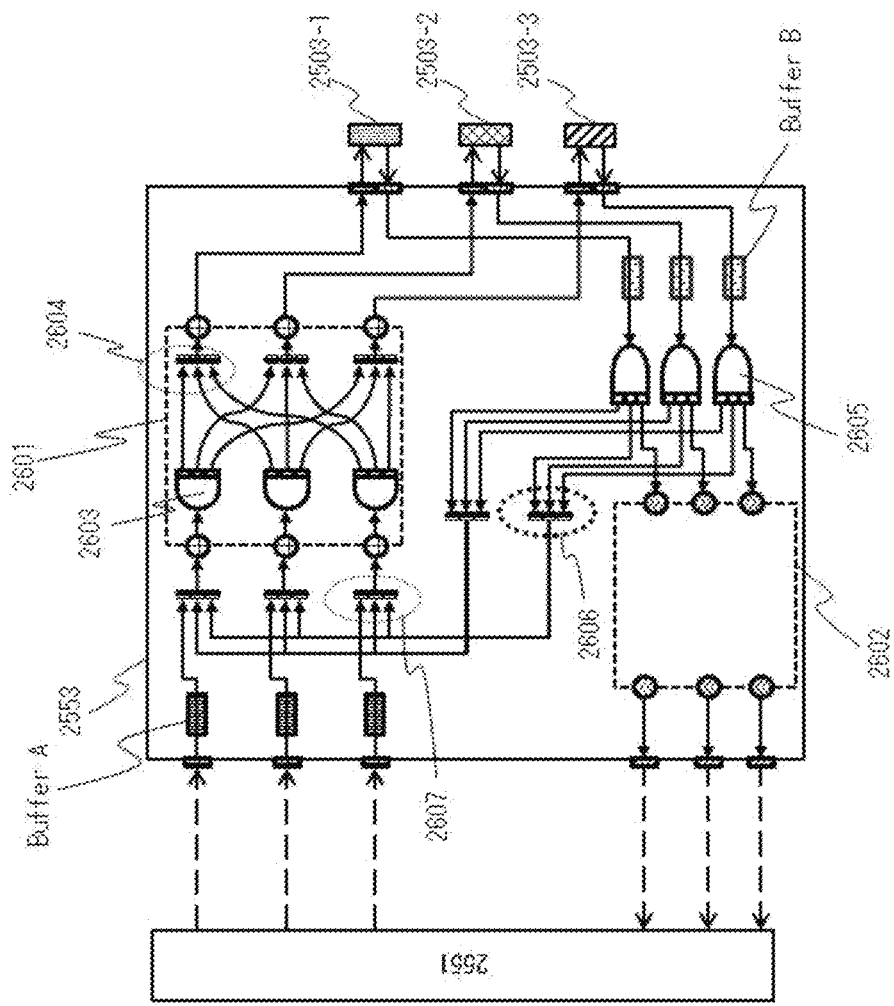

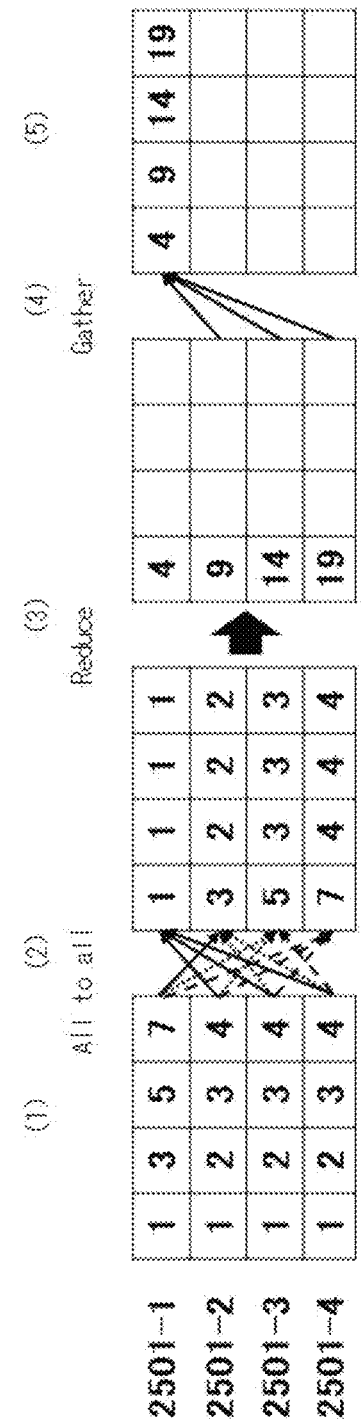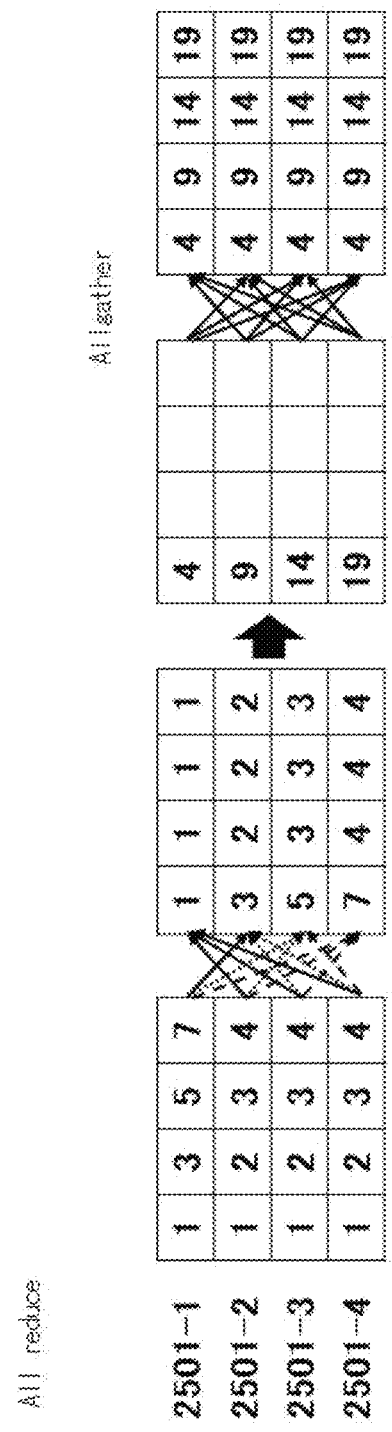

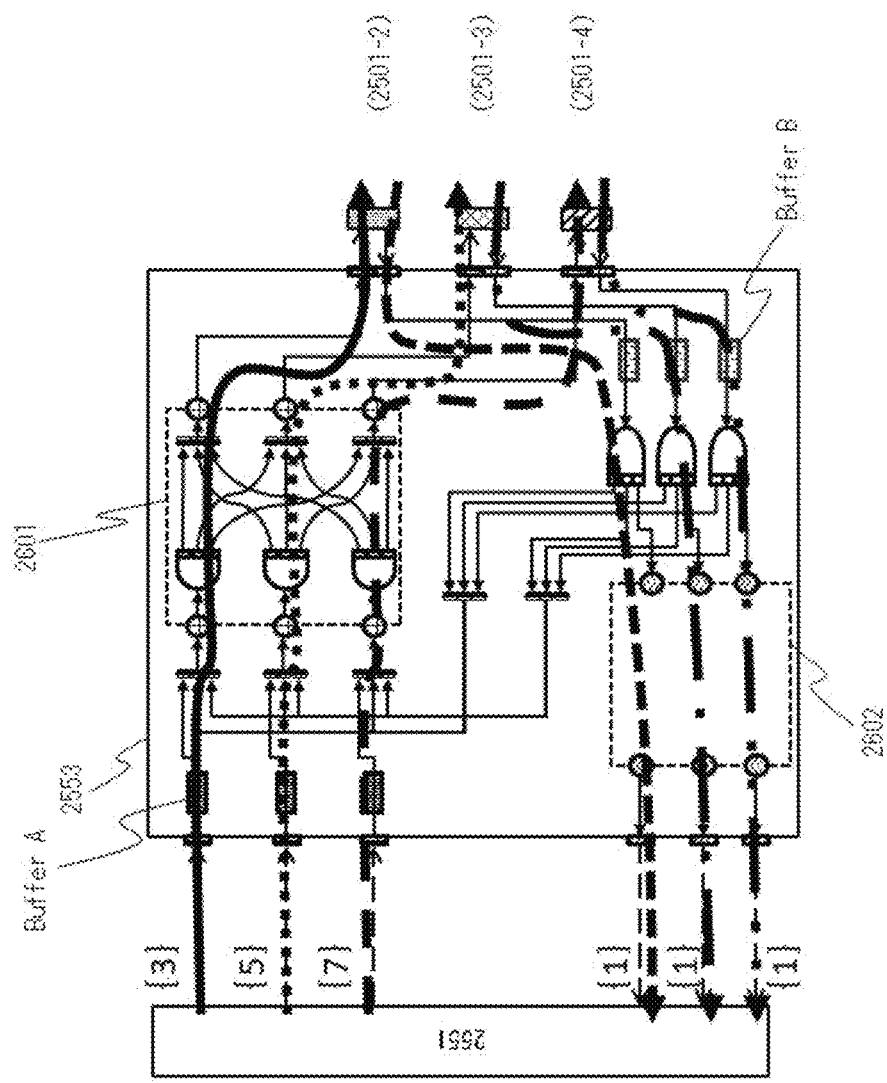

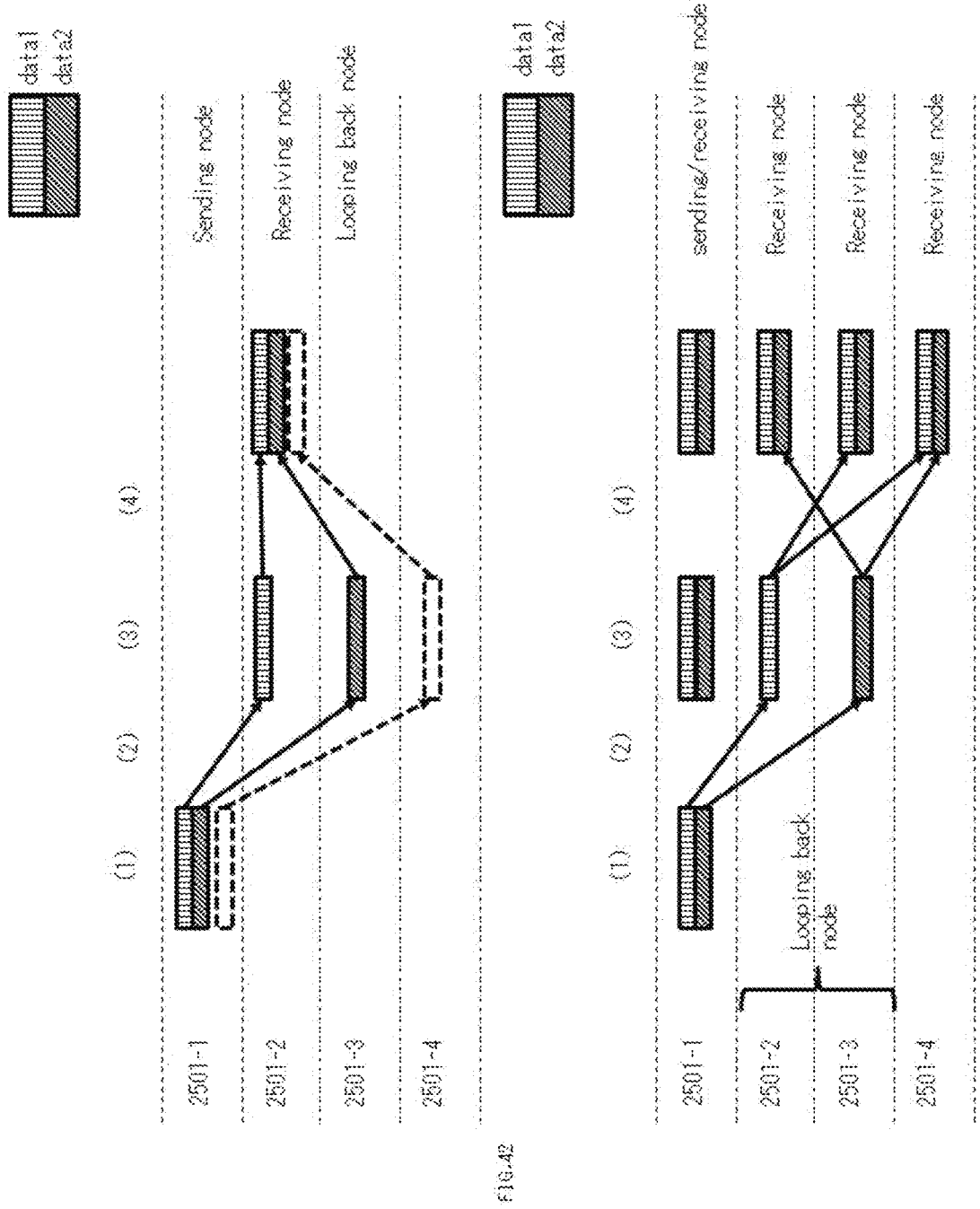

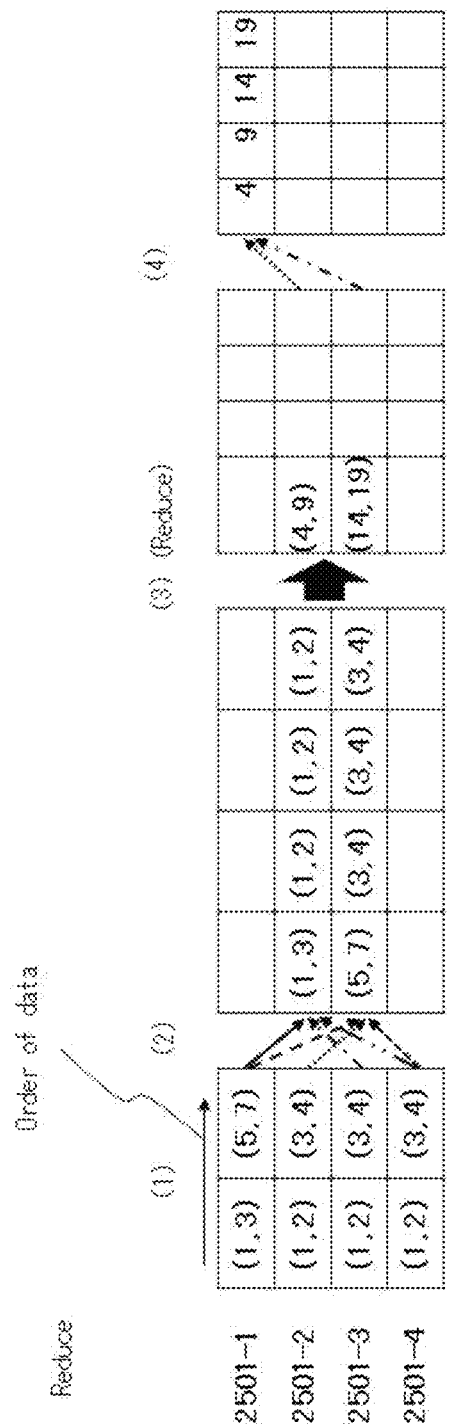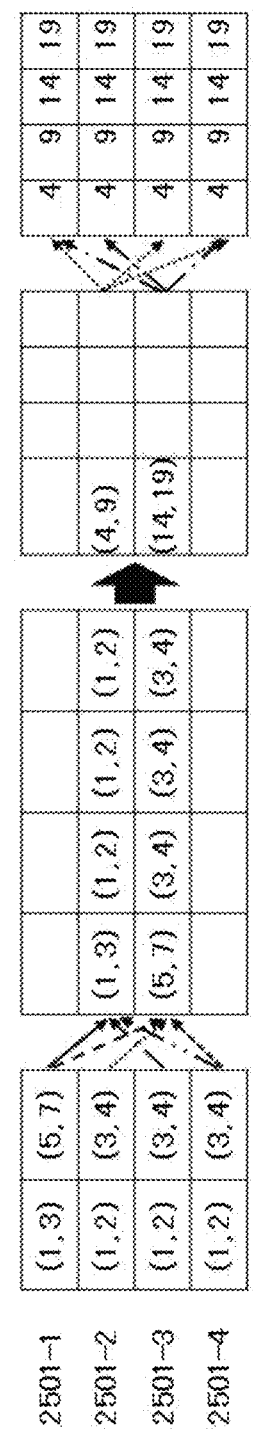

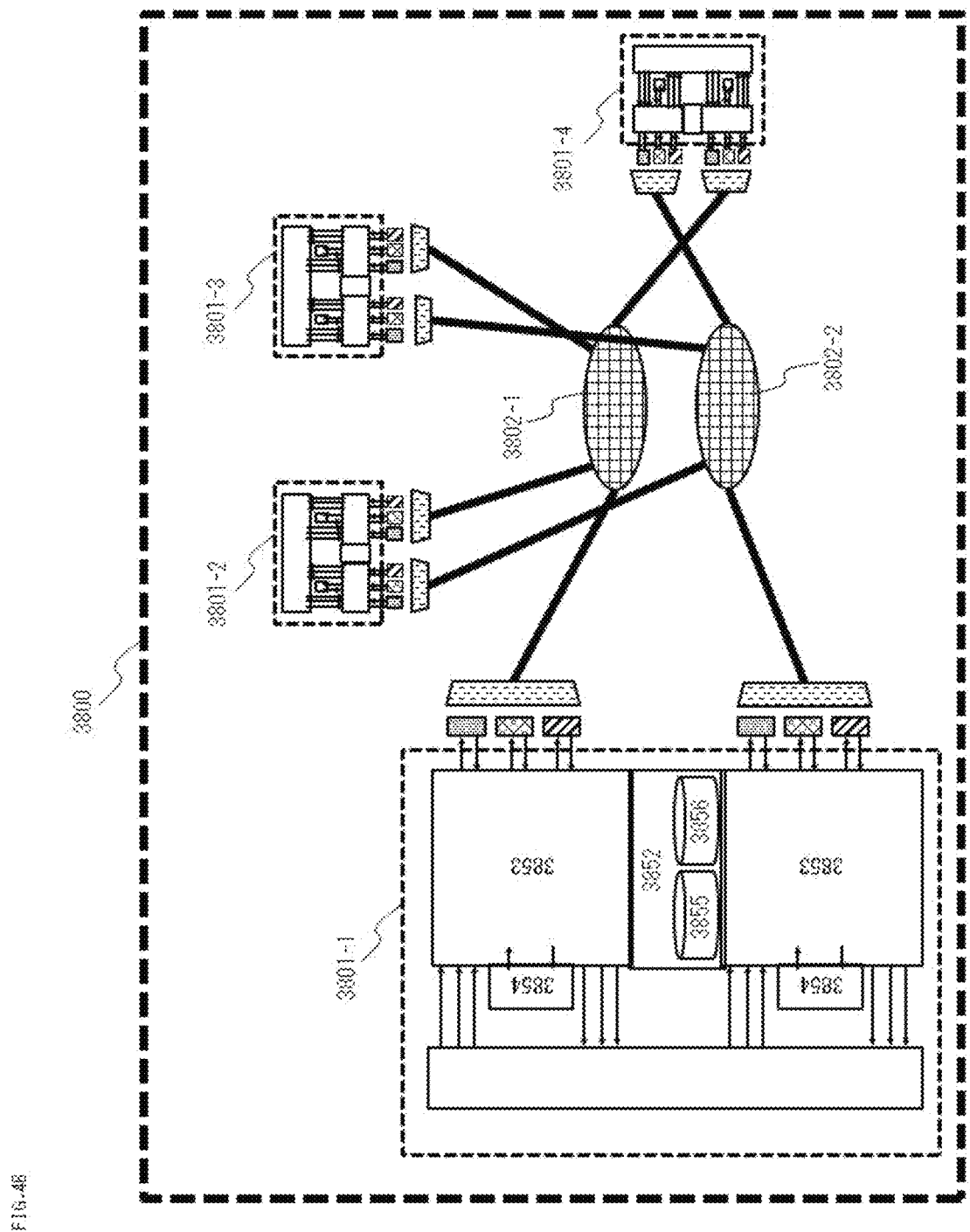

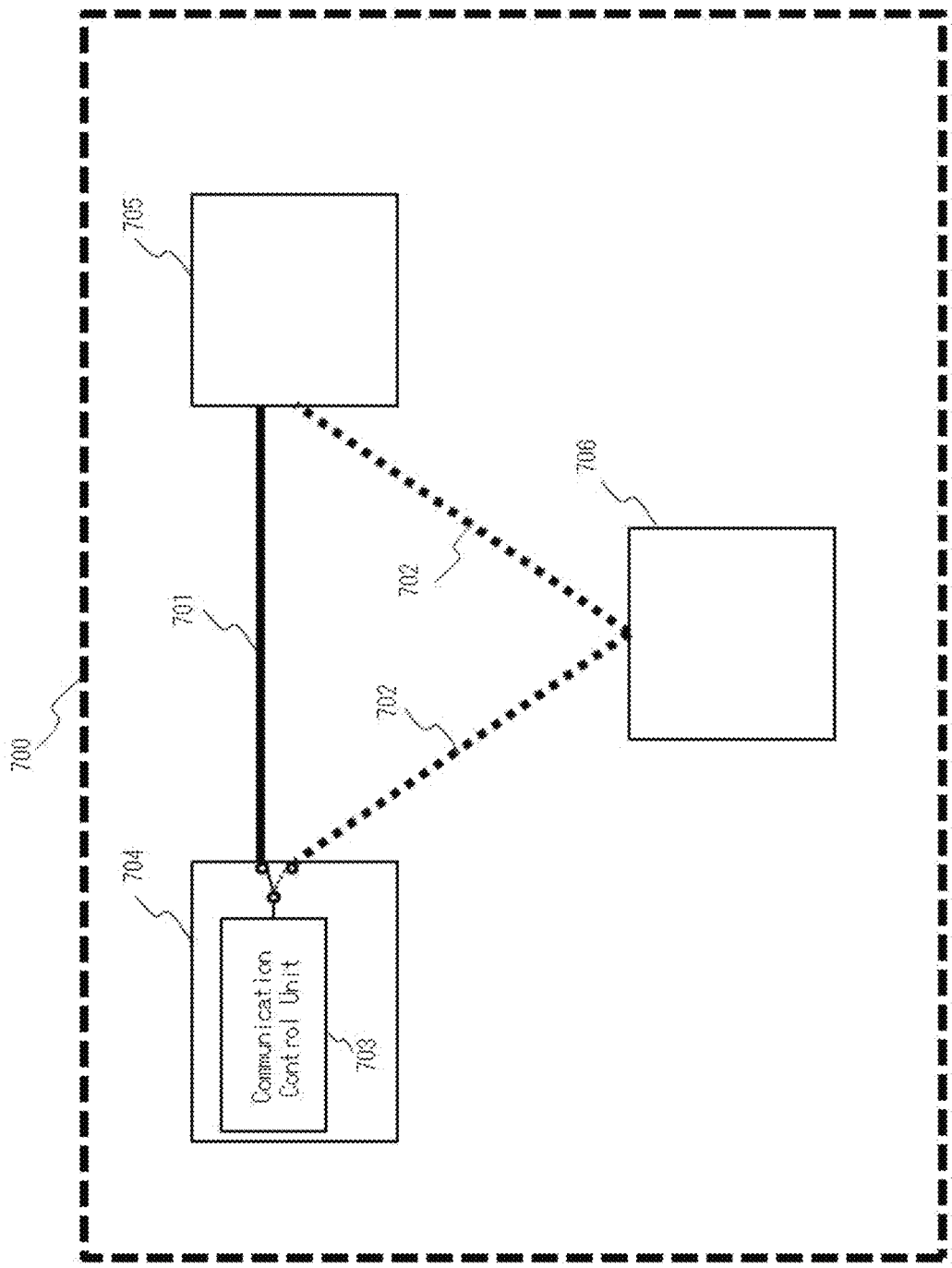

PARALLEL COMPUTER SYSTEM, METHOD OF CONTROLLING A PARALLEL COMPUTER SYSTEM, AND A NON-TEMPORARY COMPUTER-READABLE MEDIUM THAT STORES A PROGRAM

INCORPORATION BY REFERENCE

This application claims the benefits of priority based on Japanese Patent Application No. 2018-172320 for which application was submitted on Sep. 14, 2018 and incorporates by citation all of the disclosures of that application.

TECHNICAL FIELD OF THE INVENTION

The present invention relates to a parallel computer system, a method of controlling a parallel computer system, and to a non-temporary computer-readable medium on which a program is stored.

BACKGROUND ART

In a parallel computer system, a program can be executed at high speed by carrying out computation in parallel using a plurality of CPU (Central Processing Unit) cores. An example of the configuration of a related parallel computer system is here described while referring to FIG. 1. FIG. 1 shows an example of the configuration of a related parallel computer system.

Computation nodes 101-1 to 101-8 (in the following explanation, also referred to as simply "computation nodes 101") that make up parallel computer system 100 each have at least a processor having at least one or a plurality of computer cores and memory that is connected by wide bandwidth to this processor. As shown in FIG. 1, each of the plurality of computation nodes 101 of related parallel computer system 100 are then connected to electrical switch 103 by way of links 102. This plurality of computation nodes 101 then performs parallel computation. Although a flat-tree network is shown in FIG. 1, a plurality of topologies such as the ring topology or the torus topology are used.

In parallel computation, higher speed is important not only in point-to-point communication carried out between two computation nodes, but higher speed is also important in collective communication in which data are simultaneously exchanged among three or more computation nodes. Collective communication includes the varieties next described.

First, collective communication includes "multicast" and "broadcast" (these two methods being represented hereinbelow as "multicast") in which data are distributed to a plurality of computation nodes. Collective communication further includes "reduce" or "allreduce" in which data that are in each computation node are collected in one or a plurality of computation nodes, and moreover, arithmetic operations are carried out. Still further, collective communication includes "scatter" in which different data that are in one computation node are distributed to other computation nodes. Collective communication further has "gather" in which different data that are in each computation node are collected in one computation node. Still further, collective communication has "all-to-all" (total exchange) in which different data are exchanged among a plurality of computation nodes.

In multicast and reduce (allreduce), as well as in scatter and gather, the communication processes are reversed (with the exception of operations) and the communication time is the same.

Collective communication that is actually in use is next introduced by taking as an example the parallel computation learning of Deep Learning, which is one type of artificial intelligence. "Model Parallel" and "Data Parallel" are two types of learning methods that use the parallel computation of deep learning. Model parallel divides the neural network itself. Model parallel then carries out computation at each of the different computation nodes 101. Model parallel implements "allgather" of the computation results for each layer of each neural network. Model parallel then shares the computation results in each computation node.

Data parallel, on the other hand, divides a plurality of items of input data. Data parallel carries out computation of the same neural network in a plurality of computation nodes 101. In this case, in order to optimize the parameters of the neural network, the amount of change of parameters is collected in one computation node by performing gather and reduce in data parallel. Data parallel then multicasts the parameters themselves to a plurality of computation nodes.

Typically, the communication time can be shortened by increasing the bandwidth of links 102 between each computation nodes 101 and electric switch 103. However, collective communication that carries out a plurality of communications at one time is prone to the occurrence of congestion in the network. Additionally, in a worst case, a portion of the data may also suffer loss in collective communication in which a plurality of communications is carried out at one time. In this case, the data must be resent. When data are resent, even more time must be expended in the exchange of data. As a result, the speed of collective communication cannot be raised despite the increase of the bandwidth of links 102.

One method of raising the speed of collective communication involves circumventing congestion by dividing communication into a plurality of steps in a tree structure as shown in FIG. 2 and performing communication in order. In this method, however, the increase in the communication count becomes problematic. For example, assuming that L is the delay in one instance of communication and that M is the number of necessary communication steps in collective communication, a large delay of M×L occurs for the entire collective communication. In a network of tree structure in which, as the existing computation nodes 101, N nodes from computation node 101-1 to computation node 101-N are connected as shown in FIG. 2 (in the case of FIG. 2, N=8), the number M of communication steps is proportional to at least $\log_2 N$. Accordingly, the increase of delay due to this number M of communication steps cannot be ignored. In addition, the number M of communication steps in a network of ring form or torus form is even greater.

In response to this problem, IBM (International Business Machines Corporation) has proposed a method (Patent Document 1: US Patent Application No. 2011/270942 Specification) in which a separate low-delay network in which the communication count is limited is prepared for control purposes. According to this method, a dedicated network for control in which the number M of communication steps is small is prepared apart from the network for data communication. More specifically, instruction text relating to memory access (read/write) is distributed in advance using the dedicated network. This scheme enables preparation of a memory in which the reception of messages is faster. As a result, the communication delay can be reduced. The proposed method next described is also a method of further reducing the communication count. This is a method of interconnecting all of the computation nodes by directly connected full mesh. In this method, collective communication is realized in one instance. When full-mesh connection is realized by electrical wiring, the problem arises that the amount of wiring becomes extremely great. However, methods have been proposed for realizing full-mesh connection with a limited amount of wiring by using a cyclic AWG (Arrayed Waveguide Grating) (Patent Document 2: Japanese Patent No. 3292843 and Patent Document 3: U.S. patent Ser. No. 09/401,774 Specification).

The technology described in Patent Document 1 necessitates the preparation of a plurality of networks and therefore results in a large increase in network costs. The technology described in Patent Document 1 further necessitates simultaneous management of a plurality of networks, resulting in large management costs. In particular, in a parallel computer system, parallel processing must be realized at high speed, and this high speed therefore requires a high degree of synchronicity. However, the time taken for this synchronicity adds to the communication delay.

On the other hand, an issue in a system having the full-mesh connection described in Patent Document 2 and Patent Document 3 is the small bandwidth of point-to-point communication. FIG. 3 shows an example of parallel computer system 300 in which N computation nodes 301 are full-mesh connected (in the case of FIG. 3, N=8). N−1 bidirectional links 302 lead out from each of computation nodes 300-*x* (where x is an integer equal to or greater than 1). These N−1 bidirectional links 302 are connected to mutually differing computation nodes 301. For example, if the bandwidth for one direction of one link is 20 Gbps, the total bandwidth supplied from one computation node 301 is as great as 140 Gbps. However, the bandwidth of links between each of computation nodes 301 is a mere 20 Gbps.

Communication that uses a normal network uses one link in which the path is the shortest based on the address information of the sending destination that is appended to the data. For example, a case will be considered in which a message is to be sent by point-to-point communication from computation node 1 301-1 to computation node 5 301-5. In this case, the network communication uses only the single line of link 351 based on the address information of computation node 5 301-5. During that time, the other six links 352-357 are in a standby state. Accordingly, the utilization efficiency of the links is poor.

NTT (Nippon Telegraph and Telephone Corporation) has proposed a method in which, in the event of an increase in traffic, the excessive portion of the traffic is routed to another path (Non-Patent Document 1: Harada Keiji et al. "Development of Star-Type WDM Systems," (online) October 2003, NTT Technical Journal. URL: http://www.ntt.co.jp/journal/0310/files/jn200310046.pdf)

However, this method carries out redesign of a network that considers detour paths after the occurrence of congestion due to insufficient bandwidth. Accordingly, this redesign entails a considerable amount of time and therefore this method cannot be used in parallel computation.

SUMMARY OF THE INVENTION

The parallel computer system of the present invention is provided with: a direct link that forms a direct connection between a sending node and a receiving node; a one-hop link that forms a connection between the sending node and the receiving node via a return node other than the sending node and the receiving node; and a communication control means that, when transferring data from the sending node to the receiving node, selects the link that connects the sending node and the receiving node from among a link that uses only the direct link, a link that uses only the one-hop link, and a link that forms a connection combines and uses the direct link and the one-hop link.

The method of controlling a parallel computer system of the present invention has a process of, when transferring data from a sending node to a receiving node, selecting a link that connects the sending node and the receiving node from among: a link that uses only a direct link that forms a direct connection between the sending node and the receiving node, a link that uses only a one-hop link that forms a connection between the sending node and the receiving node via a return node other than the sending node and the receiving node, and a link that forms a connection combines and uses the direct link and the one-hop link.

Finally, a non-temporary computer-readable medium on which is stored a program of the present invention causes a computer to execute a process of, when transferring data from a sending node to a receiving node, selecting a link that connects the sending node and the receiving node from among a link that uses only a direct link that forms a direct connection between the sending node and the receiving node, a link that uses only a one-hop link that forms a connection between the sending node and the receiving node via a return node other than the sending node and the receiving node, and a link that forms a connection combines and uses the direct link and the one-hop link.

An example object of the invention is to provide a parallel computer system, method of controlling a parallel computer system, and a non-temporary computer-readable medium that stores a program that can raise the utilization efficiency of communication while using simple control and short the communication time in parallel computation in a parallel computer system that is connected by full mesh.

BRIEF DESCRIPTION OF THE DRAWINGS

FIG. 8 is a schematic view showing an example of the configuration of the parallel computer system of the second example embodiment.

FIG. 9 is a schematic view showing an example of point-to-point communication that uses a one-hop link in the parallel computer system of the second example embodiment.

FIG. 18 is a view for explaining the second step of the receiving node of the example of distributed switch connection in multicast communication of the third example embodiment.

FIG. 20 shows an example of the communication management table of the third example embodiment.

FIG. 21 shows an example of the link management table of the third example embodiment.

FIG. 25 shows an example of the communication management table of the third example embodiment.

FIG. 26 shows an example of the link management table of the third example embodiment.

FIG. 27 shows an example of the communication management table of the third example embodiment.

FIG. 28 shows an example of the link management table of the third example embodiment.

FIG. 30 shows an example of the communication management table of the third example embodiment at the time of completion of one communication.

FIG. 31 shows an example of the link management table of the third example embodiment at the time of completion of one communication.

FIG. 32 shows an example of the flow of scatter data at the time of executing a plurality of programs in the third example embodiment.

FIG. 33 is a schematic view showing an example of the configuration of the parallel computer system of the fourth example embodiment.

FIG. 34 is a schematic view showing an example of the configuration of the distributed switch of the fourth example embodiment.

FIG. 35A shows an example of the flow of reduce data of the fourth example embodiment.

FIG. 35B shows an example of the flow of allreduce data of the fourth example embodiment.

FIG. 36 shows an example of the flow of distributed switch data in the first communication of reduce in the fourth example embodiment.

FIG. 41 shows an example of the flow of data in the point-to-point communication of the sixth example embodiment.

FIG. 42 shows an example of the flow of data in multicast communication in the sixth example embodiment.

FIG. 43 shows an example of the dependence of communication time upon data size in multicast communication in the sixth example embodiment.

FIG. 44A shows an example of the flow of data in reduce in the sixth example embodiment.

FIG. 44B shows an example of the flow of data in allreduce in the sixth example embodiment.

FIG. 46 is a schematic view showing an example of the configuration of the parallel computer system of the seventh example embodiment.

FIG. 47 is a schematic view showing an example of the configuration of the parallel computer system of the eighth example embodiment.

EXAMPLE EMBODIMENT

A First Example Embodiment

A detailed explanation of the first example embodiment of the present invention is next presented with reference to the accompanying drawings.

Figure 4:
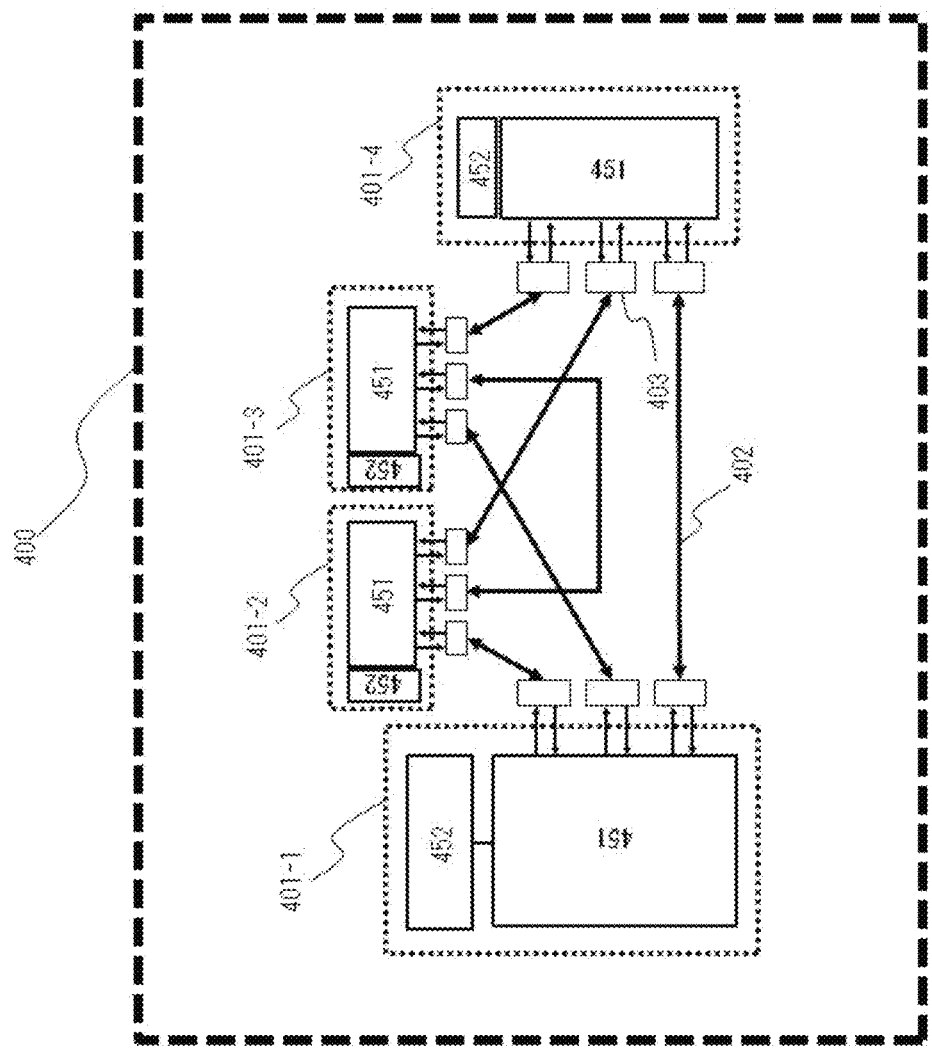
FIG. 4 is a schematic view showing an example of the configuration of a parallel computer system of the first example embodiment.

FIG. 4 is a schematic view showing an example of the configuration of parallel computer system 400 of the first example embodiment of the present invention. In the interest of simplification, the number N of computation nodes is four. In parallel computer system 400, each of N computation nodes 401 is connected to a plurality of transceivers 403. In addition, parallel computer system 400 is a system in which the N computation nodes 401 are each directly linked by a plurality of cables 402. Computation nodes 401 each have at least processor/memory 451 and communication control unit 452.

Communication control unit 452 has the function of determining the link to be used when point-to-point communication is to be carried out by computation node 401. Explanation here regards direct links and one-hop links. In communication of data between two or more different computation nodes, a direct link is a link with at least one computation node that is directly connected. A one-hop link is a link by way of at least one computation node. Communication control unit 452 has the function of determining the links that connect between computation nodes in communication of data between two or more different computation nodes. Links that connect between computation nodes include links that use only a direct link, links that use only a one-hop link, and links that combine and use a direct link and one-hop link.

For example, communication control unit 452 may determine links to be used in accordance with the amount of data that are to be transferred between computation nodes in data communication between two or more different computation nodes. In other words, depending on the amount of data that are to be transferred among two or more differing computation nodes, a link for which the time required for transfer is short is determined as the link that connects between the computation nodes. Links that connect between computation nodes include links that use only a direct link, links that use only a one-hop link, and links that combine and use a direct link and a one-hop link.

In addition, in communication of data between two or more different computation nodes, communication control unit 452 also has the function of selecting a link group that is made up of one or more links for which the communication time is short from among combinations of direct links and one-hop links.

Figure 5:
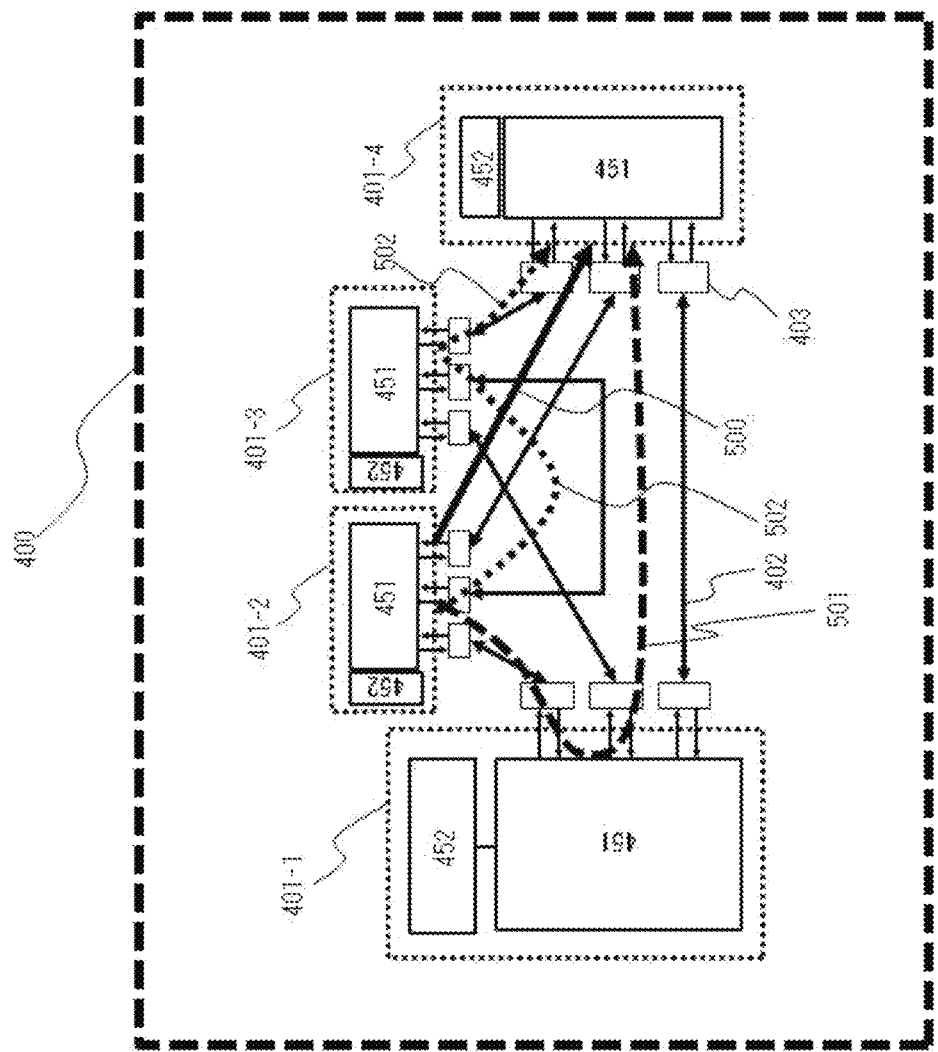
FIG. 5 is a schematic view showing an example of point-to-point communication that uses a one-hop link in the parallel computer system of the first example embodiment.

For example, as shown in FIG. 5, when sending a large capacity of data (>80 Kbit) from computation node 401-2 to computation node 401-4, communication control unit 452 not only sets direct link 500 but also sets computation nodes 401-1 and 401-3 that originally had no relation to the point-to-point communication as return nodes. Communication control unit 452 then determines to also use one-hop links 501 and 502 by way of the return nodes. Alternatively, when sending a small capacity of data (≤80 Kbit), communication control unit 452 determines to also use only direct link 500. Communication control unit 452 determines the standard for determining whether the data size is a large capacity or a small capacity after having measured the relation between the data size and the communication time of point-to-point communication.

The judgment of whether to apply one-hop links is thus performed in the present example embodiment on the basis of the data size. In this way, a high-speed parallel computer system can be provided regardless of the data size.

Figure 6:
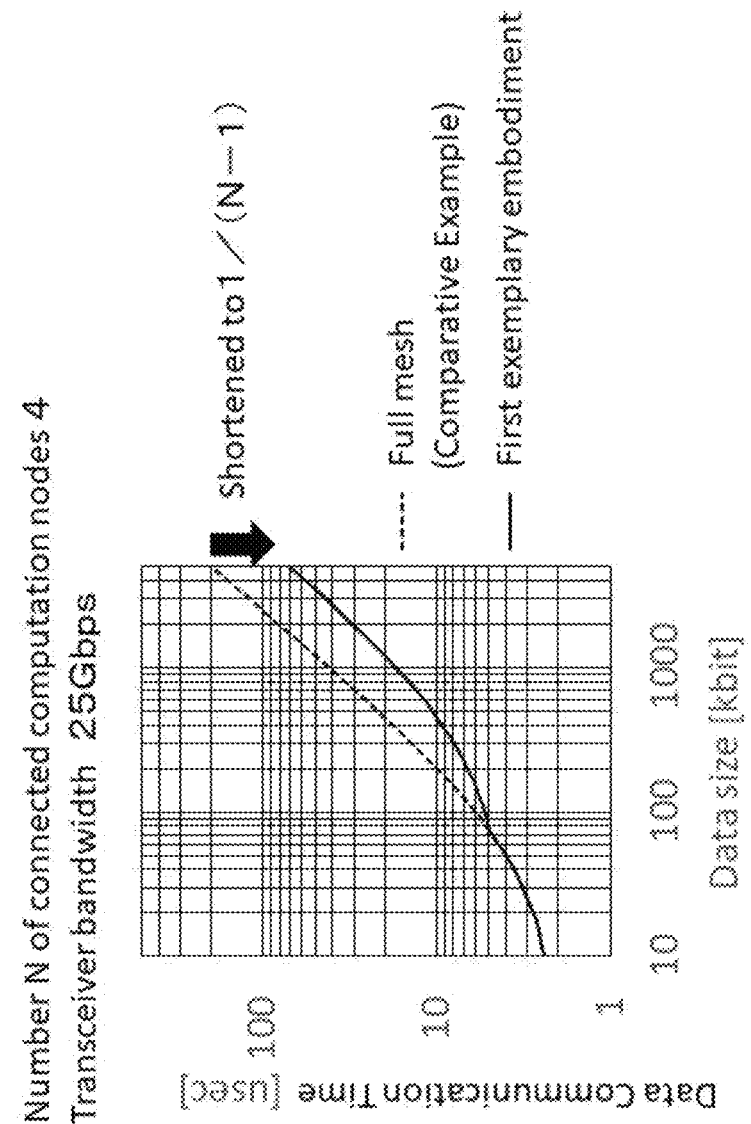
FIG. 6 shows an example of the dependence of communication time upon the data size in point-to-point communication of the first example embodiment.

FIG. 6 shows the relation between the communication time and data size of point-to-point communication in the present example embodiment. In parallel computer system 300 that has full-mesh connection in a comparative example (FIG. 3), the data communication time is restricted by the bandwidth of a direct link when the data size is great, whereby the data communication time increases. In the present example embodiment, a maximum of (N−2) one-hop links 501 and 502 can be utilized, whereby combination with the direct link enables a broader bandwidth that is increased by (N−1) times. In this way, the data communication time can be reduced to 1/(N−1) compared to the comparative example.

Although FIG. 4 shows the functions inside computation nodes 401 as blocks, each function unit need not be an individual device or chip. For example, communication control unit 452 may be inside the chip of processor/memory 451.

In addition, a known configuration can be applied for processor/memory 451. For example, processor/memory 451 can be constituted by a processor such as Xeon of Intel Corporation in which a plurality of large-capacity DDR4 SDRAM (Double-Data-Rate 4 Synchronous Dynamic Random Access Memory) memories are connected. Alternatively, processor/memory 451 can be constituted by a processor such as Xeon Phi in which more arithmetic cores are mounted. Still further, processor/memory 451 can be constituted by a GPGPU (General-Purpose Computing on Graphics Processing Unit) processor having broad-band memory connected by broadband I/O (input/output) such as HBM (High Bandwidth Memory) connected to Intel Corporation processors. The present invention is not limited by the configuration that is adopted as processor/memory 451.

As described hereinabove, the present example embodiment enables a broader bandwidth of links that utilize one-hop links in a parallel computer system that is connected by full mesh. As a result, the present example embodiment obtains the effect of reducing the communication time.

Control Method of the First Example Embodiment

In the present example embodiment, one of the computation nodes 401-1 is taken as the main computation node such that still unused links can be instantaneously selected.

Figure 7B:
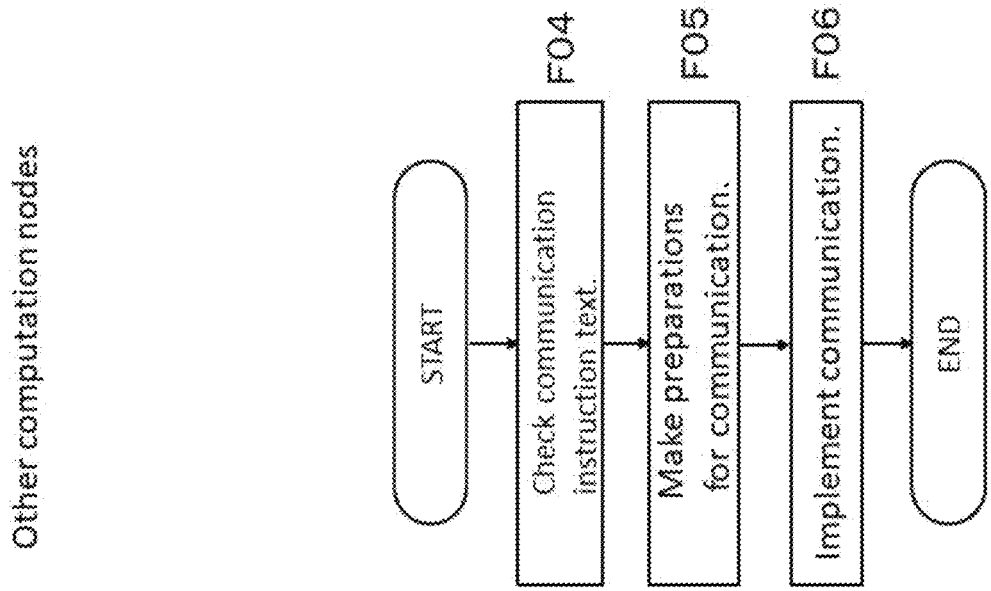
FIG. 7B shows an example of the control flow of another computation node of the parallel computer system of the first example embodiment.
Figure 7A:
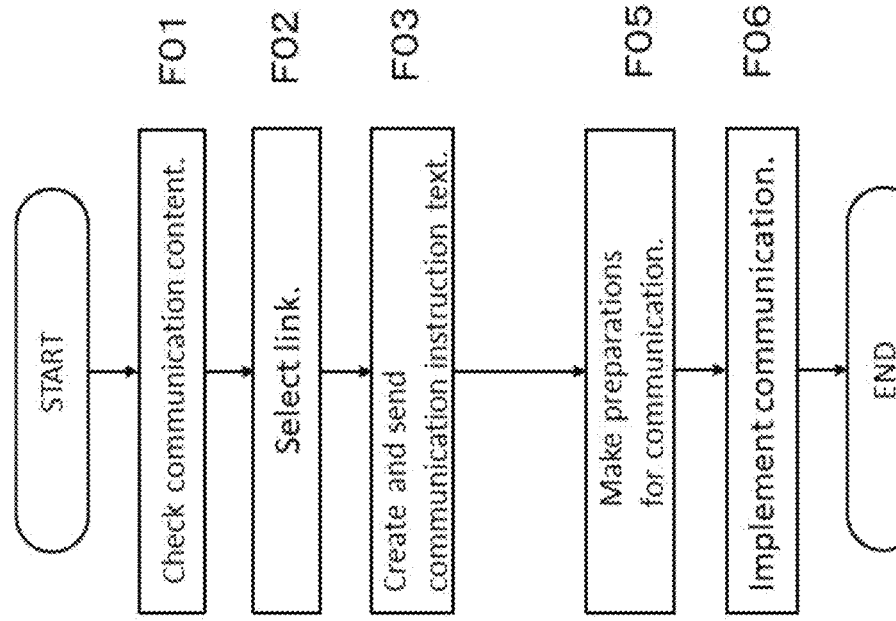
FIG. 7A shows an example of the control flow of the main computation node of the parallel computer system of the first example embodiment.

Processor/memory 451 of computation node 401 then manages the state of use of links and communication among all computation nodes 401 in the present example embodiment. FIG. 7A shows an example of the control flow of main computation node 401-1. FIG. 7B shows an example of the control flow of the other computation nodes 401.

Flow: F01

The operation of main computation node 401-1 is first described. In FIG. 7A, main computation node 401-1 executes a parallel computation program that operates in processor/memory 451. When communication between computation nodes 401 is necessary during the execution of the parallel computation program, processor/memory 451 presents the content of this communication to communication control unit 452. Communication control unit 452 then checks the content of the communication.

Flow: F02

Communication control unit 452 of main computation node 401-1 selects a link group that is to be used in communication (hereinbelow referred to as a "communication link group") on the basis of the state of use of links and the content of communication that is to be implemented. In the selection of a communication link group, communication control unit 452 first selects direct links.

In the case of point-to-point communication, communication control unit 452 next takes as return nodes computation nodes 401 for which links from the sending node and links to receiving nodes are still unused. Communication control unit 452 then takes as one-hop links those links from the sending node to the receiving node that go by way of the return nodes. Communication control unit 452 thus selects one or more one-hop links that can be used.

When only direct links or one-hop links can be used, communication control unit 452 selects the links that can be used in communication link group. On the other hand, when both direct links and one-hop links can be used, communication control unit 452 selects communication links as shown below.

When the communication time by only direct links is shorter than the communication time when communication uses both direct links and one-hop links, communication control unit 452 selects only direct links in the communication link group. When the communication time by only direct links is longer than the communication time when communication uses both direct links and one-hop links, communication control unit 452 selects both direct links and one-hop links in the communication link group.

Flow: F03

Communication control unit 452 of main computation node 401-1 subsequently creates a communication instruction text for communicating by using a communication link group. Communication control unit 452 sends the communication instruction text that was created to the other computation nodes 401. The communication link group noted in the communication instruction text that main computation node 401-1 has sent may be in use in other communication. Accordingly, main computation node 401-1 prepares dedicated headers when sending the communication instruction text. The communication format for sending the communication instruction text is assumed to be a format that is prioritized over other communication. Explanation next regards the operation of the other computation nodes 401. In FIG. 7B, communication control units 452 of the other computation nodes 401 that receive the communication instruction text, upon checking these dedicated headers, prioritize the execution of the operation of the communication instruction text (Flow: F04). Computation nodes 401 are full-mesh connected. The full-mesh connection here refers to a state in which computation nodes 401 are all individually connected using the above-described direct links. Accordingly, main computation node 401-1 is able to send the communication instruction text to all computation nodes 401 all at once. The communication instruction text may be only an instruction relating to the links used by each of computation nodes 401. Accordingly, the data size of the communication instruction text may be as small as 2N that is the number of transmission/reception links. As a result, the time required for sending the communication instruction text is short. The effect upon the data communication time axis of sending the communication instruction text is negligible.

Flow: F04 and F05

Communication control units 452 of the computation nodes 401 other than main computation node 401-1 receive the communication instruction text that was sent from main computation node 401-1. Communication control units 452 of the other computation nodes 401 then check the links that are in use. Communication control units 452 of the other computation nodes 401 further set the processor/memories 451 together with the communication instruction sent to their own nodes. In this way, communication control units 452 of other computation nodes 401 carry out the preparations for communication.

Flow: F06

After the preparations for communication have been completed, main computation node 401-1 and the other computation nodes 401 then implement communication between computation nodes in accordance with the communication instruction text.

In this way, by executing each flow described in flow: F01 up to flow: F06, a system can be provided that utilizes one-hop links in a parallel computer system in which N computation nodes 401 are connected by full mesh. In this parallel computer system 400, a number K of return nodes can be set within the range $1 \leq K \leq N-2$. In the present example embodiment, the bandwidth of point-to-point communication can be improved up to a maximum of N−1 times together with direct links as shown in FIG. 6. In the present example embodiment, explanation is presented assuming the preparation of a dedicated header when sending communication instruction text. However, the different method may be used for sending the communication instruction text. For example, main computation node 401-1 that sends the communication instruction text may adopt a method of carrying out parallel computation whereby main computation node 401-1 need not prepare a dedicated header. As a result, a further reduction of the time for sending the communication instruction text becomes possible.

A Second Example Embodiment

The second example embodiment of the present invention is next described in detail while referring to the accompanying drawings.

FIG. 8 is a schematic view showing an example of the configuration of parallel computer system 800 of the second example embodiment of the present invention. In the interest of simplification, the number N of computation nodes is four. The point of difference between parallel computer system 800 of the second example embodiment and the first example embodiment is that each computation node 801 has distributed switch 853 and return function unit 854.

FIG. 9 shows the flow of data during point-to-point communication that uses one-hop links in the second example embodiment. The second example embodiment also, similar to the first example embodiment, uses as a communication link group not only direct link 900 but also one-hop links 901 and 902 that return through computation nodes 801-1 and 801-3 that are not originally related to the point-to-point communication. This return uses the newly added distributed switches 853 and return function units 854 to return data. This return of data is carried out without using memories in the processor/memories 851 of the return node. Accordingly, in the present example embodiment, the effect of the communication load upon computation carried out in processor/memories 851 can be suppressed to the minimum. Still further, the return of data is carried out not by way of the memory of processor/memories 851, and as a result, the delay time in one-hop links can be reduced to 2.1 μsec.

Figure 10:
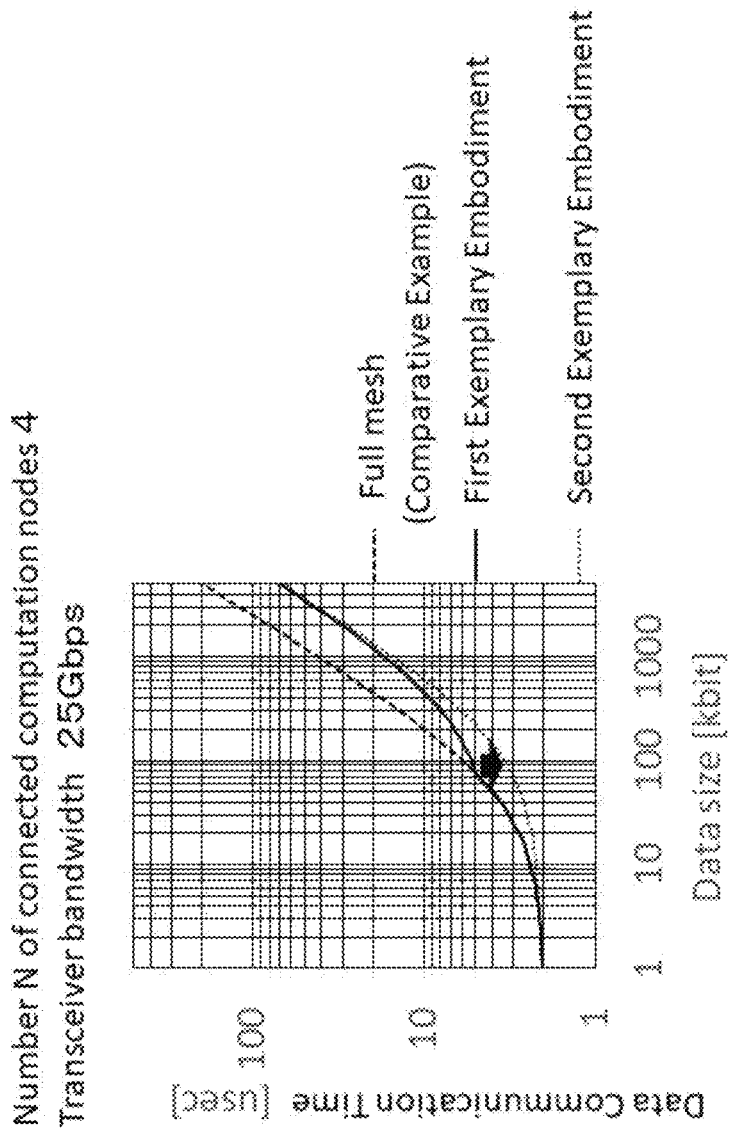
FIG. 10 shows an example of the dependence of communication time upon data size in point-to-point communication of the second example embodiment.

Further, when the return of data is carried out by way of the memory in the return node as in the first example embodiment, a delay time of two passages is added compared to the direct link, whereby a delay of 4 μsec occurs in the first example embodiment. In a one-hop link of the second example embodiment, in contrast, return does not go by way of memory. As shown in FIG. 10, the effect of applying one-hop links (the shortening of the data transfer time) could not be obtained in the first example embodiment unless the data size is 80 Kbit or more. In the present example embodiment, in contrast, the shortening of the data transfer time can be achieved even when the data size is as small as 20 Kbit or more. In other words, communication time can be adequately shortened in the present example embodiment even for a small data size. As a result, one-hop links may be used to perform communication in the present example embodiment without dependence on the data size.

As described hereinabove, the present example embodiment can realize communication that uses one-hop links with little delay by not passing by way of processor/memories that perform operations.

A Third Example Embodiment

The third example embodiment of the present invention is next described in detail with reference to the accompanying drawings.

Figure 11:
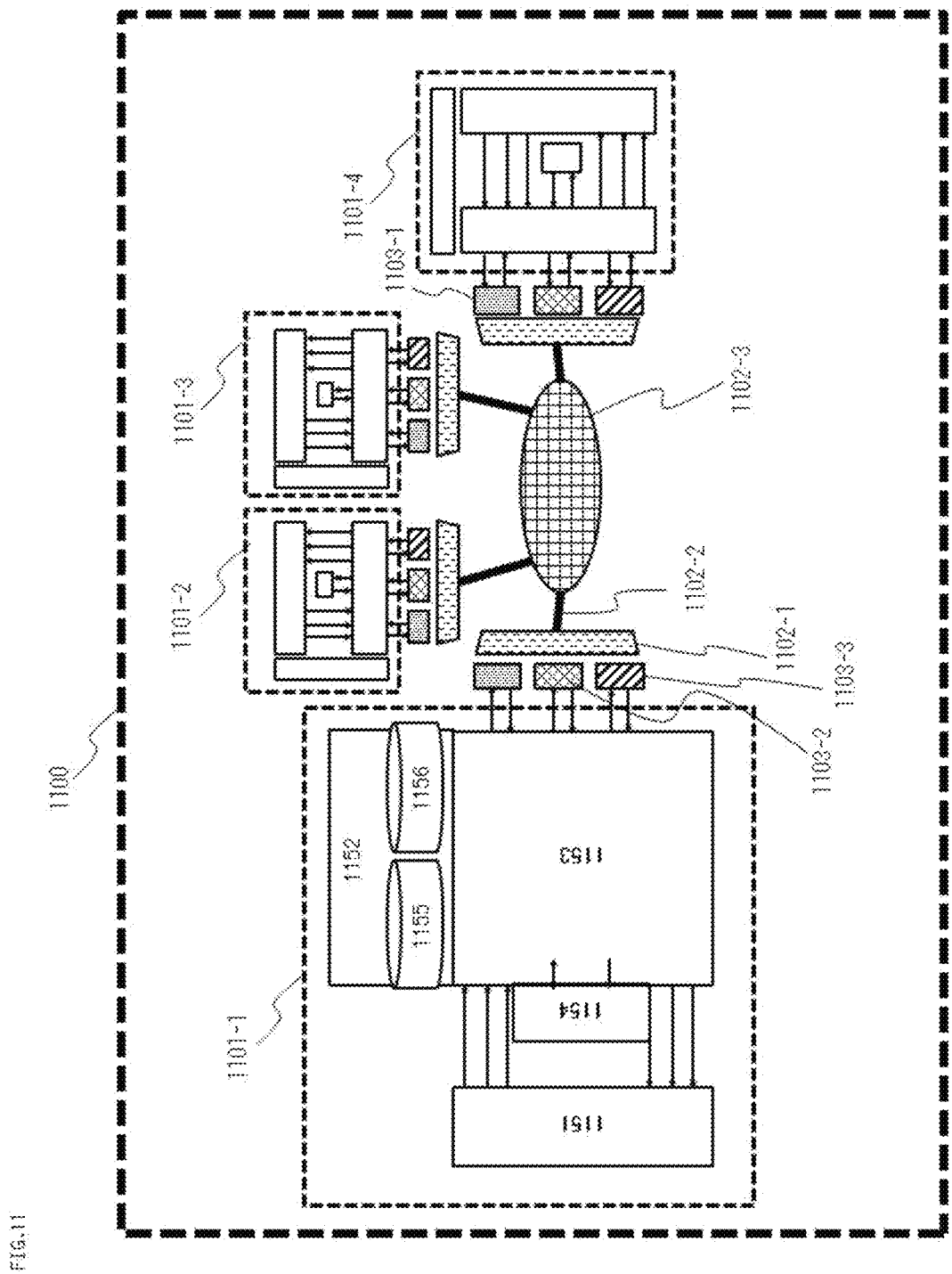
FIG. 11 is a schematic view showing an example of the configuration of the parallel computer system of the third example embodiment.

FIG. 11 is a schematic view showing an example of the configuration of the parallel computer system 1100 of the third example embodiment of the present invention. In the interest of simplification, the number N of computation nodes in the present example embodiment is four. The present example embodiment is a form in which all computation nodes 1101 use an MPI (Message Passing Interface) that performs parallel computation while the same program is operating. An MPI is a standard that is standardized for the use of parallel computing. In addition, an MPI is a standard relating to the interface in one computation node. Known configurations other than MPI can also be used, and the present invention is not limited regardless of the configuration that is adopted.

Parallel computer system 1100 has optical transceivers 1103-1, 1103-2, and 1103-3 of differing wavelengths λ1, λ2, and λ3 as the transceivers that connect computation nodes 1101. Parallel computer system 1100 further has AWGs 1102-1 that wavelength-multiplex optical signals of a plurality of wavelengths. Still further, parallel computer system 1100 has cyclic AWG 1102-3 that connects AWGs 1102-1 that wavelength-multiplex optical signals of a plurality of wavelengths. Finally, parallel computer system 1100 has optical fibers 1102-2 that connect between AWG 1102-1 and cyclic AWG 1102-3.

The wavelength of optical transceivers 1103 is determined according to the routing characteristics of cyclic AWG 1102-3 as is disclosed in Patent Documents 1 to 3 and Non-Patent Document 1. Each of computation nodes 1101 of parallel computer system 1100 of the present example embodiment are then full-mesh connected. Related computer system 300 of full-mesh connection shown in FIG. 3 requires approximately $N^2$ optical fibers. As a consequence, in related computer system 300 of full-mesh connection shown in FIG. 3, the number of optical fibers becomes extremely numerous as the N increases. As a result, in related computer system 300 of full-mesh connection shown in FIG. 3, the network construction cost becomes large-scale. In contrast, in parallel computer system 1100 of the present example embodiment, the number of optical fibers 1102-2 can be limited to 2N, whereby the network construction costs can be drastically reduced in parallel computer system 1100 of the present example embodiment. Further, cyclic AWG 1102-3 allows easy expansion of the number of ports to 40×40. Accordingly, the number N of computation nodes that can be accommodated increases to 40 in the present example embodiment. By adopting the form disclosed in Patent Document 3, N can be increased to 80 or 120.

The present example embodiment thus adopts a configuration in which computation nodes are connected to cyclic AWG by way of AWGs and optical fibers, whereby the present example embodiment allows a reduction of the number of optical fibers compared to a parallel computer system in which computation nodes are full-mesh connected. Still further, the present example embodiment can reduce wiring costs.

In parallel computer system 1100, communication control unit 1152 and distributed switch 1153 are mounted on a single integrated element, whereby parallel computer system 1100 is of a configuration in which distributed switch 1153 can be directly and rapidly controlled from communication control unit 1152. Still further, parallel computer system 1100 has memory in communication control unit 1152. This memory stores communication management table 1155 for managing communication that occurs in parallel computer system 1100 and link management table 1156 for managing all links that connect the computation nodes. Communication control unit 1152 accesses these management tables at high speed. Communication control unit 1152 then selects links that use distributed switch 1153. In the present example embodiment, a link selection operation was realized at a high speed of several tens of nanoseconds.

The present example embodiment thus allows communication control unit 1152 to access distributed switch 1153, communication management table 1155, and link management table 1156 at high speed, whereby instantaneous link selection and setting can be achieved.

In the present example embodiment, processor/memory 1151 and distributed switch 1153 are connected together by a common bus. In addition, N−1 ports of the common bus are prepared that are equal in number to the number of computation nodes that are connected in the present example embodiment. In this way, connections with the other N−1 computation nodes 1101 can be subjected to link control independently. In the present example embodiment, the high-speed exchange of messages can be realized with other N−1 computation nodes 1101 by way of memory. In addition, processor/memory 1151 and distributed switch 1153 may be connected as will be described hereinbelow. For example, the combination of a processor and distributed switch 1153 and the combination of memory and distributed switch 1153 may be connected together by an independent bus. Adopting this connection method results in an increase of the switch scale of crossbar switches that are prepared in distributed switch 1153 and that are to be described hereinbelow. However, adopting this connection method eliminates the need for bus control and can therefore reduce the communication delay.

Figure 12:
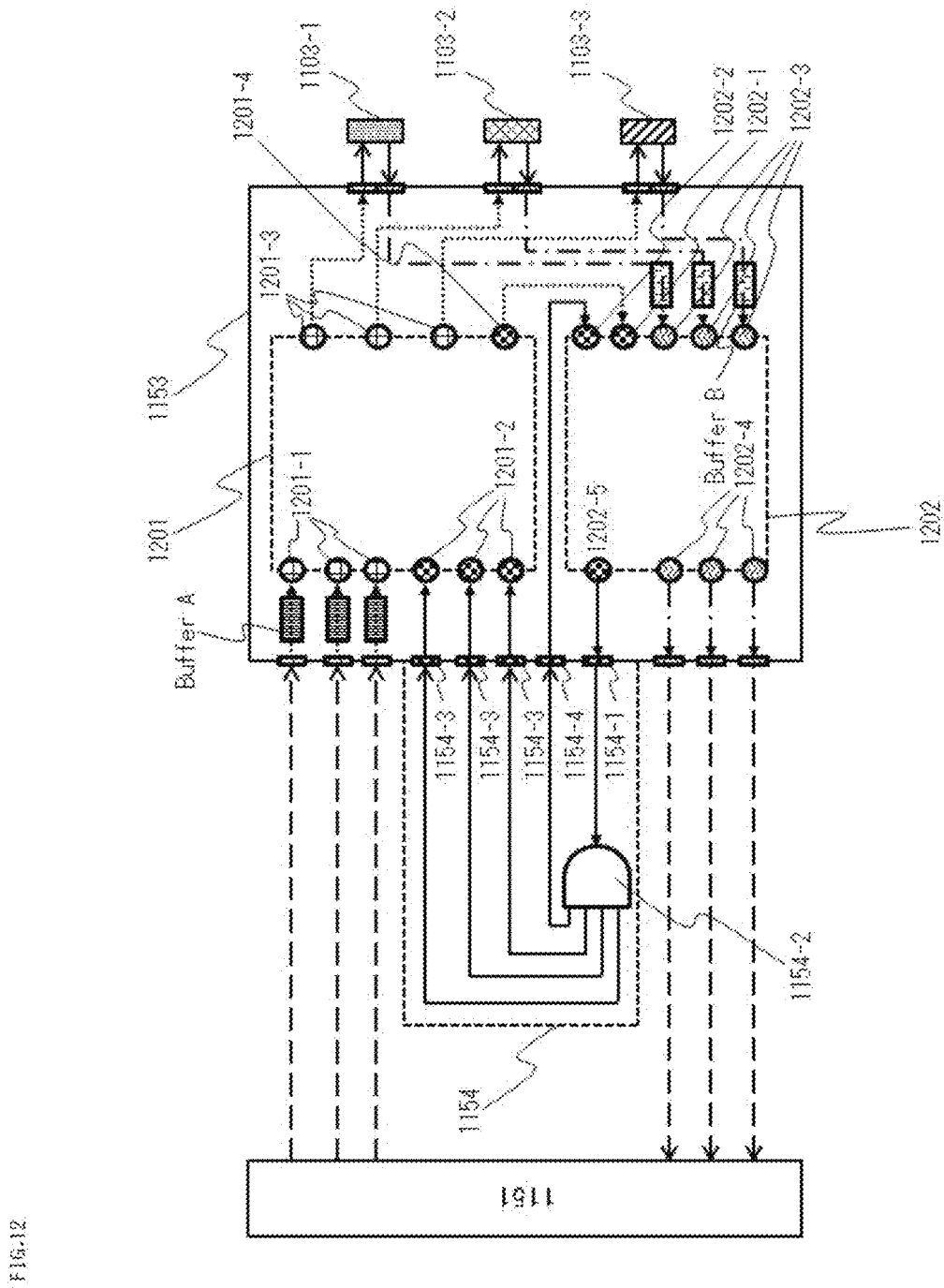
FIG. 12 is a schematic view showing an example of the configuration of the distributed switch and the return function unit of the third example embodiment.

FIG. 12 shows an example of the configuration of distributed switch 1153 and return function unit 1154.

Return function unit 1154 has port 1154-1, distributor 1154-2, and N output ports 1154-N. Port 1154-1 receives a signal from distributed switch 1153. Distributer 1154-2 N-way distributes the received signal (in the case of FIG. 12, N=4). Output ports 1154-N again return data to distributed switch 1153.

Of the N output ports 1154-N, N−1 output ports 1154-3 are ports for sending data to other computation nodes 1101. The remaining one output port 1154-4 is a port for returning data to its own computation node 1101. In this way, the function of simultaneously returning a plurality of items of data at high speed is realized without rewriting memory.

Distributed switch 1153 has two crossbar switches: crossbar switch 1201 for transmission and crossbar switch 1202 for reception.

Of the input ports of transmission crossbar switch 1201, N−1 input ports 1201-1 are connected with processor/memory 1151. The remaining N−1 input ports 1201-2 are connected with the N−1 output ports 1154-3 that are the output ports of return function unit 1154. Of the output ports of transmission crossbar switch 1201, N−1 output ports 1201-3 are connected with the transmitters of optical transceivers 1103 that are connected with outside computation nodes 1101. One output port 1201-4 is connected with input port 1202-1 that is one input port of reception crossbar switch 1202. Of the other input ports of reception crossbar switch 1202, one input port 1202-2 is connected with output port 1154-4 of return function unit 1154. The remaining N−1 input ports 1202-3 of reception crossbar switch 1202 are then connected to receivers of N−1 optical transceivers 1103 that are connected to outside N−1 computation nodes 1101. The N−1 output ports 1202-4 of reception crossbar switch 1202 are connected to processor/memory 1151. The remaining one output port 1202-5 of reception crossbar switch 1202 is connected to input port 1154-1 of return function unit 1154.

Communication control unit 1152 (FIG. 11) packetizes in appropriate size the data that are necessary for communication between computation nodes 1101. In addition, communication control unit 1152 has the function of adding a control signal for communication between computation nodes 1101 and the function of reading control signals. Distributed switch 1153 disposes buffer A on the side that faces processor/memory 1151 of input ports 1201-1 of transmission crossbar switch 1201. This arrangement is for realizing the function of adding a control signal and the function of reading the control signal. In addition, distributed switch 1153 disposes buffer B on the side that faces computation nodes 1101 of input ports 1202-3 of reception crossbar switch 1202.

Figure 13:
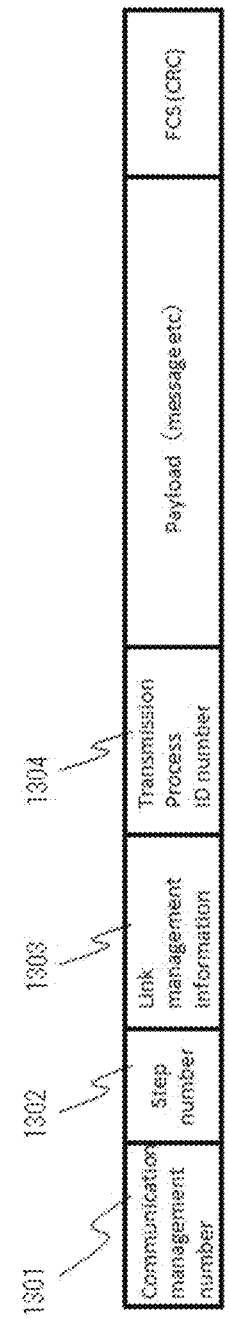
FIG. 13 is a schematic view showing an example of the packet configuration in communication between computation nodes of the third example embodiment.

FIG. 13 shows an example of the configuration of a control signal for communication between computation nodes 1101. As shown in FIG. 13, the control signal that is added in communication between computation nodes 1101 has communication management number 1301, step number 1302, link management information 1303, and transmission process ID number 1304. Data such as necessary messages are applied as input in the payload of FIG. 13. In addition, the FCS (Frame Check Sequence) of FIG. 13 is used for error detection and correction of data. The control signal shown in FIG. 13 is assumed to be added only when computation nodes 1101 first extract data from processor/memories 1151. This control signal is assumed not to change even when returned by one-hop links in computation nodes 1101. In this way, the delay that occurs based on return that uses one-hop links is limited to a minimum.

Communication management number 1301 shown in FIG. 13 is one number that communication control unit 1152 (FIG. 11) manages in communication management table 1155. Computation nodes 1101 and information such as the communication type, the sending node, and the receiving node are placed in association by using communication management number 1301. Ten bits are prepared for performing number management of communication management number 1301 and are set to enable management of up to 1024 communications. The reason for the preparation of a 10-bit portion of communication management number 1301 is that the number of communications that occur simultaneously in parallel computer system 1100 that has several tens of computation nodes 1101 is on the order of as many as several hundred.

Step number 1302 shown in FIG. 13 is for judging, in return that uses one-hop links, whether the data that are transmitted are communication data that precede the hop or communication data that follow the hop. One bit is prepared as step number 1302.

Link management information 1303 shown in FIG. 13 indicates the operating states of all transmission links connected to its own computation node 1101. As link management information 1303, one bit of data is used to indicate whether a transmission link is still unused or in operation (unused: 0; in operation: 1). Each computation node 1101 always causes link management table 1156 to reflect link management information 1303 that is obtained from other computation nodes 1101 and link management information 1303 of its own computation node 1101.

In the present example embodiment, all computation nodes 1101 are able to always comprehend all transmission links by only the limited information of the operating states of the transmission links that is obtained from its own computation node 1101. For example, the operating states of a total number of approximately 1000 links in a parallel computer system in which 32 computation nodes 1101 that are full-mesh connected one by one can be managed in the present example embodiment by using link management information 1303 of a limited number of 31 bits per single communication.

In a normal dispersed system, congestion may in some cases occur on the basis of communication that is set by other computation nodes by a parallel computation program, whereby a large delay will be generated. In response, the use of the transmission link management of the present example embodiment can realize a communication system with no congestion and low delay. The management method of the present example embodiment can also be applied in a case in which a plurality of parallel computation programs are simultaneously operated.

Transmission process ID number 1304 shown in FIG. 13 is a parameter stipulated by MPI communication. Transmission process ID number 1304 is a number for checking on the reception side whether the data are necessary data. In the present example embodiment, this number is treated as single precision and 32 bits are prepared.

Figure 1:
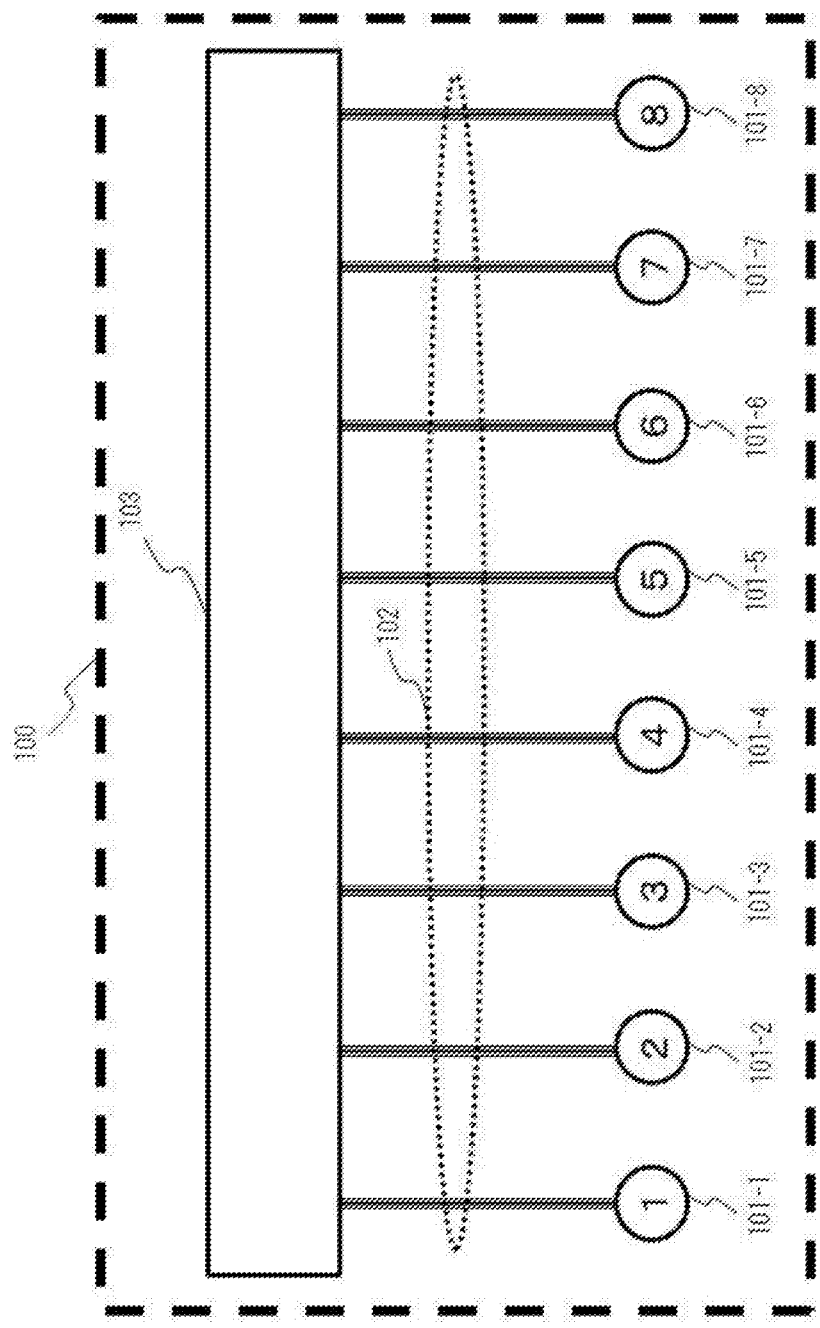
FIG. 1 shows an example of the configuration of a related parallel computer system.
Figure 2:
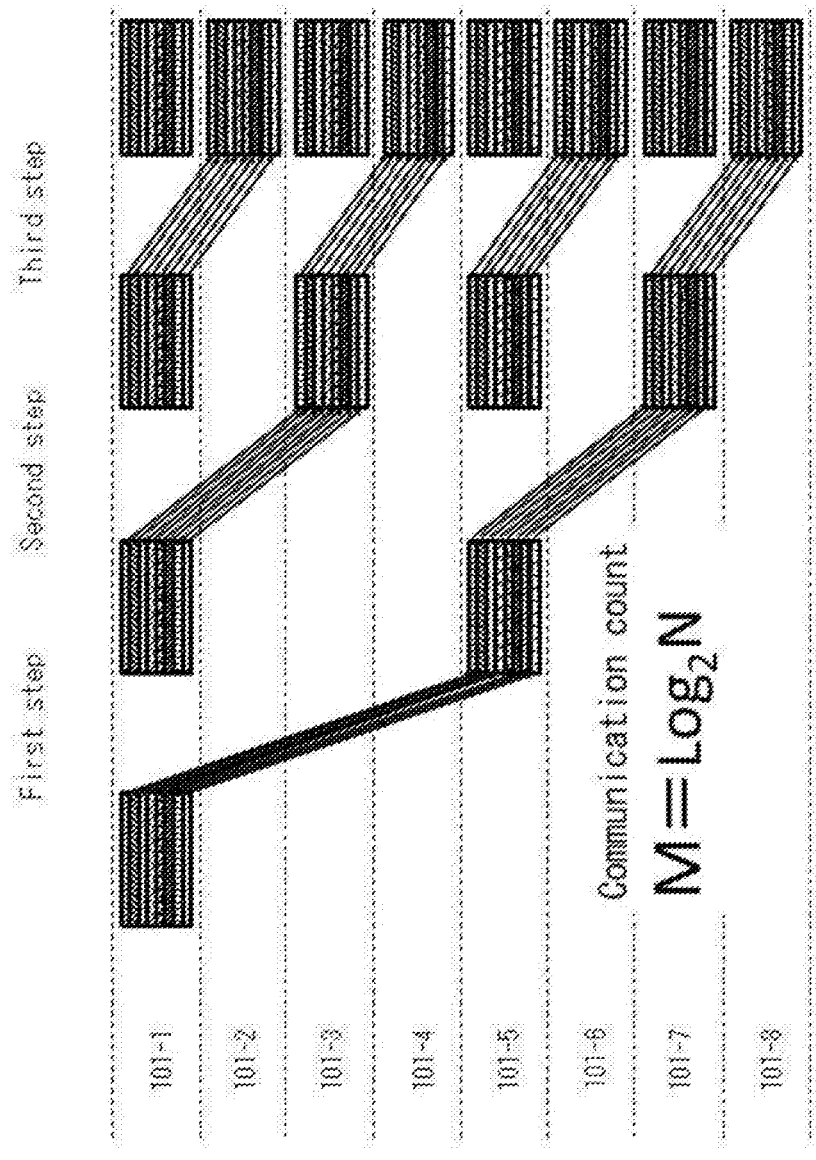
FIG. 2 shows an example of a method of increasing the speed of collective communication in a related parallel computer system.

The size of packets shown in FIG. 13 is approximately 50 nanoseconds, which is a time interval that is shorter than the passage time of a signal that uses a normal electrical switch. Electrical switches 103 that are provided between computation nodes in the related parallel computer system (FIG. 1) are omitted in the present example embodiment. The present example embodiment is configured to enable comprehension of the state of use of all links in a time interval that is shorter than the passage time of a signal that uses these electrical switches 103. Accordingly, the delay time that occurs by managing links in the present example embodiment can be made equivalent to that of a system that uses electrical switches. In the present example embodiment, moreover, the amount of information of a control signal that is added is as small as 100 bits. Accordingly, even when the communication speed of links between each computation node is 25 Gbps in the present example embodiment, the proportion of the amount of information of the control signal in the packet shown in FIG. 13 can be set to 10% or less. As a result, the state of use of all links can be easily determined in the present example embodiment. A network can therefore be realized in the present example embodiment that eliminates the occurrence of congestion that results when communication cannot be carried out due to the use of links in other communication.

In addition, a route management table (not shown in the figures) is also prepared in communication control unit 1152 that registers beforehand the states of crossbar switches 1201 and 1202 that accord with the combination of control signals that have been added. Using the route management table enables the settings of crossbar switches 1201 and 1202 to be reflected instantaneously in the present example embodiment.

Figure 14:
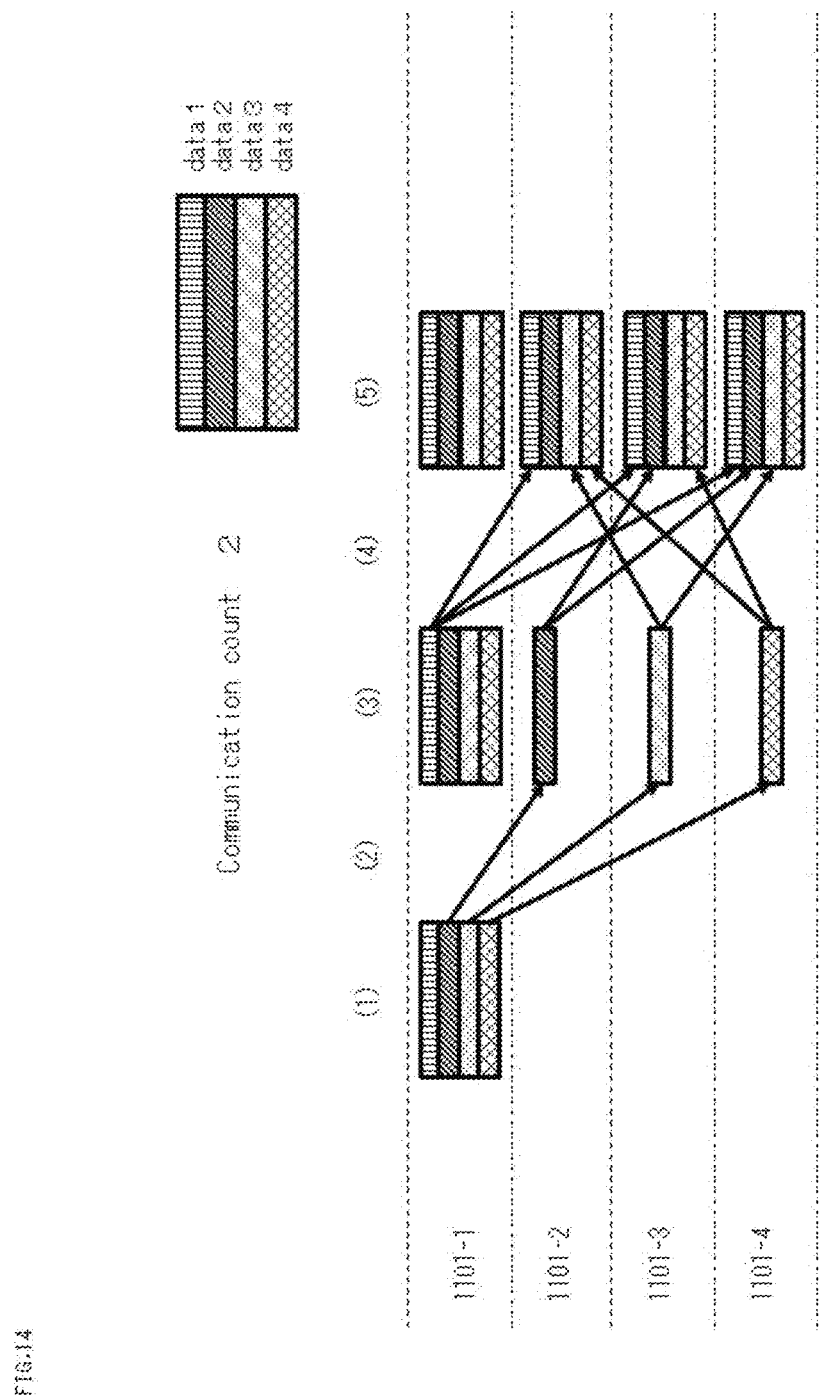
FIG. 14 shows an example of the method of raising speed in multicast communication of the third example embodiment.

FIG. 14 shows the flow of data when a large amount of data is multicast. Here, computation node 1 1101-1 is the sending node and all computation nodes 1101-1, 2, 3, and 4 are set both as return nodes and receiving nodes. Computation node 1 1101-1, having sent data 1 from its own computation node 1101-1 to its own computation node 1101-1, has returned data. In other words, computation node 1 1101-1 is taken as a return node. The flow of data in each step is as shown in the following (1) to (5).

(1) Data are K-divided at the sending node. In the present example embodiment, K=4. In the case of FIG. 14, sending node 1101-1 divides the data into data 1 to data 4.

(2) The data that have been divided (hereinbelow referred to as "divided data") are individually transmitted from the sending node to all return nodes. In the case of FIG. 14, data 2 is transmitted from sending node 1101-1 to return node 1101-2. Data 3 is transmitted from sending node 1101-1 to return node 1101-3. Data 4 is transmitted from sending node 1101-1 to return node 1101-4. Each return node receives the divided data that were transmitted from sending node 1101-1.

(3) Distributed switch 1153 of each return node (computation node) transmits the divided data to processor/memory 1151. Distributed switch 1153 duplicates the divided data. When each return node is multicast to N devices, the number of duplications of the divided data is assumed to be N−2 obtained by subtracting the two devices of the sending node and its own node. The sending node and its own computation node are identical for only computation node 1101-1, and the number of duplications of divided data becomes N−1.

(4) Each return node re-sends the duplicated divided data to receiving nodes other than the sending node and its own node. In the case of FIG. 14, return node 1101-2 transmits data 2 to receiving node 1101-3. Return node 1101-2 transmits data 2 to receiving node 1101-4. Return node 1101-3 transmits data 3 to receiving node 2. Return node 1101-3 transmits data 3 to receiving node 4. Return node 1101-4 transmits data 4 to receiving node 2. Return node 1101-4 transmits data 4 to receiving node 3. On the other hand, these data are received in other receiving nodes.

(5) In each receiving node, the received data are transmitted to processor/memory 1151.

The state of distributed switch 1153 in each of the above-described steps from (1) to (5) is described specifically by dividing sending node 1101-1, receiving node 1101-2, 1101-3, and 1101-4.

Figure 15:
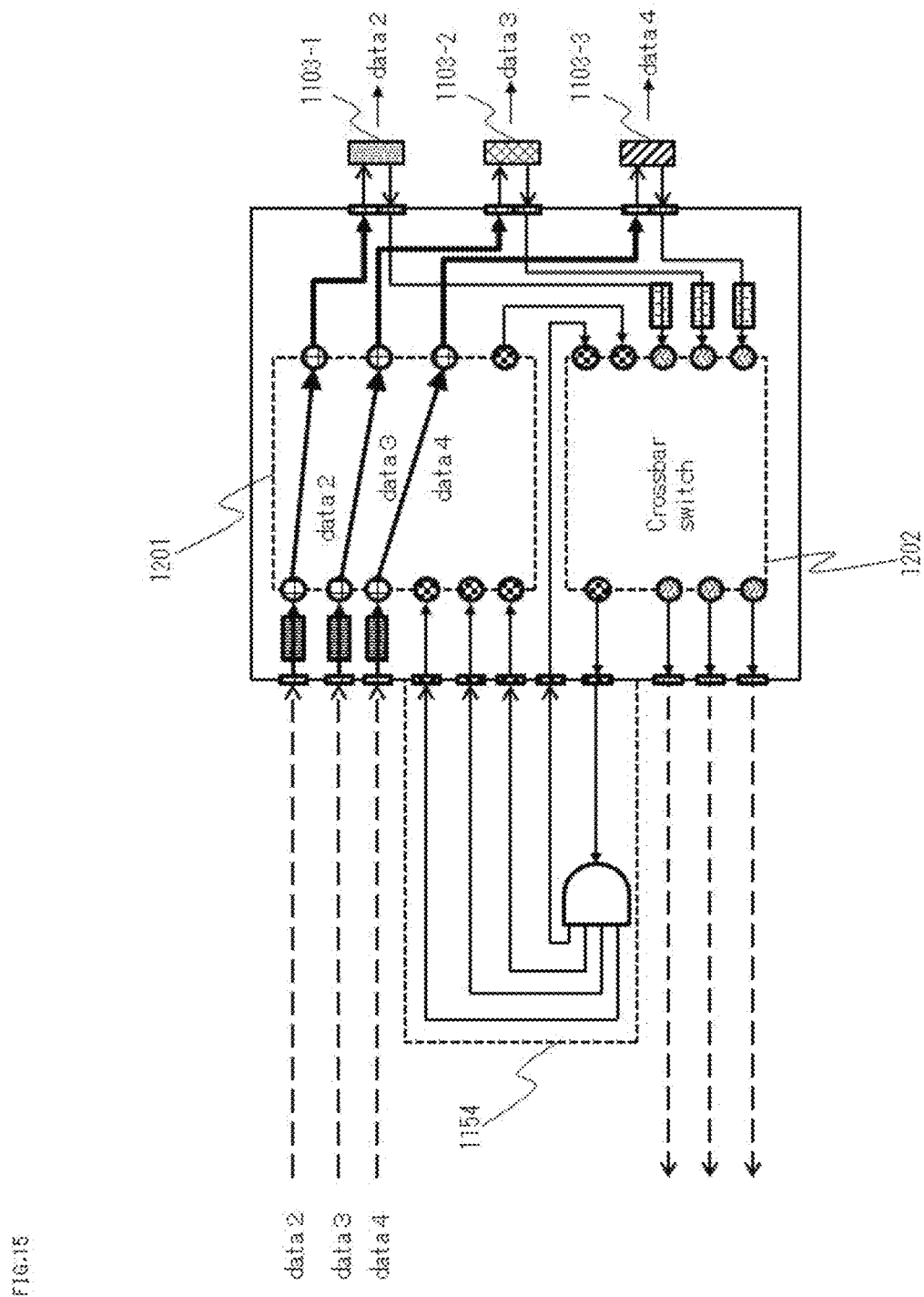
FIG. 15 is a view for explaining the first step of a sending node of the example of a distributed switch connection in multicast communication of the third example embodiment.
Figure 16:
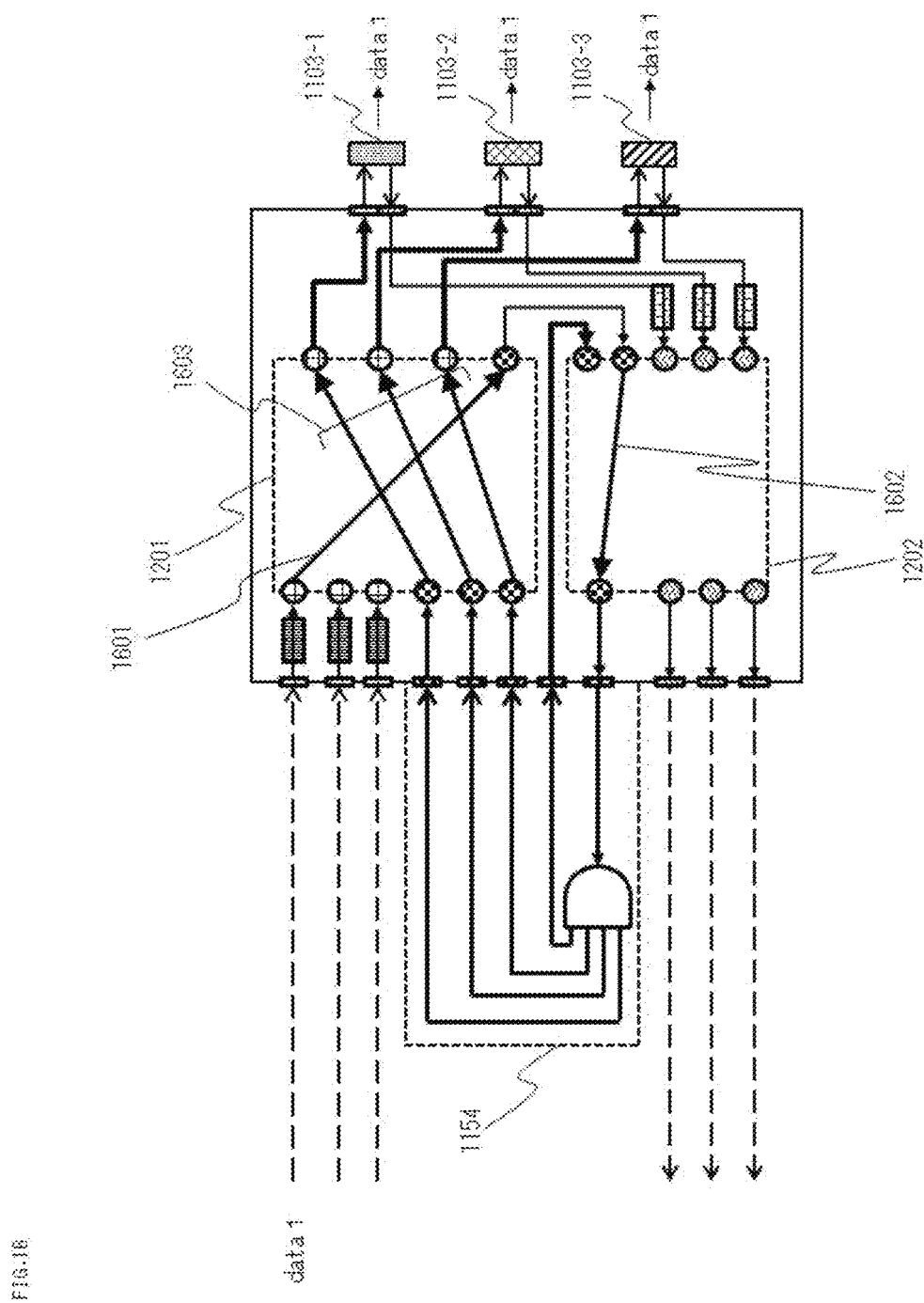
FIG. 16 is a view for explaining the second step of a sending node of the example of the distributed switch connection in multicast communication of the third example embodiment.

The state of distributed switch 1153 of transmission (computation) node 1101-1 is first described. FIG. 15 shows the state in each step of the above-described (1) to (2). Transmission crossbar switch 1201 is set to connect to the transmitter of optical transceiver 1103. This is for the purpose of transmitting data received from processor/memory 1151 to each reception (return) node 1101. Transmission crossbar switch 1201 then individually transmits, of the data that have been N-divided, N−1 items to each receiving node 1101. For example, transmission crossbar switch 1201 transmits data 2 to computation node 2 1101-2 and transmits data 3 to computation node 3 1101-3. This operation is similar to scatter. After step (2) has been completed, the process turns to the next step (3), and transmission crossbar switch 1201 is set as shown in FIG. 16. Transmission crossbar switch 1201 transmits from processor/memory 1151 data 1 that have still not been transmitted by multicast. As a result, transmission crossbar switch 1201 uses connection 1601 to once transmit data 1 to reception crossbar switch 1202, and then uses connection 1602 to transmit to return function unit 1154. Return function unit 1154 duplicates data 1. Return function unit 1154 uses connection 1603 to transmit data 1 that were duplicated to each of receiving nodes 1101-2, 1101-3, and 1101-4.

Figure 17:
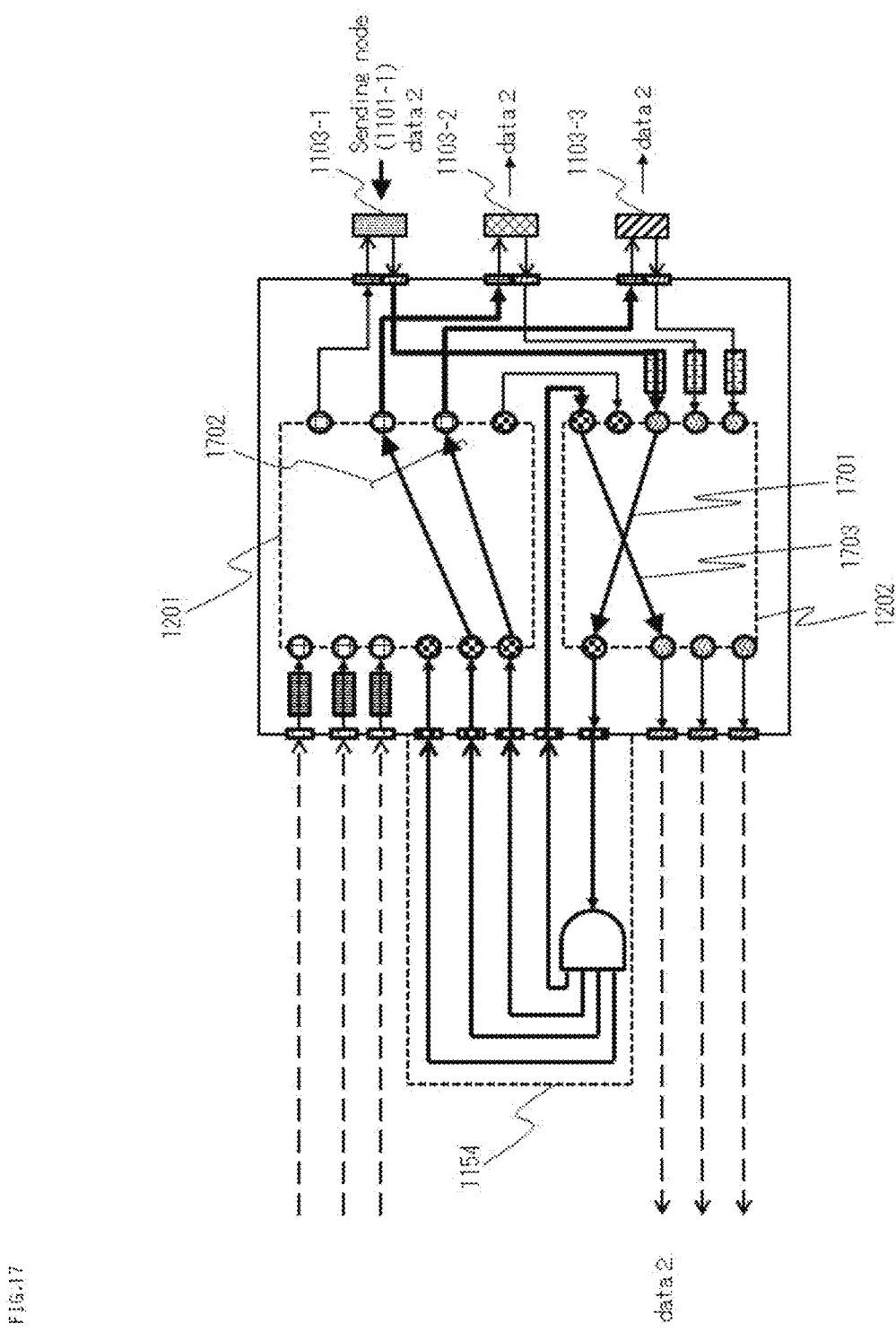
FIG. 17 is a view for explaining the first step of the receiving node of the example of distributed switch connection in the multicast communication of the third example embodiment.

The states of distributed switches 1153 of reception (computation) nodes 1101-2, 1101-3, 1101-4 are next described. FIG. 17 shows the state in each of the above-described steps (2) to (4). FIG. 17 shows the state in which sending node 1101-1 and optical transceiver 1103-1 are connected. The signal that is received from optical transceiver 1103-1 is applied as input to return function unit 1154 using connection 1701. Return function unit 1154 duplicates the signal. Return function unit 1154 transmits the duplicated data to optical transceivers 1103-2 and 1103-3 that are connected to other computation nodes using connection 1702. Optical transceivers 1103-2 and 1103-3 return the duplicated data. At this time, one item of data duplicated in return function unit 1154 again enters reception crossbar switch 1202 and is sent to processor/memory 1151 by way of connection 1703.

The state of distributed switch 1153 in step (5) is next shown in FIG. 18. Data 1 that is received from sending node 1101-1 is applied as input to processor/memory 1151 using connection 1801. In addition, data that are received from optical transceivers 1103-2 and 1103-3 that are received by one-hop links are directly applied as input to processor/memory 1151 using connection 1802. The switching of the path of the data of (2) to (4) and (5) is switched by judgment performed by communication control unit 1152 on the basis of the difference of step number 1302 of the control signal shown in FIG. 13. In this way, communication control unit 1152 instantaneously recognizes that the communication of (2) has been completed and is able to change the setting of distributed switch 1153 without delay.

Figure 3:
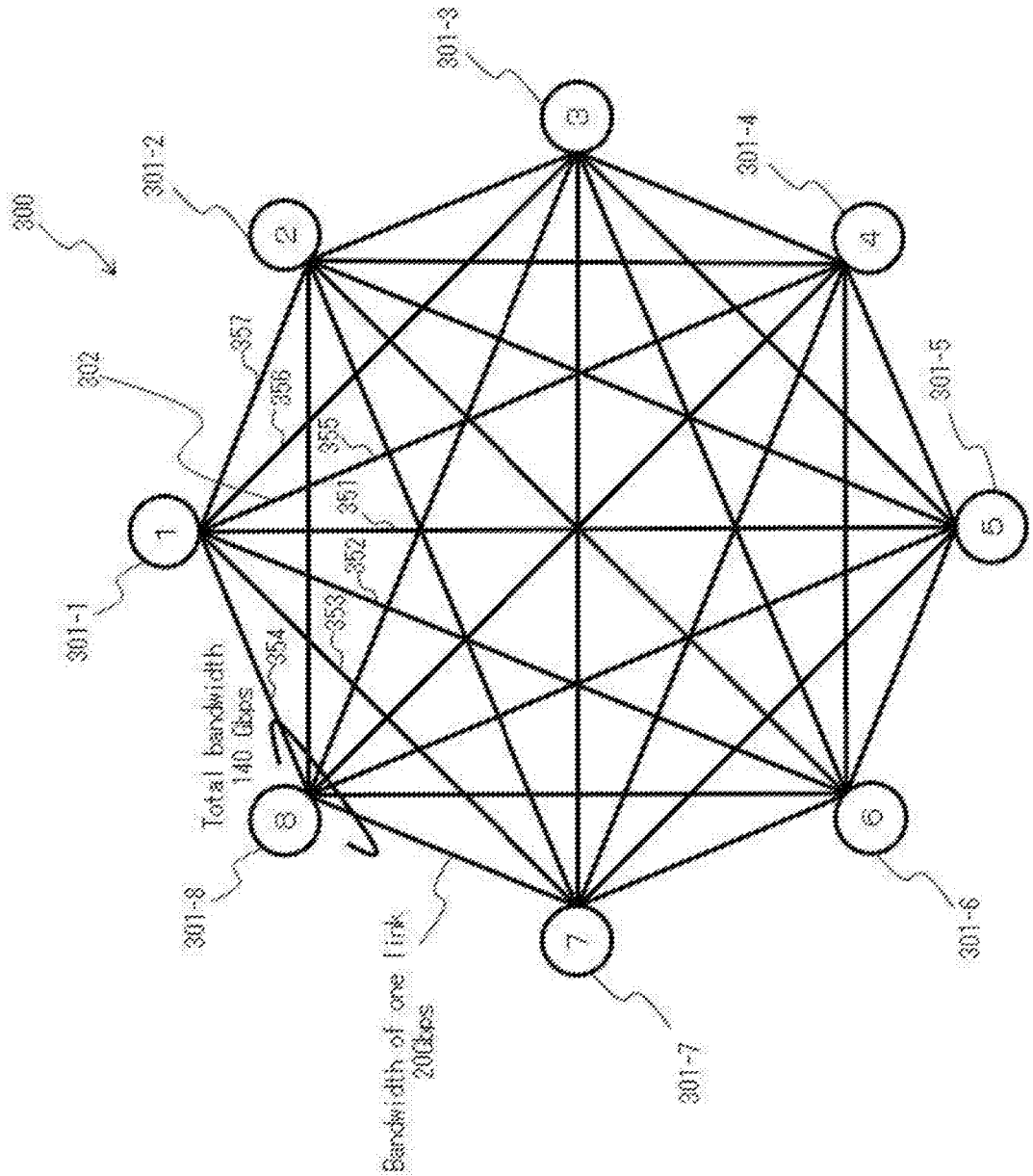
FIG. 3 is a schematic view showing an example of a parallel computer system that is full-mesh connected.

In the present example embodiment, a delay time can be realized that is substantially the same delay time as the delay time (2 μsec) at the time of the related full-mesh connection shown in FIG. 3. Accordingly, an increase of the speed when communicating in a smaller message size was realized (delay time is within 2.1 μsec).

In the present example embodiment, data are thus duplicated at the time of return of one-hop links. In this way, one-hop links can be realized with small delay in the present example embodiment. Still further, a still greater reduction of the communication time of multicast and reduce becomes possible.

Figure 19:
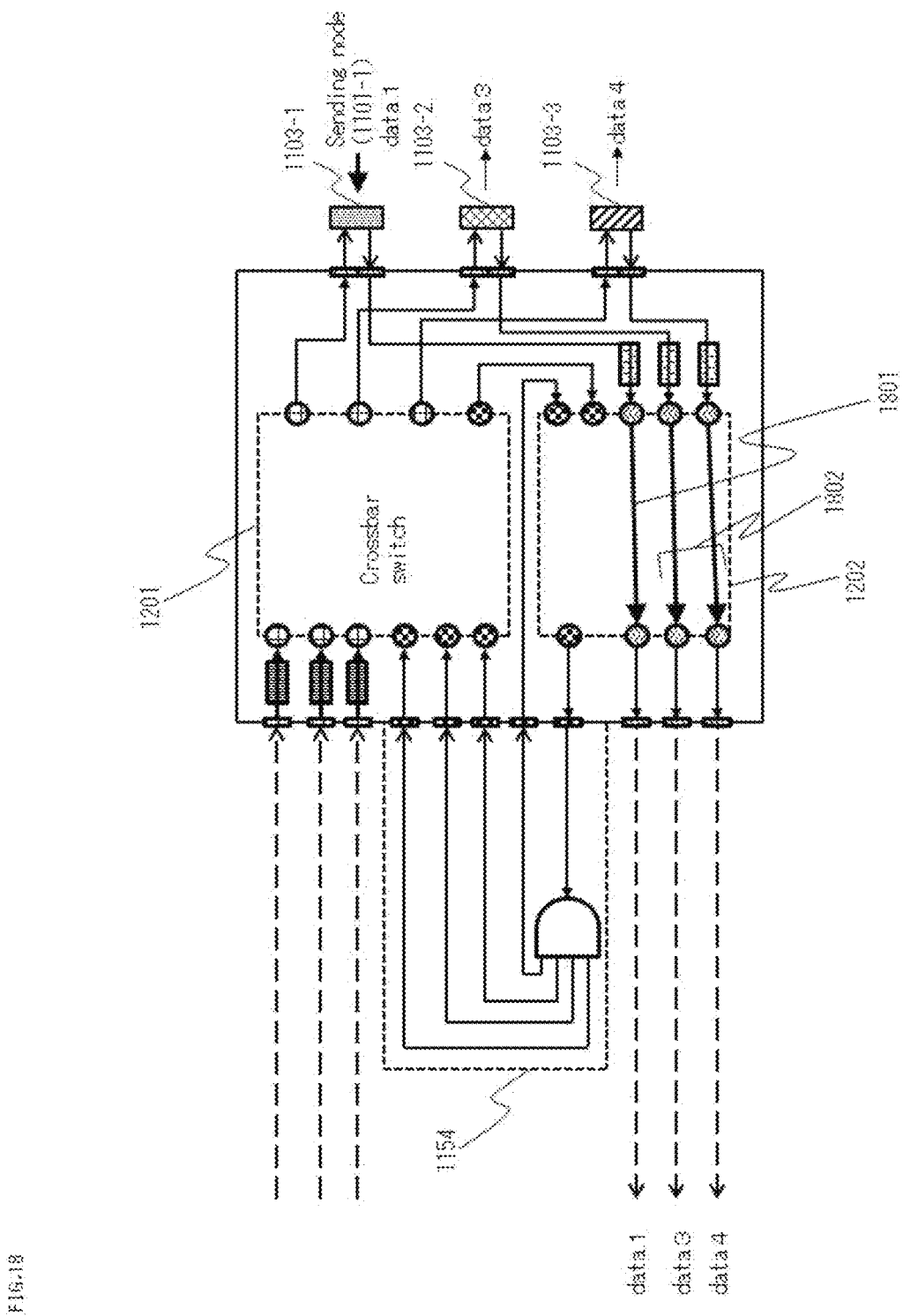
FIG. 19 shows an example of the dependence of communication time upon data size in multicast communication of the third example embodiment.
Figure 19:
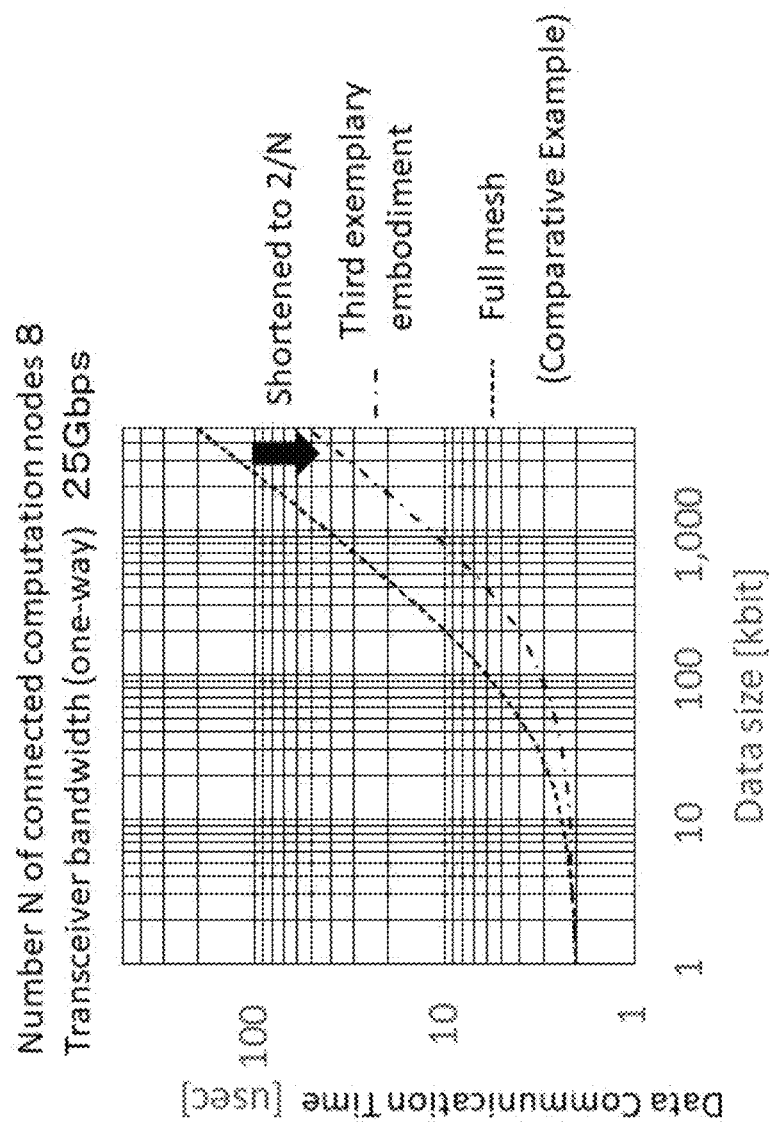

FIG. 19 shows an example of the relation between communication time and data size in multicast communication in the present example embodiment. As shown in FIG. 6, in the first example embodiment, the effect of applying one-hop links (shortening of the data transfer time) could not be obtained if the data size is not 80 Kbit or more. In the present example embodiment, in contrast, one-hop links are being utilized when the number K of return nodes that include sending nodes is a maximum value N. In this way, the present example embodiment enables a shortening by approximately 2/N times of the communication time of multicast communication in which the data size is large. Still further, a shortening of the communication time was realized in the present example embodiment by suppressing delay to a low level even at a small data size in which the data transfer amount is 4 Kbit at N=8.

Control Method of the Third Example Embodiment

In the present example embodiment, a control method was implemented that simultaneously executes the same parallel computation program at each computation node. In realizing the control method of the present example embodiment, communication management table 1155 and link management table 1156 are provided in communication control unit 1152, thereby enabling high-speed access to communication management table 1155 and link management table 1156 from communication control unit 1152.

FIG. 20 shows an example of communication management table 1155. This table manages the states of communication between computation nodes 1101 that are in actual operation. The parameters that are managed are communication management number 1155-0, parameters that are used in describing each communication in an MPI communication program, and communication state 1155-10. Parameters that relate to MPI communication that are managed in the present example embodiment include the following: communication type 1155-1, sending node 1155-2, receiving node 1155-3, communicator 1155-4, send address 1155-5, receive address 1155-6, number of items of data 1155-7, data accuracy 1155-8, and ID number 1155-9. In addition, communication state 1155-10 manages whether a component is communicating or in standby. Communicator 1155-4 is a constant of the combination of computation nodes 1101 that is set beforehand. For example, MPI_COMM_WORLD (hereinbelow noted as "WORLD") is a group made up from all processes (all computation nodes) that run at the start time of a program.

When a new communication is added, the communication content is added to the end of a row of communication management table 1155. When the communication is completed, the added row is deleted from communication management table 1155. The communication content that is noted below the deleted row is then moved up from the end of the row of communication management table 1155. In this way, the order of occurrence of communication can be managed by the rows of communication management table 1155, and further, the number of parameters that accompany the occurrence of communication can be reduced.

With relation to point-to-point communication, rather than managing by dividing by communication form, management is realized as one communication by one row on communication management table 1155. Point-to-point communication of MPI communication has a plurality of forms. For example, there are a blocking form that can guarantee transmission/reception of data and a non-blocking form in which the user him or herself must guarantee transmission/reception of data. These forms share the point that links are occupied. Accordingly, there is no need to distinguish differences of communication form in communication management table 1155. In this way, the number of parameters of communication type 1155-1 in communication management table 1155 can be reduced. Further, the number of communications that are managed can be decreased, whereby high-speed control can be realized.

In the present example embodiment, the state of use of all links can be easily judged on the basis of the exchange of limited control data in a standardized system for using parallel computing that takes MPI as an example. In this way, delay of communication can be reduced in the present example embodiment.

FIG. 21 shows an example of link management table 1156. This table has the four items of sending node 1156-1, receiving node 1156-2, state of use 1156-3, and one-hop-routed node 1156-4. All combinations have been prepared for sending node 1156-1 and receiving node 1156-2, whereby all links are being managed. When being used in communication, communication management number 1155-0 in communication management table 1155 shown in FIG. 20 is recorded in state of use 1156-3. In addition, one-hop-routed nodes 1156-4 that can connect to each link when one-hop is further added is provided beforehand on link management table 1156. This is to enable the rapid selection of a one-hop link. Parentheses are used in state of use 1156-3 on link management table 1156 of FIG. 21 to note whether a link is a one-hop link or direct link. However, because communication management number 1155-0 of communication management table 1155 shown in FIG. 20 is recorded in state of use 1156-3, these parentheses may be omitted.

Figure 22:
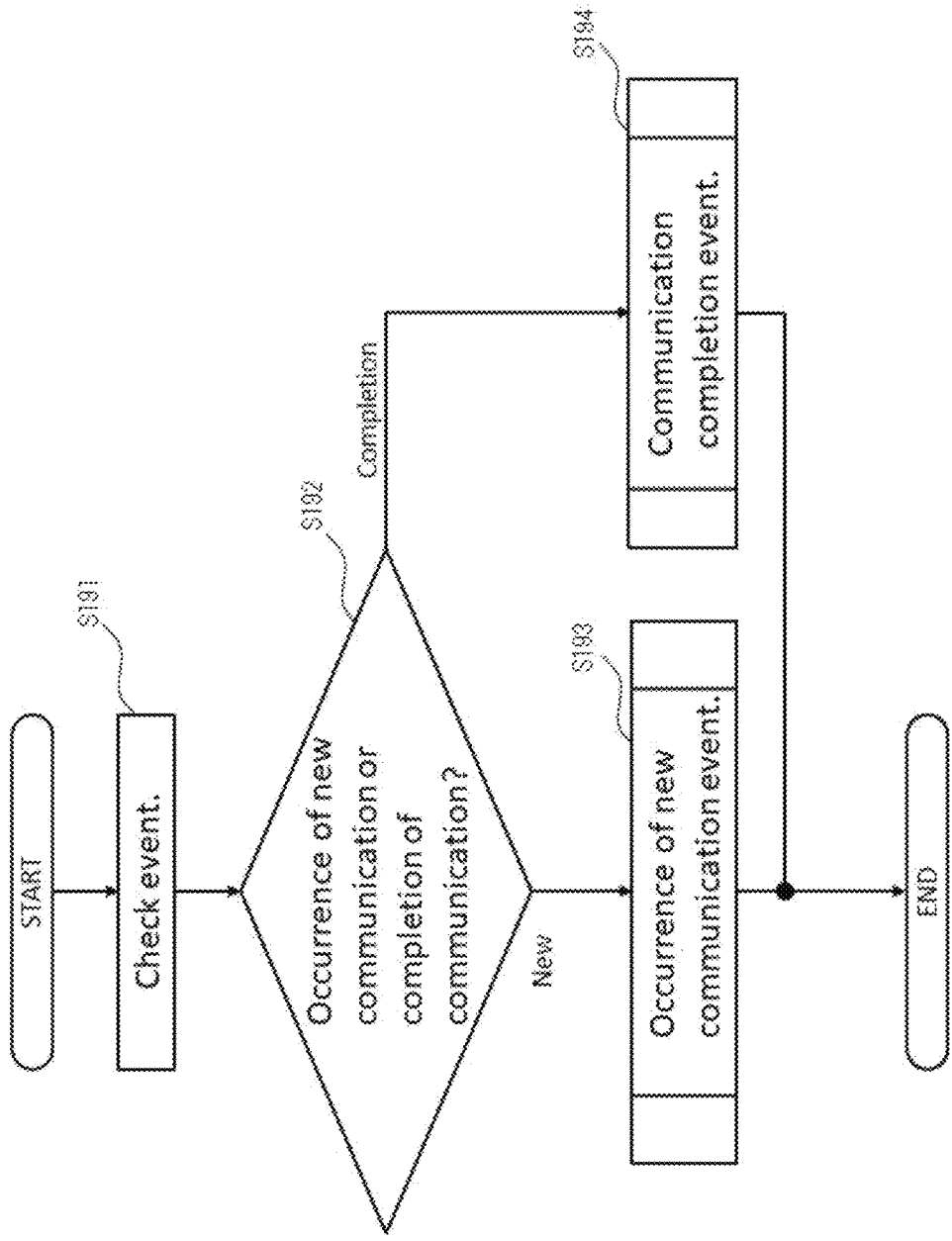
FIG. 22 shows an example of the overall flow of communication control of the third example embodiment.

FIG. 22 shows the control flow of the present example embodiment. In the process of Step S191, processor/memory 1151 checks events that occur in computation nodes 1101. In the process of Step S192, processor/memory 1151 judges whether a new communication has been generated during execution of the parallel computation program or whether communication has been completed. If processor/memory 1151 determines that a new communication has been generated, the process transitions to Step S193. If processor/memory 1151 determines that communication has been completed, the process transitions to Step S194.

When a new message communication has been generated during execution of the parallel computation program in the process of Step S193, communication control unit 1152 executes a new communication generation event. When a new message communication is completed (ended) during execution of a parallel computation program in the process of Step S194, communication control unit 1152 executes a communication completed event. All computation nodes 1101 that execute the parallel computation program carry out the process of Step S193 or the process of Step S194. Communication control unit 1152 should be caused to operate only when these two events occur. In other states in which these two events do not occur, communication control unit 1152 is placed in standby in a low power consumption state. In this way, the amount of power consumption can be effectively reduced in the present example embodiment.

In the present example embodiment, communication control unit 1152 is caused to operate only when a new communication generation event occurs or when a communication completion event occurs. In other states in which these events do not occur, communication control unit 1152 is placed in standby in a low power consumption state, whereby communication control unit 1152 need not be in constant operation. As a result, communication control unit 1152 can be placed in standby at low power consumption.

Figure 23:
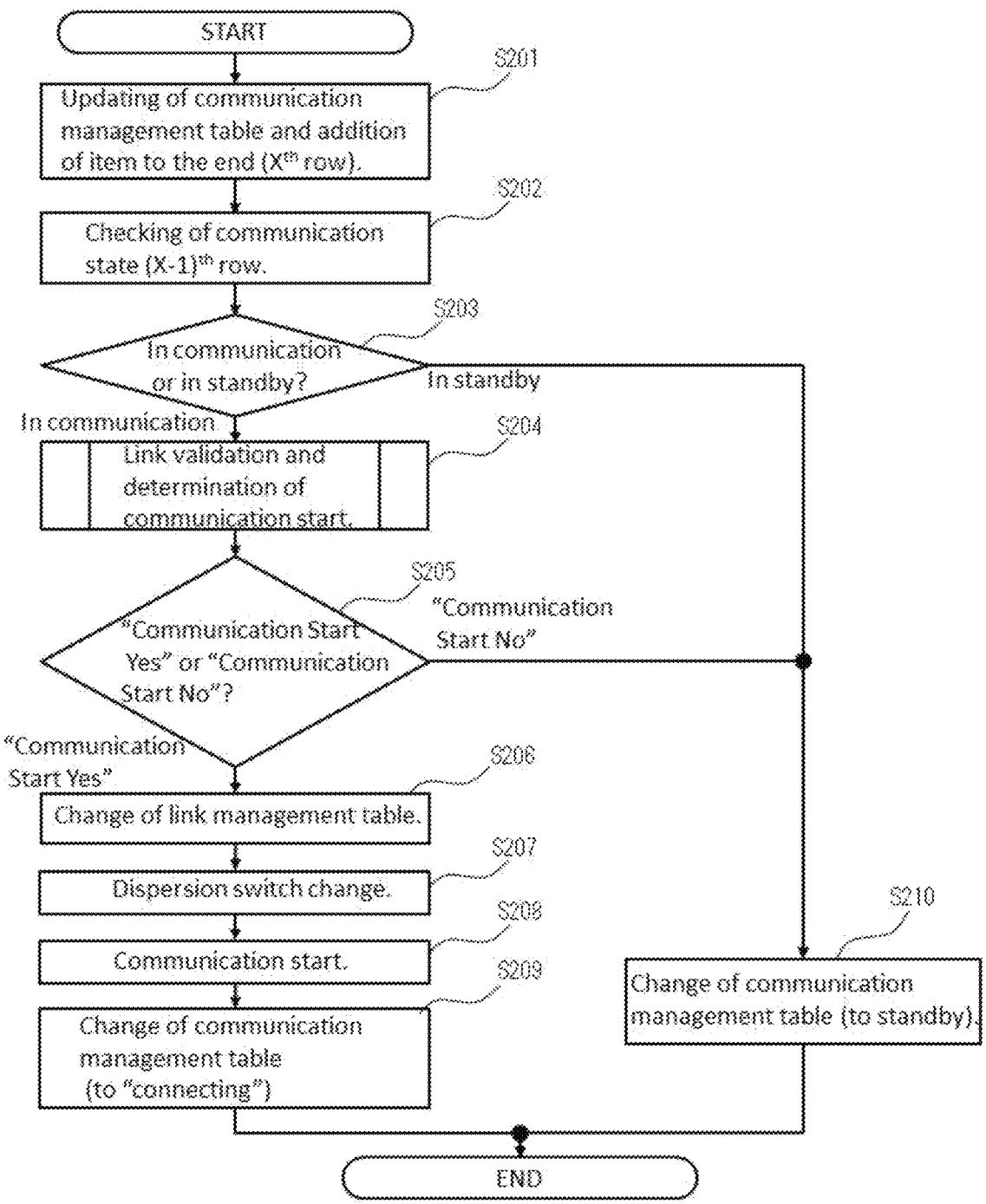
FIG. 23 shows an example of the communication control flow when generating a new communication in the third example embodiment.

FIG. 23 shows the control flow of a new communication generation event in Step S193 of FIG. 22. In the beginning, in the process of Step S201, communication control unit 1152 first updates communication management table 1155. Communication control unit 1152 writes the instruction relating to the new communication that is received from processor/memory 1151 in the last row of communication management table 1155 (this row is hereinbelow referred to as the $X^{th}$ row). An item is thereby added to the last row ($X^{th}$ row) of communication management table 1155.

Next, in the process of Step S202, communication control unit 1152 checks the communication state. Communication control unit 1152 checks communication state 1155-10 that is described in the $(X-1)^{th}$ row of communication management table 1155. In the process of Step S203, communication control unit 1152 checks whether communication state 1155-10 of communication management table 1155 is in communication or in standby.

If communication control unit 1152 verifies that communication state 1155-10 is in standby, the process transitions to Step S210, i.e., to the standby flow. In the process of Step S210 in the standby flow, communication control unit 1152 changes communication state 1155-10 of communication management table 1155 to standby. The process then ends.

On the other hand, if communication control unit 1152 verifies that communication state 1155-10 is in communication, the process transitions to Step S204, i.e., to the flow of the link validation and the determination of the communication start. If communication control unit 1152 verifies that there is no other communication, i.e., that there is no communication other than the communication that newly occurred (if X=1), the process transitions to Step S204.

Figure 24:
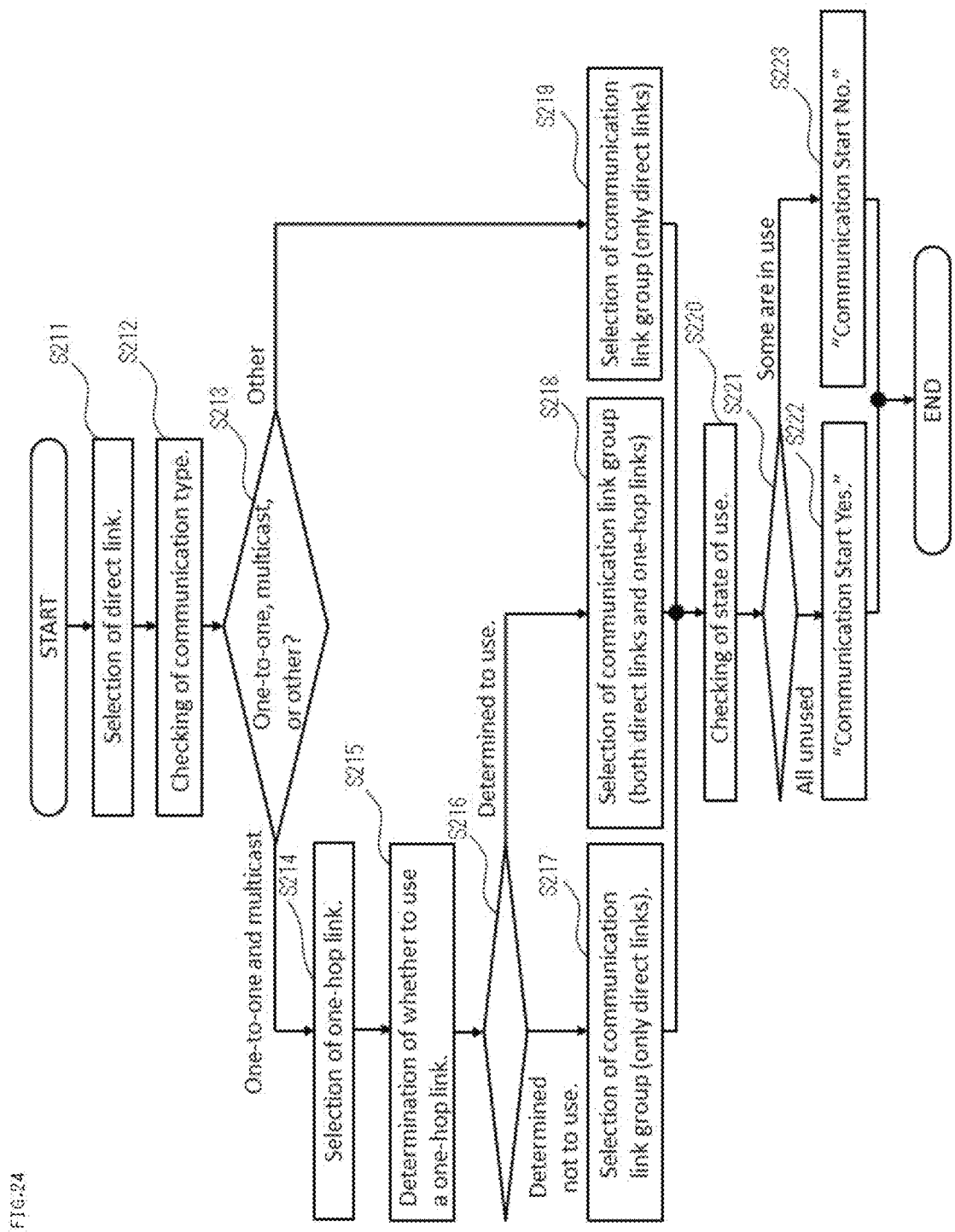
FIG. 24 shows an example of the control flow of the verification of a link and the determination of the start of communication in the third example embodiment.

FIG. 24 shows the control flow of the link verification and the determination of communication start in Step S204 of FIG. 23. This control is executed upon the communication of the $X^{th}$ row of communication management table 1155.

Communication control unit 1152 first selects a direct link in the process of Step S211. Communication control unit 1152 selects the computation nodes that are noted in sending node 1155-2 and receiving node 1155-3 of communication management table 1155 as the directly connected links. In the case of collective communication, communicator is designated in the sending node 1155-2 and receiving node 1155-3 of communication management table 1155. In this case, communication control unit 1152 selects all of the nodes that are included in communicator as links.

In the process of Step S212, communication control unit 1152 next carries out verification of the communication type. In the process of Step S213, communication control unit 1152 checks whether the communication type is point-to-point communication and multicast communication or other communication. If communication control unit 1152 verifies that the communication type is other communication, i.e., that the communication is other than point-to-point communication and multicast communication, the process transitions to Step S219. Communication control unit 1152 performs no particular process upon communication for which the communication type is other than point-to-point communication and multicast communication. If the communication type is communication other than point-to-point communication and multicast communication, the process transitions to the process of selecting a communication link group of Step S219 that is to be described. On the other hand, if communication control unit 1152 verifies that the communication type is point-to-point communication and multicast communication, the process transitions to the selection of one-hop links of Step S214.

In the process of Step S214, communication control unit 1152 performs selection of one-hop links. Communication control unit 1152 first extracts from within sending nodes 1156-1 of link management table 1156 the links that are the same as sending node 1155-2 of communication management table 1155. Communication control unit 1152 then selects from one-hop routed nodes 1156-4 the link for which the node that is the same as receiving node 1155-3 of communication management table 1155 is included from among sending nodes 1156-1. Communication control unit 1152 then takes this link that was selected as the link of the first step (1hop1st) of one-hop links. The receiving node of the link that communication control unit 1152 selected as the first step link (1hop1st) of one-hop links becomes the return node. Further, communication control unit 1152 selects, as the link of the next step (1hop2nd), a link for which this return node is the sending node, and moreover, that is of the combination of receiving nodes that is the same as receiving node 1155-3 of communication management table 1155. In the present example embodiment, communication control unit 1152 selects all one-hop links for which the number K of return nodes is a maximum.

In the process of Step S215, communication control unit 1152 next determines the use of one-hop links. In this determination, communication control unit 1152 judges whether to use as the communication link group that actually performs communication a link group that is composed of only direct links or a link group that includes one-hop links. In this determination, communication control unit 1152 judges on the basis of whether the communication time can be shortened. In the present example embodiment, communication control unit 1152 determines to utilize a link group that includes one-hop links when the following simple calculation formula holds true:

Point-to-point Communication $$(\text{number of items of data}) \times (1 \text{data size}) < (K-1) \times B \times (T_1 - T_0)/(K-2)$$

Multicast Communication $$(\text{number of items of data}) \times (1 \text{data size}) < K \times B \times (T_1 - T_0)/(K-2)$$

where:
K: Number of return nodes (N−2 in point-to-point communication, N in multicast communication)
B: Bandwidth per link
$T_1$: Delay time in one-hop link
$T_0$: Delay time in direct link Here, the left side of the calculation formula is the data size. Communication control unit 1152 uses the number of items of data 1155-7 of communication management table 1155 and data accuracy 1155-8 as the (number of items of data) and (1 data size). On the other hand, the right side of the calculation formula is an approximated value that indicates how much data are delayed by the delay time that increases when one-hop links are applied. B, $T_1$, and $T_0$ use numerical values that are evaluated beforehand when the parallel computer system is constructed. The relation of the calculation formula of this multicast communication can also be applied to reduce or allreduce. In addition, in the present example embodiment, data size is recorded on the assumption of actual data. However, data size may in some cases increase in a coding system such as 8B10B. As a result, when recording the data size, the proportion of increase of data size resulting from the encoding system should be taken into consideration.

The determination to use one-hop links can be realized at high speed by further simplifying the calculation formula. For example, in the present example embodiment, the number K of return nodes is the selection of all one-hop links that become a maximum. In other words, K is the maximum value that can be taken, and (K−1)/(K−2) and K/(K−2) in the above-described calculation formula are approximately 1. The determination to use one-hop links may be carried out by the following relational expression that is not dependent on K.

$$(\text{number of items of data}) \times (\text{data accuracy}) < B \times (T_1 - T_0)$$

As described in the first or second example embodiment, a message size that is faster with one-hop link is estimated beforehand. Communication control unit 1152 then judges on the basis of this message size.

In the process of Step S216, communication control unit 1152 next judges whether to use or not use one-hop links. If communication control unit 1152 determines to use one-hop links, the process transitions to Step S218. In the process of Step S218, communication control unit 1152 selects both direct links and one-hop links as a communication link group. On the other hand, if communication control unit 1152 determines not to use one-hop links, the process transitions to Step S217. In the process of Step S217, communication control unit 1152 takes only direct links as the communication link group. The communication link group is a collection of links that actually perform communication.

As described hereinabove, in the verification of communication type in the process of Step S212, when communication is verified that is other than point-to-point communication and multicast communication, communication control unit 1152 selects only direct links as the communication link group in the process of Step S219.

In the process of Step S220, communication control unit 1152 next checks the state of use. Communication control unit 1152 uses state of use 1156-3 of link management table 1156 to check the states of use of all links of the communication link group that was selected. In the process of Step S221, communication control unit 1152 checks whether the states of use are all unused or in use. If communication control unit 1152 verifies that the states of use are all unused, the process transitions to Step S222. In the process of Step S222, communication control unit 1152 selects "Communication Start Yes." On the other hand, if communication control unit 1152 verifies that even one link is in use in the state of use, the process transitions to Step S223. In the process of Step S223, communication control unit 1152 selects communication start "No." The control flow of the link validation and the determination of the start of communication in Step S204 of FIG. 23 then ends. Using this control method, communication control unit 1152 ends up not selecting nodes when there are few return nodes that can be used. Accordingly, high-speed communication can always be provided for communication in which the data size is large.

Returning to the flow of link validation and the determination of communication start in Step S204 of FIG. 23, in the process of Step S204, when communication control unit 1152 selects "Communication Start Yes" (Step S222 of FIG. 24), the process transitions to the changing the link management table of Step S206. More specifically, communication control unit 1152 records communication management number 1155-0 of communication management table 1155 in state of use 1156-3 of link management table 1156. The process subsequently transitions to the process of changing the distributed switch of Step S207. Here, communication control unit 1152 carries out settings of distributed switch 1153 such that communication that uses the communication link group can be carried out. The process then transitions to Step S208. In the process of Step S208, communication control unit 1152 executes the process of starting communication. The process then transitions to Step S209. Here, communication control unit 1152 executes the change of the communication management table. More specifically, communication control unit 1152 changes communication state 1155-10 of the $X^{th}$ row of communication management table 1155 to "connecting (communicating)."

On the other hand, in the process of Step S205, when communication control unit 1152 selects "Communication Start No" (Step S223 of FIG. 24), the process transitions to Step S210. Here, communication control unit 1152 executes the change of the communication management table. More specifically, communication control unit 1152 changes communication state 1155-10 of the $X^{th}$ row of communication management table 1155 to "standby."

For example, when the following three communications are generated substantially simultaneously in order, the change of the management table that uses the control flow of the present example embodiment is as shown below:

Communication A: Point-to-point communication from computation node 1 to computation node 2 (number of data items: 5000)

Communication B: Scatter from computation node 2 to WORLD (number of data items: 5000)

Communication C: Multicast communication from computation node 3 to WORLD (number of data items: 50)

Communication A is communication newly generated in a state in which there is no other communication. As a result, communication for Communication A is carried out after carrying out the flow of link validation and determination of the start of communication in Step S204 of FIG. 23. Because the number of items of data is great, communication control unit 1152 carries out the following judgment in the flow of the determination of the use of one-hop links in the process of Step S215 of FIG. 24. Essentially, communication control unit 1152 determines to use one-hop links in the process of Step S216. Then, in the process of Step S218, communication control unit 1152 selects a communication link group. As a result, communication control unit 1152 manages communication by the forms recorded in communication management table 1155 shown in FIG. 20 and (link name) 1-2 of link management table 1156 shown in FIG. 21.

A case is next considered in which Communication B is generated immediately after Communication A. When Communication B is generated, the immediately preceding Communication A is still being communicated. Accordingly, the communication of Communication B is carried out after performing the flow of the link validation and the determination of the start of communication in Step S204 of FIG. 23. In the flow of the determination of use of one-hop links in the process of Step S215 of FIG. 24, communication control unit 1152 performs the following judgment. Essentially, communication control unit 1152 determines not to use one-hop links in the process of Step S216. Then, in the process of Step S217, communication control unit 1152 selects only direct links as the communication link group. This selection is based on the fact that the communication type is scatter. The direct links selected by communication control unit 1152 are not used in Communication A. Accordingly, direct links can be used for Communication B. As a result, communication control unit 1152 confirms that the states of use are all unused in the verification of state of use in the process of Step S220. The process then transitions to Step S222 and Communication B becomes "Communication Start Yes." As a result, communication control unit 1152 manages the communication by the forms that are recorded in communication management table 1155 shown in FIG. 25 and the (link names) 2-1, 2-3, and 2-4 of link management table 1156 shown in FIG. 26.

A case is next considered in which Communication C is generated immediately after Communication B. When Communication C is generated, the immediately preceding Communication B is being communicated. Accordingly, communication of Communication C is carried out after having performed the flow of link validation and determination of the communication start in Step S204 of FIG. 23. Communication control unit 1152 carries out the following judgment in the flow of the determination of use of one-hop links in the process of Step S215 of FIG. 24. Communication control unit 1152 determines to use one-hop links in the process of Step S216. Next, in the process of Step S218, communication control unit 1152 selects one-hop links as the communication link group. This selection is based on the fact that the communication type is multicast communication. However, the number of data items of Communication C is low at 50. Accordingly, communication control unit 1152 selects as the communication link group three direct links for which computation node 3 is the sending node (1156-1) as shown in link management table 1156 of FIG. 28. However, of these three direct links, the links for which computation node 2 is the receiving node (1156-2) are in use for Communication A, whereby Communication C in the present example embodiment enters standby (wait). As a result, communication control unit 1152 manages the communication by the forms recorded in communication management table 1155 shown in FIG. 27 and (link names) 3-1, 3-2, and 3-4 of link management table 1156 shown in FIG. 28.

Figure 29:
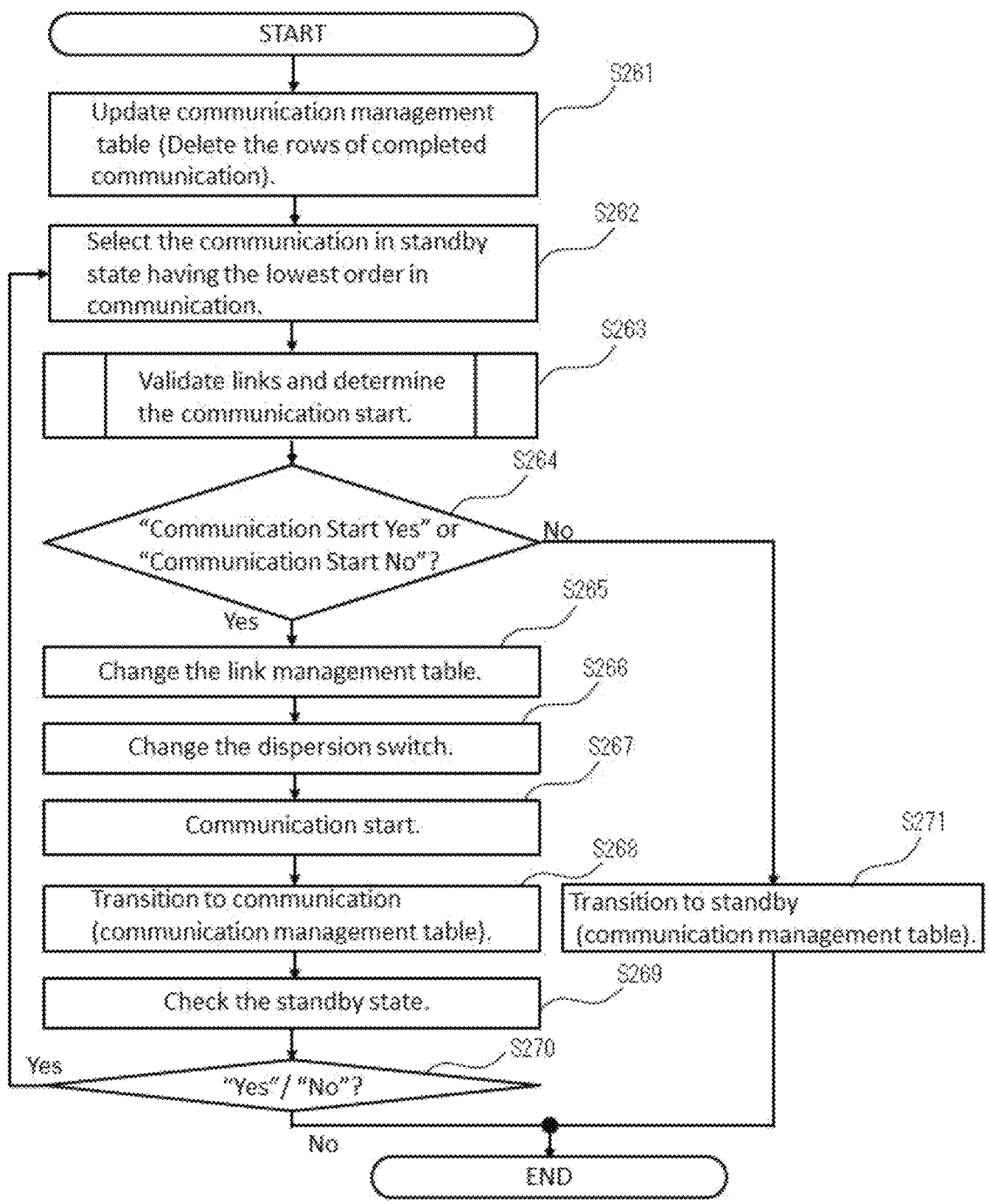
FIG. 29 shows an example of the communication control flow at the time of completion of communication in the third example embodiment.

The control flow shown in FIG. 29 when the communication is completed is next described. When the communication is completed, all computation nodes 1101 recognize that the communication is completed on the basis of link management information 1303 of the control signal described in FIG. 13. Subsequently, in the process of Step S261, each of computation nodes 1101 deletes the communication that was completed from communication management table 1155. Each of computation nodes 1101 then shifts upward the communication that is recorded below the communication that was deleted from communication management table 1155.

In the process of Step S262, communication control unit 1152 subsequently selects communication that is in the standby state that is described in the highest level of communication management table 1155 (having the lowest communication order). Communication control unit 1152 then executes the processes of link validation and the determination of communication start of Step S263. In the process of Step S264, communication control unit 1152 judges whether to start the communication.

When communication control unit 1152 determines "Communication Start Yes" in the process of Step S264, the process transitions to Step S265. In the process of Step S265, communication control unit 1152 starts communication after having changed link management table 1156 as in the process of Step S206 described in FIG. 23. In the process of Step S264, communication control unit 1152 repeatedly determines to transition to the standby state (Step S271) or to transition to the start state of other communication that is in the standby state (Step S265).

Because the processes from Step S266 to Step S268 and Step S271 of FIG. 29 are similar to the processes of Step S207 to Step S209 and Step S210 that were described in FIG. 23, a detailed explanation is here omitted. In the process of Step S269 of FIG. 29, communication control unit 1152 performs a check of the standby state. In the process of Step S270, communication control unit 1152 determines whether the standby state is in effect or not. If communication control unit 1152 determines that the standby state is in effect (Step S270: "Yes"), the process transitions to Step S262. If communication control unit 1152 determines that the standby state is not in effect (Step S270: "No"), the process ends.

For example, if communication management table 1155 is in the state shown in FIG. 27 and link management table 1156 is in the state shown in FIG. 28, the state of communication management table 1155 when Communication A is completed is shown in FIG. 30. The state of link management table 1156 when Communication A is completed is shown in FIG. 31. Because Communication A is completed, the three direct links (3-1, 3-2, and 3-4), for which computation nodes 3 that are used in Communication C are sending nodes (1156-1), all become usable. As a result, Communication C that was in the standby state is started, and until the occurrence of the next event, the standby state is entered.

A parallel computation program is described by a sequential method. Accordingly, the order of priority of communication is a time order. In the control method of the present example embodiment, communication control unit 1152 determines whether or not to communicate with priority given to communication of the top level of communication management table 1155. Accordingly, communication having a high order of priority can be executed.

In the present example embodiment, explanation of the use of one-hop links has been presented taking as examples only point-to-point communication and multicast communication. In contrast, when two or more applications are to be executed among groups of different computation nodes, the same control flow can be applied to the communication in the other groups. For example, FIG. 32 shows the flow of data when scatter is applied to one group in a state in which computation nodes 1101 are divided between two groups, A and B. Group A has computation nodes 1 1101-1, computation node 2 1101-2, computation node 3 1101-3, and computation node 4 1101-4. Group B has computation node 5 1101-5, computation node 6 1101-6, computation node 7 1101-7, and computation node 8 1101-8.

Explanation regards a case in which parallel computation is carried out by dividing group A and group B into independent groups. FIG. 32 is the result of scatter by which data 2-1 and data 2-2 that are at computation node 1 1101-1 are sent to computation node 2 1101-2. FIG. 32 is the result of scatter by which data 3-1 and data 3-2 are sent to computation node 3 1101-3. Further, FIG. 32 is the result of scatter by which data 4-1 and data 4-2 are sent to computation node 4 1101-4.

One-hop links are implemented independently between each group. As a result, as shown in FIG. 32, the two links of a one-hop link and direct link are used as the communication to each node. As a result, speed can be doubled in scatter having a large message size.

Thus, in the present example embodiment, the state of use of links is managed even in a state in which a plurality of parallel computation programs are executed simultaneously, whereby the present example embodiment not only enables a reduction of communication time realized by one-hop links, but further, one-hop links can also be applied to collective communication such as scatter and gather. As a result, the present example embodiment enables a reduction of communication time.

A Fourth Example Embodiment

The fourth example embodiment of the present invention is next described in detail with reference to the accompanying drawings.

FIG. 33 is a schematic view showing an example of parallel computer system 2500 of the fourth example embodiment of the present invention. In the interest of simplification, the number N of computation nodes is four. The point of difference between the parallel computer system of the fourth example embodiment and the third example embodiment is that return function unit 1154 shown in FIG. 11 is integrated with distributed switch 2553 of each computation node 2501.

FIG. 34 is a schematic view showing an example of the configuration of distributed switch 2553. As with the third example embodiment, the crossbar switch includes crossbar switch 2601 for transmission and crossbar switch 2602 for reception. However, the interior of transmission crossbar switch 2601 is configured with 1×(N−1) distribution units 2603 disposed at each input port. Further, the interior of transmission crossbar switch 2601 is configured with (N−1)×1 switching units 2604 disposed at each output port. In this way, distributed switch 2553 is not only capable of operating as a crossbar switch, but data that are received at any port can also be subjected to a distribution operation that supplies to a plurality of ports.

In order to realize the return function, in the present example embodiment, (N−1) (1×M) distribution units 2605 and M(N−1)×1 switching units 2606 are first arranged in the section following buffer B. Then, in the present example embodiment, distribution units 2605 and switching unit 2606 are connected together. Here, in the case of FIG. 34, N=4 and M=2. Then, in the present example embodiment, (N−1)M×1 switching units 2607 are also arranged in the section following transmission-side buffer A. In the present example embodiment, a configuration is adopted in which a port that receives from processor/memory 2551 and one port of transmission crossbar switch 2601 can be connected. The one port of transmission crossbar switch 2601 uses M switching units 2606 for one-hop links to perform selection, whereby return is realized for a number M of one-hop links.

Here, M is the number of communications that use one-hop links that can be executed simultaneously. Increasing M enables an increase of the number of communications that execute one-hop links. As a result, the utilization efficiency of a network can be increased. The above-described third example embodiment is a case in which M=1.

In addition, in the present example embodiment, one among the outputs of 1×M distribution units 2605 of the section that follows buffer B is connected to reception crossbar switch 2602. In this way, both case in which data that are transmitted are returned using one-hop links and case in which data that are transmitted are stored to its own computation node 2501 can be realized simultaneously in the present example embodiment, as in the above-described third example embodiment.

The use of the configuration of the present example embodiment enables realization of the functions of both distributed switch 1153 and return function unit 1154 of the third example embodiment. The present example embodiment can thus also realize the increased speed of multicast communication described in the third example embodiment.

The present example embodiment further realizes the increased speed of reduce and allreduce. These two types of collective communication are the opposite process of the multicast communication of the third example embodiment. Faster speed can be realized by only providing the return function in the distributed switch, as in the present example embodiment. The present example embodiment thus enables higher speed by using one-hop links for point-to-point communication, multicast, reduce, and allreduce.

In FIG. 35A, all of computation node 1 2501-1, computation node 2 2501-2, computation node 3 2501-3, and computation node 4 2501-4 are sending nodes. FIG. 35A shows an example of the flow of reduce data in which these computation nodes collect and operate data in one receiving node 1 2501-1.

In FIG. 35B, all of computation node 1 2501, computation node 2 2501-2, computation node 3 2501-3, and computation node 4 2501-4 are sending nodes and receiving nodes. FIG. 35B shows an example of the flow of allreduce data in which data are collected and operated in all of computation node 1 2501-1, computation node 2 2501-2, computation node 3 2501-3, and computation node 4 2501-4.

As in the case of multicast communication of the third example embodiment, the return nodes are all computation nodes 2501. The number K of return nodes is the number N (=4) of computation nodes. In addition, the data that are transmitted are described in the rows of each computation node 2501. For example, the held data of the initial state of computation node 1 2501-1 is [1, 3, 5, 7], and the held data of the initial state of computation node 2 2501-2 is [1, 2, 3, 4].

Communication in reduce or allreduce is in the order of each of the following steps (1) to (5):

(1) Data that are to be transmitted in each computation node 2501 are K (=N) divided by the same method.

(2) In each of computation nodes 2501, each of the items of data that have been divided (hereinbelow referred to as "divided data") is transmitted to separate return nodes. At each return node, the divided data that were transmitted from each computation node are received. FIG. 36 shows an example of the state of distributed switch 2553 at this time.

(3) At each return node, the operation that was designated by reduce is carried out for data of each column using the divided data that were received and data that are left as the portion of its own computation node. In the present example embodiment, an example of addition is shown. Each return node then returns the operation result.

Figure 37:
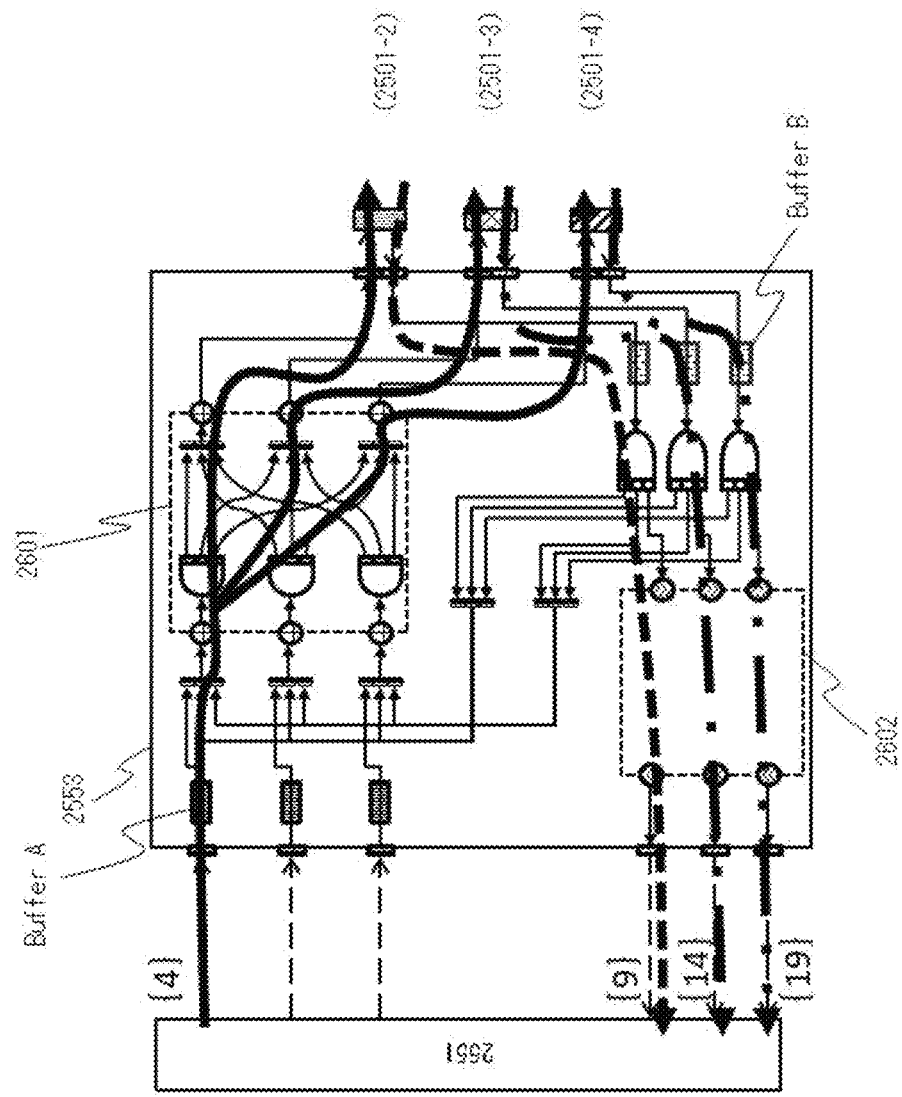
FIG. 37 shows an example of the flow of distributed switch data in the second communication of reduce in the fourth example embodiment.

(4) In the case of reduce, each return node again transmits the operation result that was returned to the receiving node. In the case of allreduce, the operation result is again transmitted to all receiving nodes other than its own computation node. On the other hand, receiving nodes receive data that were retransmitted from each return node. FIG. 37 shows an example of the state of distributed switch 2553 at this time. Transmission crossbar switch 2601 of distributed switch 2553 carries out a distribution operation. Transmission crossbar switch 2601 sends the operation result to the plurality of other receiving nodes.

(5) In receiving nodes, the received data are transmitted to processor/memory 2551.

Figure 38:
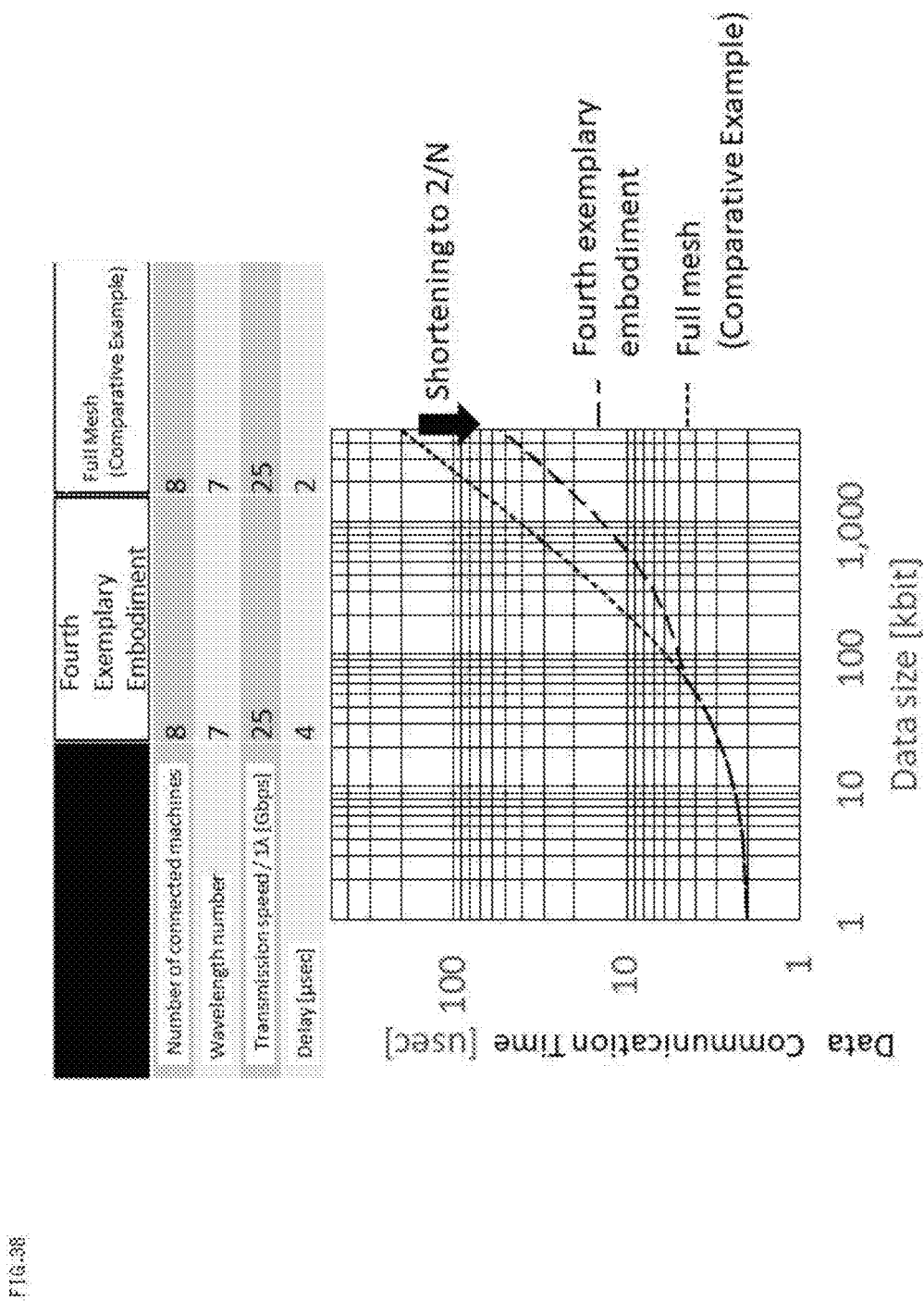
FIG. 38 shows an example of the dependence of communication time upon data size in reduce or allreduce in the fourth example embodiment.

FIG. 38 shows an example of the relation between the data communication time at the time that reduce or allreduce is carried out and the data size in the present example embodiment. The amount of data transfer is the volume of all data that are designated. As in the case of multicast communication, data having a large volume allows the use of one-hop links in which the data that are reduced to 1/N and then communicated by dividing into two instances of transmission. Accordingly, the communication time can be shortened to approximately 2/N of a comparative example. However, regarding the delay of one-hop links, data must be transferred to processor/memory 2551 because one instance of operation is carried out in return nodes. As a result, the delay time of a one-hop link is 4 μsec or approximately twice that of direct communication.

The present example embodiment thus enables reduce operations to be carried out at higher speed. Still further, in one-hop links, a second operation result can be transmitted immediately after a first communication. As a result, the operation time that occurs with parallelization of the operation time and communication time and the delay that occurs with an operation can be decreased. Further, by following a procedure that is the reverse of the allreduce communication procedure shown here, a plurality of multicasts can be executed simultaneously by different sending nodes.

A Fifth Example Embodiment

The fifth example embodiment of the present invention is next described in detail with reference to the accompanying drawings.

Figure 39:
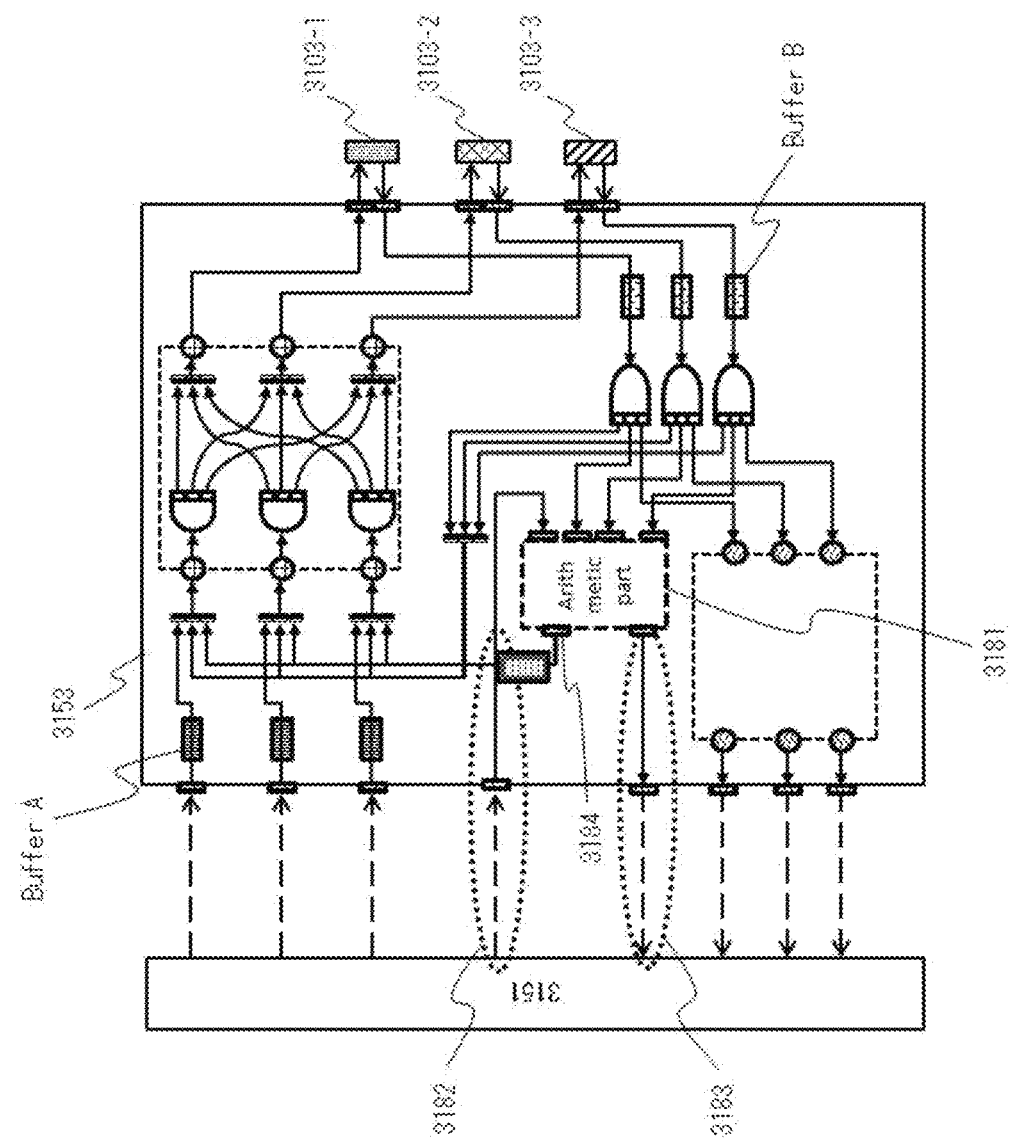
FIG. 39 is a schematic view showing an example of the configuration of the distributed switch of the fifth example embodiment.

FIG. 39 is a schematic view showing an example of the configuration of a distributed switch of the fifth example embodiment. The parallel computer system of the present example embodiment has the same configuration as the fourth example embodiment. However, as shown in FIG. 39, the configuration of distributed switch 3153 differs from that of the fourth example embodiment. More specifically, arithmetic part 3181 for reduce is included in the interior of distributed switch 3153.

Arithmetic part 3181 is a component that replaces one switching unit 2606 that is disposed inside distributed switch 2553 of the fourth example embodiment. Arithmetic part 3181 has a configuration that allows simultaneous input of data from other computation nodes. In addition, arithmetic part 3181 performs operations including data held in its own node. Accordingly, the configuration of distributed switch shown in FIG. 34 is additionally provided with connection line 3182 for receiving data of its own computation node and connection line 3183 for returning calculation results. Still further, output port 3184 is prepared for distributing calculation results to other computation nodes. In addition, this arithmetic part 3181 is an arithmetic part specialized for calculation designated in reduce, and arithmetic part 3181 can therefore execute operations at high speed. However, the configuration of this arithmetic part 3181 is not an essential part of the present invention and detailed explanation is therefore here omitted.

Together with the provision of an operation function that is specialized for reduce in distributed switch 3153, a communication control unit (not shown in the figure) enables easy and instantaneous switching between the first communication and the second communication in a one-hop link. As a result, the present example embodiment allows the delay time in one-hop links to be reduced to just 2.4 µsec.

Figure 40:
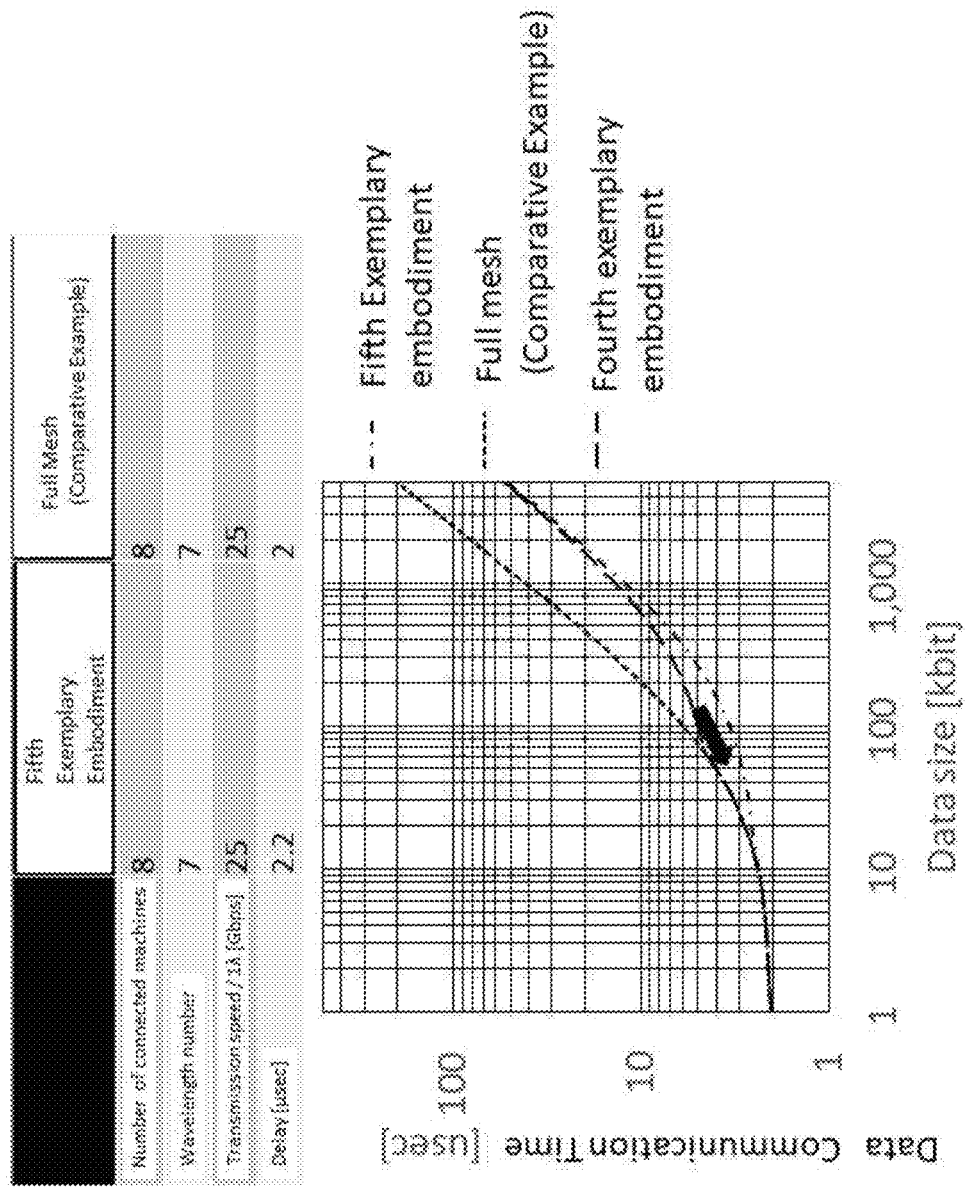
FIG. 40 shows an example of the dependence of communication time upon data size in reduce or allreduce in the fifth example embodiment.
Figure 48:
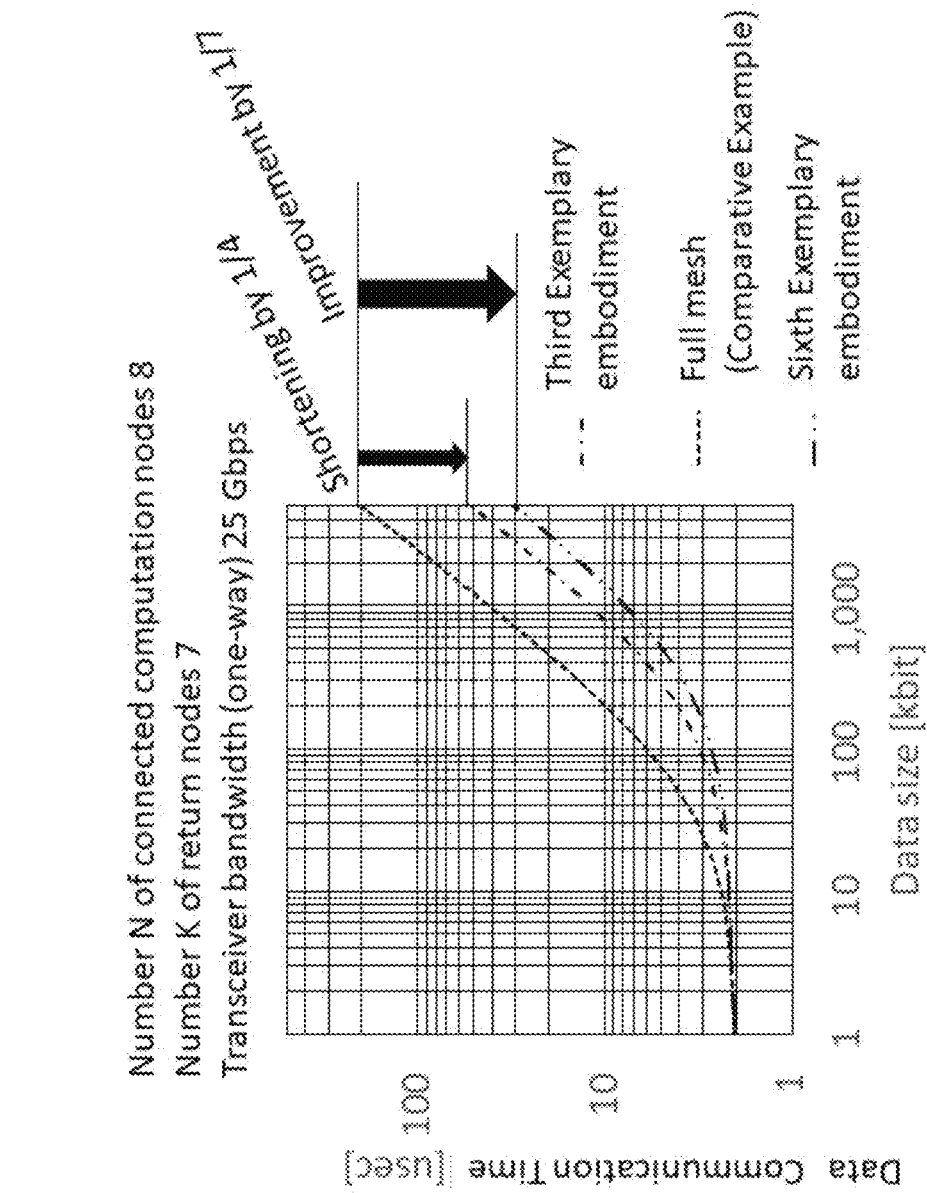

FIG. 40 shows an example of the relation between data size and the data communication time when carrying out reduce or allreduce in the present example embodiment. In the fourth example embodiment, the effect of reducing communication time that uses one-hop links was realized when the data transfer amount was 70 Kbits or more. In contrast, a shortening of the communication time can be realized even for a message size as small as 20 Kbits.

A Sixth Example Embodiment

The sixth example embodiment of the present invention is next described in detail with reference to the accompanying drawings.

In contrast to the above-described first to fifth example embodiments, the parallel computer system of the present example embodiment adopts a control method that, when a usable link exists, carries out communication using this link. In addition, the parallel computer system of the present example embodiment does not include sending nodes in return nodes in the case of multicast communication. The parallel computer system of the present example embodiment thus realizes a shortening of the communication time. Accordingly, in the present example embodiment, the communication method when using one-hop links, the processes of link validation and the determination of communication start that were described in Step S204 of FIG. 23 of the third example embodiment, and the control flow of FIG. 24 have been altered.

Communication Procedure of the Sixth Example Embodiment

In the present example embodiment, the procedures and effects of each of the communication methods of point-to-point, multicast, reduce, and allreduce will first be described. The special feature of the communication method in the present example embodiment is that, when a usable link exists, this link can be used to start communication. More specifically, communication can be executed even when the number K of computation nodes (return nodes) that return data by one-hop links is a value smaller than the upper-limit value. The number K of the computation nodes that return (return nodes) is determined as shown below for each communication method. In the case of point-to-point communication, $1 \leq K \leq N-2$; in the case of multicast communication $1 \leq K \leq N-1$, and in the case of reduce or allreduce communication, $1 \leq K \leq N$. Here, N is the number of computation nodes in the parallel computer system. In the above-described first to fifth example embodiments, one-hop links can be used only when the number K of computation nodes that return (return nodes) is a maximum, and the one-hop links enter a standby state when K is not the maximum value.

FIG. 41 shows an example of the flow of data in point-to-point communication of the sixth example embodiment. More specifically, this example shows the flow of data in point-to-point communication when the sending node is computation node 1 2501-1, the receiving node is computation node 2 2501-2, and only computation node 3 2501-3 is used as a return node. The flow of data is each step of (1) to (5) below.

(1) Data are divided in sending node 1 2501-1. The number of divisions is K+1 when direct links can be used. The number of divisions is K when direct links cannot be used. Because direct links can be used in the case of the present example embodiment, the number of divisions is two.

(2) (scatter) Data that have been divided in sending node 1 2501-1 (hereinbelow referred to as "divided data") are individually transmitted from sending node 1 2501-1 to receiving node 2 2501-2 and K return nodes 3 2501-3. The divided data that have been transmitted from sending node 1 2501-1 are then individually received in receiving node 2 2501-2 and return node 3 2501-3.

(3) Receiving node 2 2501-2 transmits data that were received to processor/memory (not shown) without alteration. On the other hand, return node 3 2501-3 uses a distributed switch and return function unit (not shown) to return the data that were received.

(4) (gather) Return node 3 2501-3 again transmits the data that were returned to receiving node 2 2501-2. On the other hand, receiving node 2 2501-2 simultaneously receives data that were re-sent from the K return nodes 3 2501-3.

(5) Return node 2 2501-2 transmits data that were received to processor/memory (not shown).

This flow of data is executed under the instructions of the communication control unit of each computation node 2501. The present example embodiment enables a shortening to 1/K times of the time taken in point-to-point communication compared to the related full-mesh connection shown in FIG. 3.

The sending destination of data that were divided in Step (2) is determined on the basis of rules that have been unified in the overall parallel computer system. In the present example embodiment, of data columns that have been divided, data groups for which the column number is smaller are transmitted to return nodes for which the computation node 2501 number is small. On the basis of these unified rules, receiving node 2 2501-2 that received data in Step (5) is able to determine the position of divided data for the data that were received from each return node. Receiving node 2 2501-2 is able to send data to a processor/memory according to this position. This operation is carried out similarly in multicast, reduce, and allreduce that are described hereinbelow and in the above-described example embodiments.

FIG. 42 shows an example of the flow of data in multicast of the sixth example embodiment. More specifically, FIG. 42 shows the flow of data when performing multicast from one sending node 1 2501-1 to X (where 1≤X≤N) computation nodes 2501 that include sending node 1 2501-1. FIG. 42 further shows the flow of data when computation node 2 2501-2 and computation node 3 2501-3 are used as return nodes (K=2). The flow of data is each of the steps from (1) to (5) below. In the case of FIG. 42, N=4, K=2, and X=4.

(1) Data are divided in sending node 1 2501-1. The number of divisions is the number K of return nodes that return data. In the case of the present example embodiment, K=2 and the data are divided in two.

(2) (scatter) Data that have been divided (hereinbelow referred to as "divided data") are individually transmitted from sending node 1 2501-1 to all return node 2 2510-2 and return node 3 2501-3. The divided data that were transmitted from sending node 1 2501-1 are then received in each of return node 2 2501-2 and return node 3 2501-3.

(3) Each of return node 2 2501-2 and return node 3 2501-3 sends the divided data that were received to processor/memory (not shown in the figures). Return node 2 2501-2 distributes and returns the divided data that were received to receiving node 3 2501-3 and receiving node 4 2501-4 other than sending node 1 2501-1 and its own computation node. Return node 3 2501-3 distributes and returns the divided data that were received to receiving node 2 2501-2 and receiving node 4 2501-4 other than sending node 1 2501-1 and its own computation node.

(4) (allgather) Return nodes 2 2501-2 individually re-sends the data that were returned individually to receiving node 3 2501-3 and receiving node 4 2501-4 other than sending node 1 2501-1 and its own computation node. Return nodes 3 2501-3 individually re-transmit data that have been returned individually to receiving node 2 2501-2 and receiving node 4 2501-4 other than sending node 1 2501-1 and its own computation node. The data that were re-transmitted are received in receiving node 2 2501-2, receiving node 3 2501-3, and receiving node 4 2501-4 other than sending node 1 2501-1.

(5) Receiving node 2 2501-2, receiving node 3 2501-3, and receiving node 4 2501-4 other than sending node 1 2501-1 transmit the data that were received to processor/memories (not shown in the figures).

This flow of data is carried out under the instructions of the communication control unit of each computation node 2501. The present example embodiment enables a shortening of the communication time to 1/K times of that of the related full-mesh network shown in FIG. 3. This decrease is a greater improvement effect than the method in the third example embodiment described above. FIG. 43 shows an example of the relation between data size and the data communication time when multicast is carried in the present example embodiment. In the case of FIG. 43, N=8 and K=7. In the third example embodiment, the improvement effect when the data size is large was a shortening to approximately ¼ times that of the comparative example, but in the present example embodiment, a shortening was achieved to 1/7 times.

FIG. 44A shows an example of the flow of data in reduce of the sixth example embodiment. More specifically, Y (where 1≤Y≤N) computation node 1 2501-1, computation node 2 2501-2, computation node 3 2501-3, and computation node 4 2501-4 are sending nodes. The flow of data of reduce is shown in which these computation nodes then collect and operate on data in one receiving node 2501-1.

FIG. 44B shows an example of the flow of data in allreduce of the sixth example embodiment. More specifically, Y (where 1≤Y≤N) computation node 1 2501-1, computation node 2 2501-2, computation node 3 2501-3, and computation node 4 2501-4 are sending nodes and receiving nodes. The flow of data of allreduce is shown in which these computation nodes then collect and operate on data. The flow of data is each of the following steps from (1) to (5).

Both FIG. 44A and FIG. 44B are examples for a case in which computation node 2 2501-2 and computation node 3 2501-3 are return nodes.

(1) Data that are to be transmitted are divided into K portions by the same method in each computation node 2501.

(2) (all-to-all (all exchange)) In each computation node 2501, the data that have been divided (hereinbelow referred to as "divided data") are individually transmitted toward return nodes. In each return node, the divided data that were transmitted from each computation node 2501 are individually received.

(3) Each return node uses data that have been collected and data that remain in its own computation node to carry out the operation that is designated by reduce for each column of data. The present example embodiment shows an example of addition. The operation result is returned and distributed to exactly the number of receiving nodes other than its own computation node.

(4) (gather and allgather) In the case of reduce, each return node re-transmits to the receiving node the operation result that was returned. In the case of allreduce, each return node re-transmits to all receiving nodes other than its own computation node the operation result that was returned. The data are individually received at the receiving nodes.

(5) In the receiving nodes, the data that were received are transmitted to processor/memories (not shown in the figure).

This flow of data is carried out under the instructions of the communication control unit of each computation node 2501. The present example embodiment enables an improvement of the time taken by reduce communication by K/2 times compared to the case of the related full-mesh network shown in FIG. 3.

Control Flow of the Sixth Example Embodiment

Figure 45:
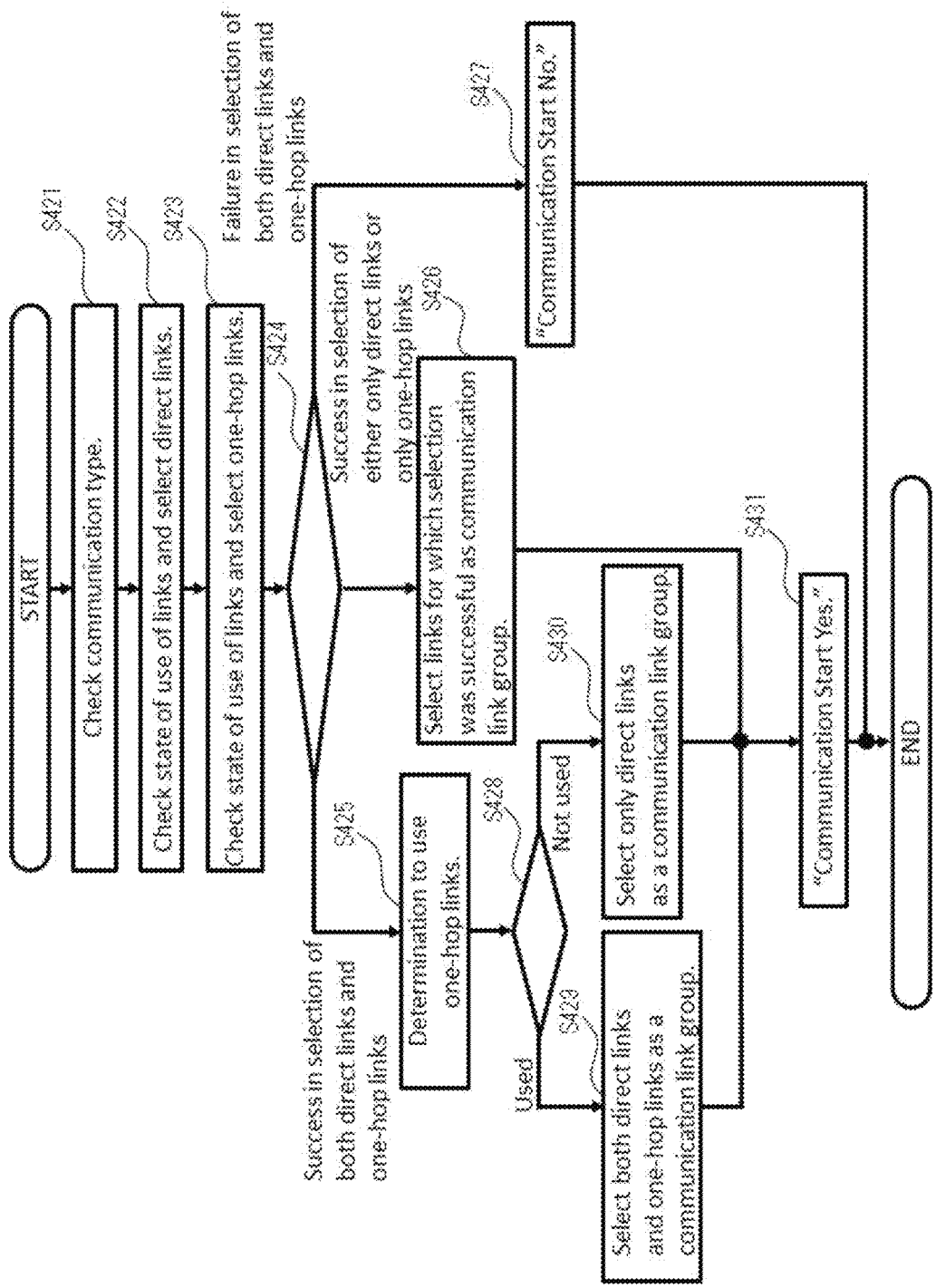
FIG. 45 shows an example of the control flow of link verification and the determination of the start of communication in the sixth example embodiment.

In the present example embodiment, of the control flow shown in FIG. 23 of the third example embodiment, the processes of Step S204 shown in FIG. 24 that are carried out in the process of the link validation and the determination of communication start have been changed. FIG. 45 shows the control flow of the link validation and the determination of the communication start.

In the process of Step S421, communication control unit 1152 first carries out a check of the communication type. Communication control unit 1152 next selects links. The selection of direct links can be realized on the basis of the combination of sending nodes 1155-2 and receiving nodes 1155-3 of communication management table 1155. Accordingly, the selection may be carried out starting from the selection of direct links, as in the third example embodiment.

In the process of Step S422, communication control unit 1152 next performs a check of the state of use of links and a selection of direct links. Communication control unit 1152 picks up all direct links in which sending nodes 1155-2 and receiving nodes 1155-3 that are managed in communication management table 1155 are directly connected. Moreover, communication control unit 1152 then uses link management table 1156 to verify the state of use. When there is even one link being used at this time, communication control unit 1152 determines that the link selection has failed.

Communication control unit 1152 next performs a check of the state of use of links and a selection of one-hop links in the process of Step S423. In the case of FIG. 45, communication control unit 1152 first, in the process of the check of the communication type of Step S421, performs selection for point-to-point communication, multicast communication, reduce, and allreduce. In addition, communication control unit 1152 selects return nodes by which data are returned by one-hop links. In this way, communication control unit 1152 performs selection for one-hop links by way of these return nodes. If there is other communication, communication control unit 1152 determines that the selection of links has failed. In this case, communication control unit 1152 determines whether to communicate only by direct links.

As in the case of the third example embodiment, in the selection method in point-to-point communication, communication control unit 1152 uses one-hop routed nodes 1156-4 of link management table 1156 to identify one-hop links that can connect. Communication control unit 1152 then, on the basis of state of use 1156-3 of link management table 1156, selects as the return nodes, computation nodes for which both the first and second links are unused. Communication control unit 1152 then selects links related to the return nodes as one-hop links.

As in the case of the third example embodiment, in the selection method in multicast communication, communication control unit 1152 uses one-hop routed nodes 1156-4 of link management table 1156 to identify one-hop links that can connect. Communication control unit 1152 then selects as the return nodes, computation nodes for which the first links from the sending node are unused, and moreover, for which second links with all receiving nodes other than the sending node and its own node are unused. This selection is carried out on the basis of state of use 1156-3 of link management table 1156. Communication control unit 1152 then selects links related to the return nodes as one-hop links.

As in the case of the third example embodiment, in the selection method in reduce, communication control unit 1152 uses one-hop routed nodes 1156-4 of link management table 1156 to identify one-hop links that can connect. Communication control unit 1152 then selects as the return nodes, computation nodes for which first links from all sending nodes are unused, and moreover, for which second links with the receiving nodes are also unused. This selection is carried out on the basis of state of use 1156-3 of link management table 1156. Communication control unit 1152 then selects links related to the return nodes as one-hop links.

As in the case of the third example embodiment, in the selection method in allreduce, communication control unit 1152 uses one-hop-routed nodes 1156-4 of link management table 1156 to identify one-hop links that can connect. Communication control unit 1152 then selects, as the return nodes, computation nodes for which first links from all sending nodes are unused, and moreover, for which the second links with all receiving nodes other than its own node are unused. This selection is carried out on the basis of state of use 1156-3 of link management table 1156. Communication control unit 1152 then selects links related to the return nodes as one-hop links.

The subsequent process can be divided into three cases in accordance with the link selection result in the process of Step S424.

When selections of direct links and one-hop links both fail in the process of Step S424, the process transitions to Step S427. Communication control unit 1152 selects "Communication Start No."

When only the selection of either direct links or one-hop links is successful in the process of Step S424, the process transitions to Step S426. In the process of Step S426, communication control unit 1152 selects the links for which selection was successful as the communication link group that actually performs communication. The process then transitions to Step S431, and communication control unit 1152 selects "Communication Start Yes."

If the selections of both direct links and one-hop links are successful in the process of Step S424, the process transitions to Step S425. In the process of Step S425, communication control unit 1152, having carried out determination of the use of one-hop links, selects a communication link group. In the process of determining the use of one-hop links in Step S425, as in the process of Step S215 of FIG. 24 in the third example embodiment, communication control unit 1152 determines whether to use one-hop links on the basis of the following conditions:

Point-to-point Communication and Multicast:

$$(\text{number of items of data}) \times (1 \text{data size}) < (K-1) \times B \times (T_1-T_0)/(K-2)$$

Reduce and Allreduce:

$$(\text{number of items of data}) \times (1 \text{data size}) < K \times B \times (T_1-T_0)/(K-2)$$

where:
K: Number of return nodes
B: Bandwidth per link
$T_1$: Delay time in a one-hop link
$T_0$: Delay time in a direct link When communication control unit 1152 has determined to use one-hop links in the process of Step S428, the process transitions to Step S429. In the process of Step S429, communication control unit 1152 selects both direct links and one-hop links as the communication link group to be used in communication. On the other hand, when communication control unit 1152 has determined not to use one-hop links in the process of Step S428, the process transitions to Step S430. In the process of Step S430, communication control unit 1152 selects only direct links as a communication link group. The process then transitions to Step S431. In the process of Step S431, communication control unit 1152 sets "Communication Start Yes." The control flow of the link validation and the determination of communication start shown in FIG. 45 then ends.

By combining the control flow of link validation and the determination of communication start of the present example embodiment (FIG. 45) and the control flow described in the third example embodiment (FIG. 24), communication can be started without causing standby. It is particularly noticeable when there are links that can be used in direct links and one-hop links. Adopting this course enables a decrease of the standby time of communication in applications in which a plurality of communications frequently occur simultaneously. As a result, the total communication time can be reduced.

In learning such as "deep learning" that is one type of artificial intelligence, collective communication occurs regularly among a multiplicity of computation nodes. In such applications, as described in the third example embodiment, communication time can be reduced by executing one collective communication as efficiently as possible. Therefore, switching is preferably implemented depending on the application between control that fixes K at a maximum value as was described in the third example embodiment and control that can vary K that was described in the present example embodiment. In the control method of the present example embodiment, a mechanism is provided that designates the range of K in selecting one-hop links and checking the state of use of links in Step S423. As a result, control can be realized that can shorten the communication time in a variety of applications.

Seventh Example Embodiment

The seventh example embodiment of the present invention is next described with reference to the accompanying drawings.

FIG. 46 is a schematic view showing an example of the configuration of the parallel computer system of the seventh example embodiment. In the present example embodiment, two distributed switches 3853 and return function units 3854 are prepared for each computation node 3801 to increase the communication band among each computation node 3801. Each of the combinations of distributed switch 3853 and return function unit 3854 is connected with cyclic AWG 3802-1 and cyclic AWG 3802-2, respectively. In addition, a single communication control unit (not shown in the figures) is also prepared. Two distributed switches 3853 are then controlled at the same time using one communication management table 3855 and link management table 3856. In this way, a shortening of the communication time among computation nodes 3801 of parallel computer system 3800 could be realized without increasing the communication control units in the present example embodiment.

Eighth Example Embodiment

The eighth example embodiment of the present invention is next described in detail with reference to the accompanying drawings.

FIG. 47 is a schematic view showing an example of the configuration of the parallel computer system of the eighth example embodiment. Parallel computer system 700 of the present example embodiment has direct link 701, one-hop link 702, and communication control unit 703.

Direct link 701 is a link that directly connects between sending node 704 and receiving node 705.

One-hop link 702 is a link that connects between sending node 704 and receiving node 705 by way of return node 706 other than sending node 704 and receiving node 705.

Communication control unit 703, when transferring data from sending node 704 to receiving node 705, selects the link that connects sending node 704 and receiving node 705. More specifically, communication control unit 703 selects from among a link that uses only direct link 701, a link that uses only one-hop link 702, and a link that uses a combination of direct link 701 and one-hop link 702.

In the present example embodiment, when transferring data from sending node 704 to receiving node 705, communication control unit 703 selects a link that connects sending node 704 and receiving node 705. More specifically, communication control unit 703 selects from among a link that uses only direct link 701, a link that uses only one-hop link 702, and a link that uses a combination of direct link 701 and one-hop link 702. In this way, the present example embodiment enables an increase in the utilization efficiency of communication and a shortening of communication time in parallel computing by means of simple control in a parallel computer system that is connected by full mesh.

A computer program that is stored in a processor/memories of computation nodes that make up the parallel computer system may be provided by a recording medium or may be provided by way of a network such as the Internet. The recording medium is a medium that can be used on a computer or a medium that can be read by a computer and includes media that can record or read information through the use of magnetism, light, electrons, electromagnetism, or infrared light, and so on.

This type of medium includes, for example, a semiconductor memory, a semiconductor or solid-state memory device, magnetic tape, a removable computer diskette, Random Access Memory (RAM), Read Only Memory (ROM), a magnetic disk, an optical disk, or a magneto-optic disk.

Although the invention of the present application has been described above with reference to example embodiments, the invention of the present application is not limited to the above-described example embodiments. The configuration and details of the invention of the present application are open to various modifications within the scope of the invention of the present application that will be clear to one of ordinary skill in the art. For example, when compiling the parallel computing program, delay in communication can be further reduced by determining a portion of the determination functions carried out by the communication control unit beforehand.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claim.

All or a portion of the above-described example embodiments can be described by, but are not limited to, the following Supplementary Notes.

Supplementary Note 1

A parallel computer system is provided with:
a direct link that forms a direct connection between a sending node and a receiving node; a one-hop link that forms a connection between the sending node and the receiving node via a return node other than the sending node and the receiving node; and a communication control means that, when transferring data from the sending node to the receiving node, selects the link that connects the sending node and the receiving node from among a link that uses only the direct link, a link that uses only the one-hop link, and a link that forms a connection combines and uses the direct link and the one-hop link.

Supplementary Note 2

In the parallel computer system as described in Supplementary Note 1, the communication control means selects all nodes other than the sending node and the receiving node connected by the direct link as the return nodes.

Supplementary Note 3

In the parallel computer system as described in Supplementary Note 1 or 2, the return node is provided with return means that transfers to the receiving node data that were transmitted from the sending node.

Supplementary Note 4

The parallel computer system as described in Supplementary Note 3 is further provided with a control means that executes a parallel computation program; and when the communication control means selects the one-hop link as the link that connects the sending node and the receiving node, the return means transfers to the receiving node data that were transmitted from the sending node without passing by way of the control means.

Supplementary Note 5

In the parallel computer system as described in Supplementary Note 3 or 4, the communication control means and the return means are mounted on a single integrated element, and the communication control means controls the return means.

Supplementary Note 6

In the parallel computer system as described in any one of Supplementary Notes 1 to 5, the communication control means selects, as the link that connects the sending node and the receiving node, the link from among a link that uses only the direct link, a link that uses only the one-hop link, and a link that combines and uses the direct link and the one-hop link, that requires the shortest time for the transfer according to the amount of data that are transferred between the sending node and the receiving node.

Supplementary Note 7

In the parallel computer system as described in any one of Supplementary Notes 1 to 6, each of the sending node, the receiving node, and the return node is a computation node, and the communication control means stores a communication management table that manages the states of communication between the computation nodes and a link management table that manages the states of use of all links that link the computation nodes.

Supplementary Note 8

The parallel computer system as described in Supplementary Note 7 is configured by at least N (where N is an integer equal to or greater than 3) of the computation nodes which are configured with full mesh connections, all individually connected using the direct links by way of optical fiber; and the communication control means, on the basis of the states of communication among the computation nodes that are stored in the communication management table and the states of use of all links that link between the computation nodes that are stored in the link management table, selects a number K of return nodes where K satisfies $1 \leq K \leq N-2$ when the communication is point-to-point communication, $1 \leq K \leq N$ in the case of multicast communication, and $1 \leq K \leq N$ in the case of reduce or allreduce communication.

Supplementary Note 9

In the parallel computer system as described in Supplementary Note 8, of the N computation nodes that are full-mesh connected, one computation node is taken as a main computation node, and the control means of the main computation node manages the states of communication among the computation nodes and the states of use of all of the links that link the computation nodes.

Supplementary Note 10

In the parallel computer system as described in Supplementary Note 7, the communication control means acquires the states of operation of all links that link the computation nodes from other computation nodes and comprehends the states of operation of all of the links.

Supplementary Note 11

In the parallel computer system as described in Supplementary Note 7, in a state in which new communication occurs among the computation nodes or in a state in which communication has ended among the computation nodes during execution of the parallel computation program, the communication control means transitions to an operation state; and in a state other than a state in which new communication occurs among the computation nodes or a state in which communication has ended among the computation nodes, the communication control means transitions to a standby state.

Supplementary Note 12

In the parallel computer system as described in Supplementary Note 7, the computation nodes are connected to a cyclic AWG (Arrayed Waveguide Grating) by way of an AWG and optical fiber.

Supplementary Note 13

In the parallel computer system as described in Supplementary Note 7, the computation nodes are divided into a plurality of groups, and when the parallel computation program is executed in each of the plurality of groups, the communication control means selects, as the link, a direct link by way of a computation node in its own group and a one-hop link by way of a computation node in another group.

Supplementary Note 14

A method of controlling a parallel computer system has a step of, when transferring data from a sending node to a receiving node, selecting a link that connects the sending node and the receiving node from among: a link that uses only a direct link that forms a direct connection between the sending node and the receiving node, a link that uses only a one-hop link that forms a connection between the sending node and the receiving node via a return node other than the sending node and the receiving node, and a link that forms a connection combines and uses the direct link and the one-hop link.

Supplementary Note 15

A method of controlling a parallel computer system that is configured by at least N (where N is an integer equal to or greater than 3) of computation nodes which are configured with full-mesh connections, all individually directly connected by way of optical fiber; the method being provided with steps of, when point-to-point communication is carried out from, of the computation nodes, one sending node to another receiving node using a one-hop link that forms a connection between the sending node and the receiving node by way of a return node that is other than the sending node and the receiving node, each of the computation nodes, under instructions of a communication control means, using as communication links K (where $1 \leq K \leq N-2$) one-hop links that pass by way of K return nodes and direct links that directly connect between L (where L=0 or 1) of the sending nodes and the receiving nodes and:
- (1) in the sending node, dividing data that are to be communicated by (K+L);
- (2) in the sending node, individually transmitting the (K+L) items of data that were divided to K return nodes and L receiving nodes, and in each of the K return nodes and the L receiving nodes, individually receiving one of the (K+L) items of data that were divided;
- (3) in each of the K return nodes, returning the data that were received, and in the L receiving nodes, sending the data that were received without alteration to a control means that executes a parallel computation program;
- (4) in each of the K return nodes, re-sending data that were returned to the receiving nodes, and in the receiving nodes, receiving the data that were re-sent from the K return nodes; and
- (5) in the receiving nodes, sending the data that were received to the control means.

Supplementary Note 16

A method of controlling a parallel computer system that is configured by at least N (where N is an integer equal to or greater than 3) of computation nodes which are configured with full-mesh connections, all individually directly connected by way of optical fiber; the method being provided with steps of, when multicast communication is carried out from, of the computation nodes, one sending node to X (where 1≤X≤N) receiving nodes that include the sending node using one-hop links that forms a connection between the sending node and the receiving nodes by way of return nodes that are other than the sending node and the receiving nodes, each of the computation nodes, under instructions of a communication control means, using as communication links one-hop links that pass by way of K (where 1≤K≤N−1) return nodes that do not include the sending node and:
- (1) in the sending node, dividing the data that are to be communicated by K;
- (2) in the sending nodes, individually transmitting the K items of data that were divided to K return nodes, and in the K return nodes, individually receiving one of the K items of the data that were divided;
- (3) in the K return nodes, both sending the data that were received to a control means that executes a parallel computation program, and distributing and returning the data that were received to the number of receiving nodes other than the sending node and its own computation node;
- (4) in the K return nodes, resending the data that were returned to receiving nodes other than the sending node and its own computation node, and receiving each item of data that was re-sent from the K return nodes in each receiving node that does not include the sending node; and
- (5) in each receiving node that does not include the sending node, sending the data that were received to the control means.

Supplementary Note 17

A method of controlling a parallel computer system that is configured by at least N (where N is an integer equal to or greater than 3) of computation nodes which are configured with full-mesh connections, all individually directly connected by way of optical fiber; the method being provided with steps of, when reduce communication is carried out from, of the computation nodes, Y (where 1≤Y≤N) sending nodes to one receiving node using one-hop links that forms a connection between the sending nodes and the receiving node by way of return nodes other than the sending nodes and the receiving node, each of the computation nodes, under instructions of a communication control means, using as communication links one-hop links that pass by way of K (where 1≤K≤N) return nodes and:
- (1) in each sending node, dividing the data that are to be communicated by K;
- (2) in each sending node, individually transmitting the K items of data that were divided to K return nodes, and in the K return nodes, individually receiving one of the K items of the data that were divided;
- (3) in the K return nodes, carrying out a reduce operation by using data that are left in its own computation node and data that were received, and returning the operation results;
- (4) in the K return nodes, sending the operation results to the receiving node, and in the receiving node, receiving each operation result from the K return nodes; and
- (5) in the receiving node, sending the data that were received to a control means that executes a parallel computation program.

Supplementary Note 18

A method of controlling a parallel computer system that is configured by at least N (where N is an integer equal to or greater than 3) of computation nodes which are configured with full-mesh connections, all individually directly connected by way of optical fiber; the method being provided with steps of, when allreduce communication is carried out from the sending nodes to the receiving nodes, of the computation nodes, Y (where 1≤Y≤N) computation nodes are both sending nodes and receiving nodes, using one-hop links that forms a connection between the sending nodes and the receiving nodes by way of return nodes that are other than the sending nodes and the receiving nodes, each of the computation nodes, under instructions of a communication control means, using as communication links one-hop links that pass by way of K (where 1≤K≤N) return nodes and:
- (1) in each sending node, dividing the data that are to be communicated by K;
- (2) in each sending node, individually transmitting the K items of data that were divided to K return nodes, and in the K return nodes, individually receiving one of the K items of the data that were divided;
- (3) in the K return nodes, carrying out a reduce operation by using data that are left in its own computation node and data that were received, and distributing and returning the operation results in the number of receiving nodes other than its own computation node;
- (4) in the K return nodes, sending the operation results to receiving nodes other than its own node, and in each receiving node, receiving each operation result from the K return nodes; and
- (5) in each receiving node, sending the data that were received to a control means that executes a parallel computation program.

Supplementary Note 19

A program that causes a computer to execute a process of, when transferring data from a sending node to a receiving node, selecting a link that connects the sending node and the receiving node from among: a link that uses only a direct link that forms a direct connection between the sending node and the receiving node, a link that uses only a one-hop link that forms a connection between the sending node and the receiving node via a return node other than the sending node and the receiving node, and a link that forms a connection combines and uses the direct link and the one-hop link.

Supplementary Note 20

A program that causes a computer to execute processes of controlling a parallel computer system that is configured by at least N (where N is an integer equal to or greater than 3) of computation nodes which are configured with full-mesh connections, all individually directly connected by way of optical fiber; the processes including, when point-to-point communication is carried out from, of the computation nodes, one sending node to another receiving node using a one-hop link that forms a connection between the sending node and the receiving node by way of a return node that is other than the sending node and the receiving node, each of the computation nodes, under instructions of a communication control means, using as communication links K (where $1 \leq K \leq N-2$) one-hop links that pass by way of K return nodes and direct links that directly connect between L (where L=0 or 1) of the sending nodes and the receiving nodes and:

(1) in the sending node, dividing data that are to be communicated by (K+L);

(2) in the sending node, individually transmitting the (K+L) items of data that were divided to K return nodes and L receiving nodes, and in each of the K return nodes and the L receiving nodes, individually receiving one of the (K+L) items of data that were divided;

(3) in each of the K return nodes, returning the data that were received, and in the L receiving nodes, sending the data that were received without alteration to a control means that executes a parallel computation program;

(4) in each of the K return nodes, re-sending data that were returned to the receiving nodes, and in the receiving nodes, receiving the data that were re-sent from the K return nodes; and (5) in the receiving nodes, sending the data that were received to the control means.

Supplementary Note 21

A program that causes a computer to execute processes of controlling a parallel computer system that is configured by at least N (where N is an integer equal to or greater than 3) of computation nodes which are configured with full-mesh connections, all individually directly connected by way of optical fiber; the processes including, when multicast communication is carried out from, of the computation nodes, one sending node to X (where $1 \leq X \leq N$) receiving nodes that include the sending node using one-hop links that forms a connection between the sending node and the receiving nodes by way of a return nodes that are other than the sending node and the receiving nodes, each of the computation nodes, under instructions of a communication control means, using as communication links one-hop links that pass by way of K (where $1 \leq K \leq N-1$) return nodes that do not include the sending node and:

(1) in the sending node, dividing the data that are to be communicated by K;

(2) in the sending nodes, individually transmitting the K items of data that were divided to K return nodes, and in the K return nodes, individually receiving one of the K items of the data that were divided;

(3) in the K return nodes, both sending the data that were received to a control means that executes a parallel computation program, and distributing and returning the data that were received to the number of receiving nodes other than the sending node and its own computation node;

(4) in the K return nodes, resending the data that were returned to receiving nodes other than the sending node and its own computation node, and receiving each item of data that was re-sent from the K return nodes in each receiving node that does not include the sending node; and (5) in each receiving node that does not include the sending node, sending the data that were received to the control means.

Supplementary Note 22

A program that causes a computer to execute processes of controlling a parallel computer system that is configured by at least N (where N is an integer equal to or greater than 3) of computation nodes which are configured with full-mesh connections, all individually directly connected by way of optical fiber; the processes including, when reduce communication is carried out from, of the computation nodes, Y (where $1 \leq Y \leq N$) sending nodes to one receiving node using one-hop links that forms a connection between the sending nodes and the receiving node by way of return nodes other than the sending nodes and the receiving node, each of the computation nodes, under instructions of a communication control means, using as communication links one-hop links that pass by way of K (where $1 \leq K \leq N$) return nodes and:

(1) in each sending node, dividing the data that are to be communicated by K;

(2) in each sending node, individually transmitting the K items of data that were divided to K return nodes, and in the K return nodes, individually receiving one of the K items of the data that were divided;

(3) in the K return nodes, carrying out a reduce operation by using data that are left in its own computation node and data that were received, and returning the operation results;

(4) in the K return nodes, sending the operation results to the receiving node, and in the receiving node, receiving each operation result from the K return nodes; and (5) in the receiving node, sending the data that were received to a control means that executes a parallel computation program.

Supplementary Note 23

A program that causes a computer to execute processes of controlling a parallel computer system that is configured by at least N (where N is an integer equal to or greater than 3) of computation nodes which are configured with full-mesh connections, all individually directly connected by way of optical fiber; the processes including, when allreduce communication is carried out from the sending nodes to the receiving nodes, of the computation nodes, Y (where $1 \leq Y \leq N$) computation nodes are both sending nodes and receiving nodes, using one-hop links that forms a connection between the sending nodes and the receiving nodes by way of return nodes that are other than the sending nodes and the receiving nodes, each of the computation nodes, under instructions of a communication control means, using as communication links one-hop links that pass by way of K (where $1 \leq K \leq N$) return nodes and:

(1) in each sending node, dividing the data that are to be communicated by K;

(2) in each sending node, individually transmitting the K items of data that were divided to K return nodes, and in the K return nodes, individually receiving one of the K items of the data that were divided;

(3) in the K return nodes, carrying out a reduce operation by using data that are left in its own computation node and data that were received, and distributing and returning the operation results in the number of receiving nodes other than its own computation node; (4) in the K return nodes, sending the operation results to receiving nodes other than its own node, and in each receiving node, receiving each operation result from the K return nodes; and (5) in each receiving node, sending the data that were received to a control means that executes a parallel computation program.

What is claimed is:

1. A parallel computer system comprising:
a direct link that forms a direct connection between a sending node and a receiving node;
a one-hop link that forms a connection between said sending node and said receiving node via a return node other than said sending node and said receiving node; and
a communication controller that, when transferring data from said sending node to said receiving node, selects a link that connects said sending node and said receiving node from among a link that uses only said direct link, a link that uses only said one-hop link, and a link that forms a connection combines and uses said direct link and said one-hop link, and;
wherein said communication controller selects, as the link that connects said sending node and said receiving node, the link from among a link that uses only said direct link, a link that uses only said one-hop link, and a link that combines and uses said direct link and said one-hop link that requires the shortest time for said transfer according to the amount of data that are transferred between said sending node and said receiving node.

2. The parallel computer system as set forth in claim 1, wherein said communication controller selects all nodes other than said sending node and said receiving node connected by said direct link as said return nodes.

3. The parallel computer system as set forth in claim 1, wherein said return node is provided with a transfer apparatus that transfers to said receiving node data that were transmitted from said sending node.

4. The parallel computer system as set forth in claim 3, further comprising a controller that executes a parallel computation program;
wherein, when said communication controller selects said one-hop link as the link that connects said sending node and said receiving node, said transfer apparatus transfers to said receiving node data that were transmitted from said sending node without passing by way of said controller.

5. The parallel computer system as set forth in claim 3, wherein said communication controller and said transfer apparatus are mounted on a single integrated element, and said communication controller controls said transfer apparatus.

6. The parallel computer system as set forth in claim 1, wherein each of said sending node, said receiving node, and said return node is a computation node, and said communication controller stores a communication management table that manages states of communication between said computation nodes and a link management table that manages states of use of all links that link said computation nodes.

7. The parallel computer system as set forth in claim 6 is configured by at least N (where N is an integer equal to or greater than 3) of said computation nodes which are configured with full mesh connections, all individually connected using said direct links by way of optical fiber; and said communication controller, on the basis of the states of communication among said computation nodes that are stored in said communication management table and the states of use of all links that link between the computation nodes that are stored in the link management table, selects a number K of return nodes where K satisfies 1≤K≤N−2 when said communication is point-to-point communication, 1≤K≤N in the case of multicast communication, and 1≤K≤N in the case of reduce or allreduce communication.

8. A method of controlling a parallel computer system comprising a step of, when transferring data from a sending node to a receiving node,
selecting a link that connects said sending node and said receiving node from among: a link that uses only a direct link that forms a direct connection between said sending node and said receiving node, a link that uses only a one-hop link that forms a connection between said sending node and said receiving node via a return node other than said sending node and said receiving node, and a link that forms a connection combines and uses said direct link and said one-hop link, and;
selecting as the link that connects said sending node and said receiving node, the link from among a link that uses only said direct link, a link that uses only said one-hop link, and a link that combines and uses said direct link and said one-hop link that requires the shortest time for said transfer according to the amount of data that are transferred between said sending node and said receiving node.

9. A non-transitory computer-readable medium on which is stored a program that causes a computer to execute a process of, when transferring data from a sending node to a receiving node,
selecting a link that connects said sending node and said receiving node from among a link that uses only a direct link that forms a direct connection between said sending node and said receiving node, a link that uses only a one-hop link that forms a connection between said sending node and said receiving node via a return node other than said sending node and said receiving node, and a link that forms a connection combines and uses said direct link and said one-hop link, and;
selecting as the link that connects said sending node and said receiving node, the link from among a link that uses only said direct link, a link that uses only said one-hop link, and a link that combines and uses said direct link and said one-hop link that requires the shortest time for said transfer according to the amount of data that are transferred between said sending node and said receiving node.

* * * * *